US007823171B2

(12) United States Patent
Yokochi et al.

(10) Patent No.: US 7,823,171 B2
(45) Date of Patent: Oct. 26, 2010

(54) LOADING MECHANISM AND DISC PLAYER USING THE LOADING MECHANISM

(75) Inventors: Yoshiaki Yokochi, Hino (JP); Hiroyuki Shishido, Hachiouji (JP); Katsutoshi Kobayashi, Hachiouji (JP)

(73) Assignee: Kabushiki Kaisha Kenwood, Hachiouji-shi, Tokyo (JP)

( * ) Notice: Subject to any disclaimer, the term of this patent is extended or adjusted under 35 U.S.C. 154(b) by 492 days.

(21) Appl. No.: 11/918,963

(22) PCT Filed: Apr. 19, 2006

(86) PCT No.: PCT/JP2006/308685

§ 371 (c)(1),
(2), (4) Date: Oct. 22, 2007

(87) PCT Pub. No.: WO2006/126364

PCT Pub. Date: Nov. 30, 2006

(65) Prior Publication Data

US 2009/0083771 A1 Mar. 26, 2009

(30) Foreign Application Priority Data

May 24, 2005 (JP) .............................. 2005-150712
Jul. 6, 2005 (JP) .............................. 2005-197468

(51) Int. Cl.
*G11B 17/04* (2006.01)

(52) U.S. Cl. .................................................... 720/623

(58) Field of Classification Search ................ 720/623, 720/711, 624, 646, 621, 619, 615, 626, 620, 720/704, 706, 715, 652, 707, 622, 655, 610, 720/713, 604, 702, 696, 712
See application file for complete search history.

(56) References Cited

U.S. PATENT DOCUMENTS 4,794,476 A * 12/1988 Isaki et al. .................... 360/93

(Continued)

FOREIGN PATENT DOCUMENTS

JP     2000-057665     2/2000

(Continued)

OTHER PUBLICATIONS

International Preliminary Examination Report (Application No. PCT/JP2006/308685) dated Mar. 27, 2008.

(Continued)

*Primary Examiner*—Allen T Cao
(74) *Attorney, Agent, or Firm*—Eric J. Robinson; Robinson Intellectual Property Law Office, P.C.

(57) ABSTRACT

A loading mechanism (11) has first and second arm members (30, 30) rotated about first and second supporting points (31, 31), a cam mechanism (60) for rotating, by driving force from a drive source (71), at least either of the first and second arm members (30, 30) to hold and feed a disc (12), and a third arm member (80) independently rotated about a third supporting point (81), applying urging force to the disc (12) by an urging means (86) to hold the outer circumferential edge of the disc (12). In the holding and feeding of the disc, the center part of the disc (12) is present inside a figure obtained by connecting adjacent points out of three or more points of contact between the disc (12) and the first to third arm members (30, 30, 80).

25 Claims, 29 Drawing Sheets

U.S. PATENT DOCUMENTS

| | | | |
|---|---|---|---|
| 4,951,164 A * | 8/1990 | Yasaka et al. | 360/85 |
| 5,586,105 A * | 12/1996 | Mizuno et al. | 720/708 |
| 2003/0161244 A1 | 8/2003 | Yamanaka et al. | |
| 2007/0300245 A1* | 12/2007 | Tsutsumi et al. | 720/619 |
| 2010/0122272 A1* | 5/2010 | Fujii | 720/620 |

FOREIGN PATENT DOCUMENTS

| | | |
|---|---|---|
| JP | 2002-367261 | 12/2002 |
| JP | 2003-091913 | 3/2003 |
| JP | 2005-085451 | 3/2005 |
| JP | 2006-127680 | 5/2006 |

OTHER PUBLICATIONS

European Search Report (Application No. 06732341.0) dated Jun. 2, 2009.

International Search Report (Application No. PCT/JP2006/308685).

\* cited by examiner

F I G. 7
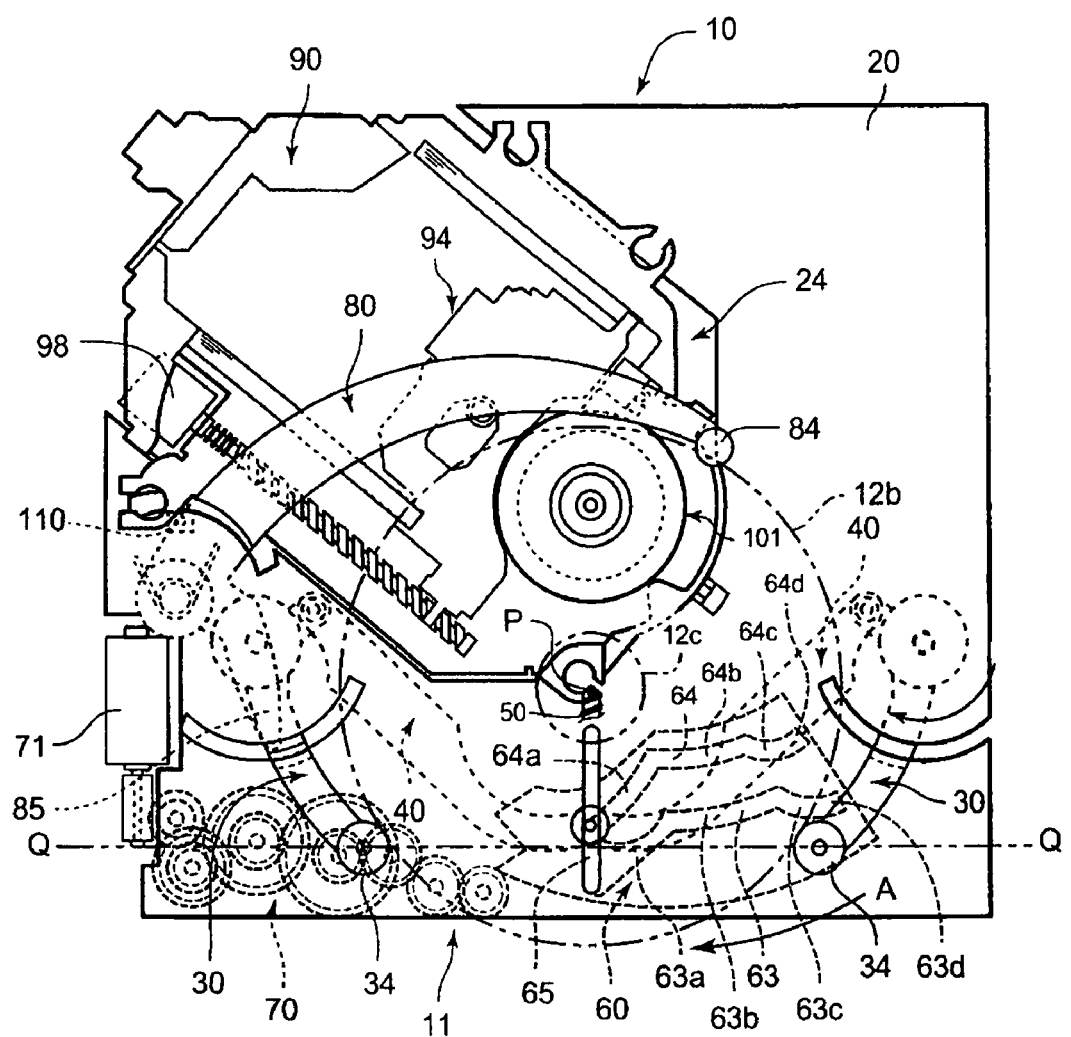

LOADING MECHANISM AND DISC PLAYER USING THE LOADING MECHANISM

TECHNICAL FIELD

The present invention relates to a loading mechanism and a disc player with the loading mechanism.

BACKGROUND ART

In general, a disc player such as sound equipment (car audio and the like), car navigation equipment and the like is configured so that a user can supply a disc such as CD/DVD and the like from outside to inside. At an occasion of such internal supply, the disc player performs loading operations of a disc. In order to realize that loading operations, the disc player comprises a loading mechanism.

A typical loading mechanism has a roller applied to a disc, the length of the roller being longer than the diameter of the disc. The roller presses the lower side of the disc and a disc guide presses the upper side of the disc. The disc is nipped by the roller and the disc guide and when the roller is rotated in that state, a disc can be conveyed inside the disc player.

Here, such type of a disc player includes the one disclosed in Japanese Patent Application Laid-Open No. 2003-16710 (see the paragraph No. 0005, etc.). In addition, there is a type of loading mechanism without the above described roller and a representative example thereof includes the one disclosed in Japanese Patent Application Laid-Open No. 2002-117604 (see the paragraph No. 0030, FIG. 1, FIG. 2, etc.). That type of loading mechanism conveys a disc with two swinging bodies and two guiding bodies.

DISCLOSURE OF THE INVENTION

Here, in order to establish multifunctional technologies on a disc player, it is desired that a loading mechanism of a type with a roller disclosed in the above described Japanese Patent Application Laid-Open No. 2003-16710 can be designed to be as this as possible. However, such a loading mechanism is configured to adopt a disc guide to be arranged above a disc. Therefore, a certain thickness dimension hampers the design of a thinner disc player.

In addition, a loading mechanism of a type with a roller is configured so that the roller is arranged on the lower side of the disc and, moreover, vertical movements of the roller are required upon chucking the disc. Therefore, it is necessary to secure space for chucking, which also makes it difficult to attain a thin and flat disc player. In addition, a separate mechanism to move up and down the roller is required, which makes the loading mechanism complicated. Moreover, there is also a problem that the upper side of the disc is pressed onto the disc guide and, therefore, the disc is likely to be scratched.

In addition, a normally used disc such as CD/DVD and the like includes the 8-cm disc and the 12-cm disc. A mechanism for identifying the disc type and changing the centering position of the disc is required. Accordingly, the mechanism becomes complicated and makes it difficult to realize a thin disc player. Here, it is possible to exclude the mechanism for identifying whether the disc measures 8 cm or 12 cm. In that case, a problem will arise that the conveyance of the 8-cm disc is impossible because the mechanism suitable for the 12 cm disc, which is most widely used, will be adopted.

In particular, it is difficult for a disc player of the type disclosed in Japanese Patent Application Laid-Open No. 2002-117604 to convey the 8-cm disc due to, for example, the position at which the guiding body is arranged. In addition, the type disclosed in Patent Document 2 comprises two swinging bodies and two guiding bodies and the problem that the upper and lower surfaces of a disc are damaged with the guiding bodies is unsolved.

In addition, in a disc player of a type without a roller disclosed in Japanese Patent Application Laid-Open No. 2002-117604, it is necessary for a user to insert a disc in the disc player. Such an inserting operation is occasionally bothersome. In addition, once the disc is ejected, in order to bring in the disc again, it is necessary for a user to insert a disc using hands again. Therefore, reloading performed by a disc player with a roller is not feasible and usability is not very good. In addition, in the configuration disclosed in Japanese Patent Application Laid-Open No. 2002-117604, a disc is ejected only in the state that a large portion still remains inside the disc player. That is, the ejection amount of the disc is not large enough, making takeout operations troublesome.

The present invention is attained based on the above described circumstances. An object thereof is to provide a loading mechanism which can be made thin and flat; can be designed in a simplified mechanism; hardly damages a disc; and can identify a disc diameter well and to provide a disc player with this loading mechanism.

In order to solve the above described problems, the present invention includes a loading mechanism conveying discs of different diameters comprising a driving source; a first arm member rotating about a first fulcrum as a center; a second arm member rotating about a second fulcrum as a center; a cam mechanism rotating at least one of the first arm member and the second arm member by driving force generated by the driving source and by that rotation retaining and sending in the outer circumferential edge of the disc of respectively different diameters; and a third arm member rotating about a third fulcrum as a center; rotating irrespective of the first arm member and the second arm member; applying, to the disc, bias force opposing a sending-in movement of the disc by bias means; and retaining the outer circumferential edge of the disc, wherein, when the center portion of the disc overpasses a line obtained by connecting a contact portion of the first arm member to the disc and a contact portion of the second arm member to the disc toward the sending-in side of the disc, the retainment and conveyance of the disc by the first arm member, the second arm member and the third arm member are carried out.

In addition, as an embodiment, the first arm member and the second arm member are linked by a link mechanism and thereby operate in conjunction with each other.

Moreover, as an embodiment, the link mechanism is comprised of two link levers and a link connection axis linking those link levers; the cam mechanism is provided with a plurality of cam grooves, each of which is linked to each other, corresponding with the retainment and sending-in of the disc of different diameters; the link connection axis is inserted into the cam groove; the link connection axis slides inside the cam groove and thereby the link levers rotate and the rotations of the first arm member and the second arm member are caused in conjunction with the rotation of those link levers and thereby the retainment and sending-in of the disc of different diameters are carried out.

In addition, as an embodiment, the link connection axis is inserted through a link guide groove formed in a main chassis where respective mechanisms are installed.

Moreover, as an embodiment, the cam groove comprises a sending-in cam part sending in the disc by rotating the first arm member and the second arm member; a retaining cam part carrying out positional retainment of the first arm member and the second arm member in a centering position of the disc after the disc is sent in; and a releasing cam part releasing a the first arm member and the second arm member from retaining the disc after the disc is sent in and after a chucking of the disc to a turntable is carried out.

In addition, as an embodiment, a large diameter disc and a small diameter disc are present for a disc; and the cam mechanism is provided with a large diameter disc cam groove corresponding with the large diameter disc and a small diameter disc cam groove corresponding with the small diameter disc.

Moreover, as an embodiment, the third arm member has a disc retaining part retaining the disc and a release lever part stretching toward a different direction from a direction the disc retaining part stretches; the cam mechanism has a holding part, by bumping against the release lever part, rotating the third arm member and releasing the third arm member from a disc retaining state.

In addition, as an embodiment, the holding part has a first holding part for pushing in the release lever part at a rotary position where the third arm member retains the large diameter disc after sending in the large diameter disc; and a second holding part for pushing in the release lever part at a rotary position where the third arm member retains the small diameter disc after sending in the small diameter disc.

Moreover, as an embodiment, the first holding part and the second holding part are formed from a same side in the cam mechanism; and the third arm member is pushed by the side and thereby caused to rotate to a same position for the large diameter disc and the small diameter disc and comes into a withdrawn state of not contacting either of the large diameter disc and the small diameter disc.

In addition, as an embodiment, driving force generated by the driving source is transmitted to a loading gear train comprised of a plurality of gears; and the cam mechanism is provided with an external peripheral gear meshed with a last stage gear of the loading gear train.

Moreover, as an embodiment, respective inventions of the above described loading mechanism are applied to a disc player.

Another aspect of the present invention for solving the above described problems is a loading mechanism conveying discs of different diameters, characterized by comprising: a driving source; a first arm member rotating about a first fulcrum as a center; a second arm member rotating about a second fulcrum as a center; a cam mechanism rotating at least one of the first arm member and the second arm member by driving force generated by the driving source and by that rotation retaining and sending in the outer circumferential edge of the disc of respectively different diameters; and a third arm member rotating about a third fulcrum as a center; rotating irrespective of the first arm member and the second arm member; applying, to the disc, bias force opposing a sending-in movement of the disc by bias means; and retaining the outer circumferential edge of the disc; and a conveyance roller rotated by the driving source and is arranged in a position of not overlapping with a projection plane in a normal direction of the disc at the completion point of bringing in the disc.

In addition, as an embodiment, the conveyance roller is arranged in a state of being biased to one side in the width direction of a base body in which the conveyance roller is arranged.

Moreover, as an embodiment, an end portion of the other side of the conveyance roller is positioned on one side in the width direction of the base body relative to a line passing through a center portion of a centering position of the disc that has been sent in, the line being along the direction of conveying the disc.

In addition, as an embodiment, the disc slides and is conveyed to a disc guide upon the rotation of the conveyance roller; that disc guide protrudes toward the conveyance roller; and the disc guide is arranged on the opposite side to the conveyance roller to nip the disc in the state of conveying the disc.

Moreover, as an embodiment, the disc guide is arranged in a position of not overlapping with the projection plane in the normal direction of the disc at the completion point of bringing in the disc.

In addition, as an embodiment, when the center portion of the disc overpasses a line obtained by connecting a contact portion of the first arm member to the disc and a contact portion of the second arm member to the disc toward the sending-in side of the disc, the retainment and conveyance of the disc by the first arm member, the second arm member and the third arm member are carried out.

Moreover, as an embodiment, the first arm member and the second arm member are linked by a link mechanism and thereby operate in conjunction with each other.

In addition, as an embodiment, the link mechanism is comprised of two link levers and a link connection axis linking those link levers; the cam mechanism is provided with a plurality of cam grooves, each of which is linked to each other, corresponding with the retainment and sending-in of the disc of different diameters; the link connection axis is inserted into the cam groove; the link connection axis slides inside the cam groove and thereby the link levers rotate and the rotations of the first arm member and the second arm member are caused in conjunction with the rotation of those link levers and thereby the retainment and sending-in of the disc of different diameters are carried out.

Moreover, as an embodiment, the link connection axis is inserted through a link guide groove formed in a main chassis where respective mechanisms are installed.

In addition, as an embodiment, the cam groove comprises a sending-in cam part sending in the disc by rotating the first arm member and the second arm member; a retaining cam part carrying out positional retainment of the first arm member and the second arm member in a centering position of the disc after the disc is sent in; and a releasing cam part releasing the first arm member and the second arm member from retaining the disc after the disc is sent in and after a chucking of the disc to a turntable is carried out.

In addition, as an embodiment, a large diameter disc and a small diameter disc are present for a disc; and the cam mechanism is provided with a large diameter disc cam groove corresponding with the large diameter disc and a small diameter disc cam groove corresponding with the small diameter disc.

Moreover, as an embodiment, the third arm member has a disc retaining part retaining the disc and a release lever part stretching toward a different direction from a direction the disc retaining part stretches; the cam mechanism has a holding part, by bumping against the release lever part, rotating the third arm member and releasing the third arm member from a disc retaining state.

In addition, as an embodiment, the holding part has a first holding part for pushing in the release lever part at a rotary position where the third arm member retains the large diameter disc after sending in the large diameter disc; and a second holding part for pushing in the release lever part at a rotary position where the third arm member retains the small diameter disc after sending in the small diameter disc.

Moreover, as an embodiment, the first holding part and the second holding part are formed from a same side in the cam mechanism and the third arm member is pushed by the side and thereby caused to rotate to a same position for the large diameter disc and the small diameter disc and comes into a withdrawn state of not contacting either of the large diameter disc and the small diameter disc.

In addition, as an embodiment, driving force generated by the driving source is transmitted respectively to a roller gear train comprised of a plurality of gears and a loading gear train comprised of a plurality of gears; the cam mechanism is provided with an external peripheral gear and that external peripheral gear is meshed with a last stage gear of the loading gear train; and the conveyance roller is provided with a roller shaft and a last stage gear of the roller gear is mounted on that roller shaft in a fixed manner.

Moreover, as an embodiment, respective inventions of the above described loading mechanism are applied to a disc player.

According to the present invention, it is possible to obtain a low-profile loading mechanism. In addition, it is possible that a loading mechanism can be simplified; discs are hardly damaged and a disc diameter is well identified. Moreover, by providing a conveyance roller, discs can be conveyed well.

BRIEF DESCRIPTION OF THE DRAWINGS

FIG. 7 is a plan view illustrating the state where the small diameter disc is inserted and an eject arm rotates significantly in the disc player of FIG. 1;

FIG. 11 relates to a variation of the disc player of FIG. 1 and is a plan view illustrating the state where the first holding part and the second holding part in the drive cam are formed from the same side and the large diameter disc is sent in;

FIG. 12 relates to a variation of the disc player of FIG. 1 and is a plan view illustrating the state where a first holding part and a second holding part in a drive cam are formed from the same side and the small diameter disc is sent in;

FIG. 29 relates to a variation of the disc player in FIG. 13 and is a plan view illustrating the state where the first holding part and the second holding part in the drive cam are formed from the same side and the large diameter disc is sent in; and FIG. 30 relates to a variation of the disc player in FIG. 13 and is a plan view illustrating the state where a first holding part and a second holding part in a drive cam are formed from the same side and the small diameter disc is sent in.

BEST MODES FOR CARRYING OUT THE INVENTION

Figure 1:
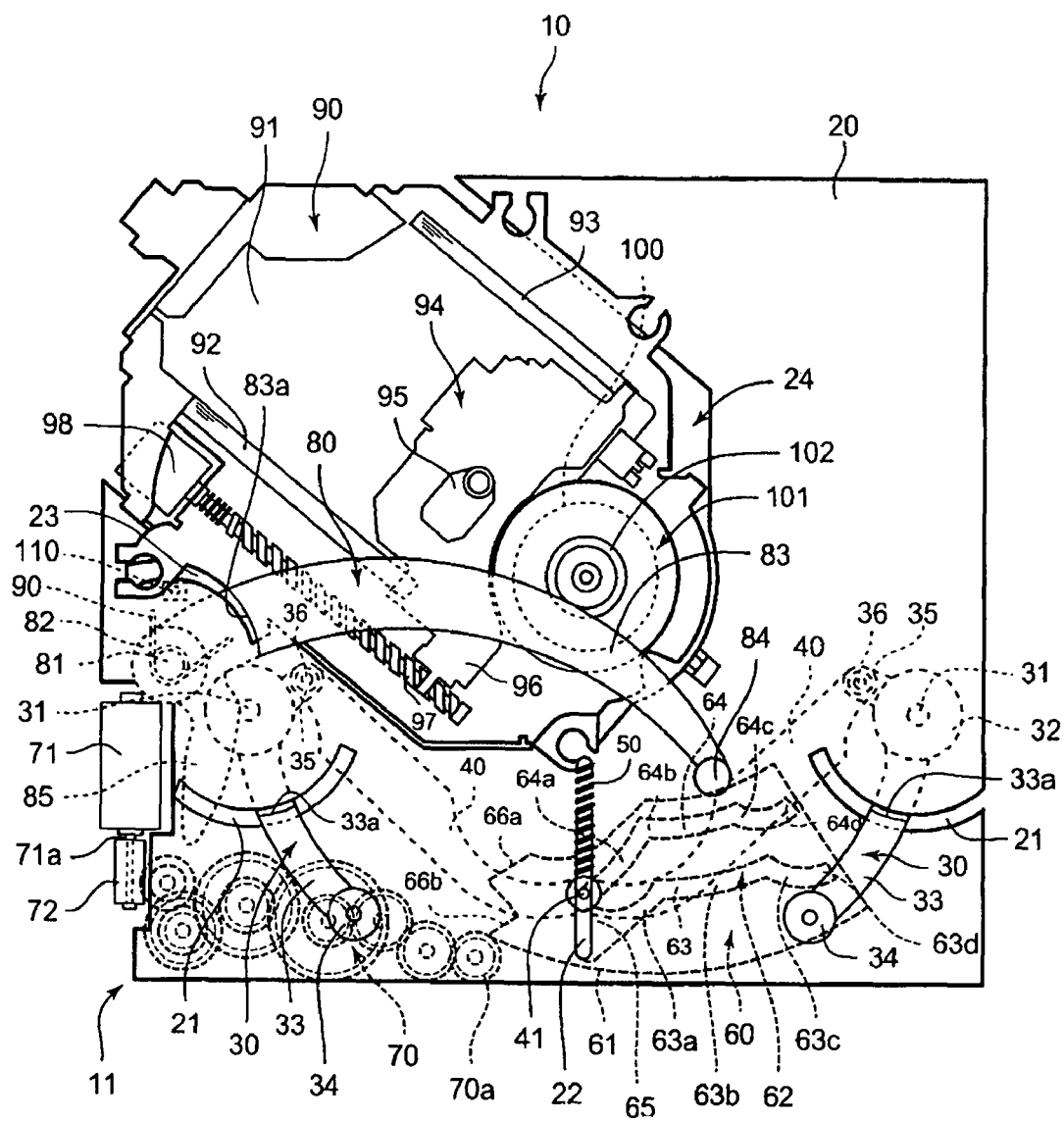
FIG. 1 is a plan view illustrating an internal configuration of a disc player related to an embodiment of the present invention.

A loading mechanism 11 and a disc player 10 with this loading mechanism 11 will be described below based on FIG. 1 to FIG. 9. FIG. 1 to FIG. 9 are plan views respectively illustrating internal configuration of the disc player 10 of the present invention. The disc player 10 replays a disc 12 (see FIG. 2 and others) such as a CD (Compact Disc) and a DVD (Digital Versatile Disc). However, the disc 12 will not be limited to a CD nor a DVD but can be a storage medium having a discoid shape such as a CD-R, a DVD-R, a DVD-RW and the like.

In addition, in the following description, among the discs 12 a disc having a large diameter of 12 cm will be described as a large diameter disc 12a and a disc having a small diameter of 8 cm will be described as a small diameter disc 12b. However, a disc that does not have to be distinguished from the others will be described simply as a disc 12.

In addition, in the following description, an upper side (upward side) refers to a side where the disc 12 resides relative to the turntable 101 as described below when the disc player 10 is arranged so that the disc 12 comes into a horizontal state. In addition, a lower side (downward side) likewise refers to a side where the turntable 101 resides relative to a disc 12. Moreover, a back side refers to a side where the disc 12 moves when the disc 12 is conveyed inside the disc player 10 and a front side refers to a side where the disc 12 is taken out.

The disc player 10 comprises a main chassis 20 as illustrated in FIG. 1 and others. The main chassis 20 is mounted and fixed on an outer chassis not illustrated in FIG. 1 and the others with a screw and the like. In addition, in the main chassis 20, a traverse unit 90 described below is supported with a damper/spring and the like so that the traverse unit 90 can be switchable between a floating state and a fixed state relative to the main chassis 20 with the aid of a mechanism (not illustrated) switching the floating state.

Here, such a configuration can be adopted for the outer chassis that the main chassis 20 is supported with the damper/spring and the like. In this case, it is possible to switch between the floating state and the fixed state of the main chassis 20 relative to the outer chassis.

Onto that main chassis 20, loading arms 30 and 30 as a first arm member and a second arm member (hereinafter, if necessary, the loading arms 30 and 30 will be collectively referred to loading arm 30.) are mounted rotatably. The loading arms 30 correspond with the first arm member and the second arm member. Two loading arms in total are provided on both sides in the width direction in FIG. 1 to FIG. 9. Those loading arms 30 are provided rotatably about rotary axes 31 as the center resided on the back side and the outer side in FIG. 1 to FIG. 9. Here, the rotary axes 31 correspond with a first fulcrum and a second fulcrum.

In addition, the loading arm 30 has an axis supporting part 32, an arm part 33 and a disc retaining part 34. Among them, the above described rotary axis 31 is arranged in the center of the axis supporting part 32. And the axis supporting part 32 is arranged around the rotary axis 31 so as to rotate around the rotary axis 31. Thereby the loading arm 30, which can rotate relative to the main chassis 20, is provided. In addition, the axis supporting part 32 is provided so that its planar shape forms a substantially discoid shape and has also an internally protruding part 35 protruding toward the inward side. A connecting axis 36 described below is attached to the internally protruding part 35.

In addition, the arm part 33 is a portion shaped like an arm with its planar shape depicting a curve stretching from the rotary axis 31 toward the internal and front side. For the present embodiment, the arm part 33 is formed to be bent in a step-like shape. And, that portion shaped like a step (step-like portion 33a) is configured to be located in (pass through) a guiding hole 21 formed in the main chassis 20. By such passing, a portion of the arm part 33 close to the rotary axis 31 is arranged on the reverse side of the main chassis 20. That is, in the present embodiment, the rotary axis 31 and the axis supporting part 32 are configured to be arranged on the reverse side of the main chassis 20 and a portion of the arm part 33 close to the disc retaining part 34 is configured to be arranged on the observe side of the main chassis 20.

Here, since the step portion 33a is positioned in the guiding hole 21, the rotary range of the loading arm 30 relative to the main chassis 20 is restricted.

In addition, the disc retaining part 34 is a portion for retaining an outer circumferential edge of the disc 12 when the disc 12 is conveyed. That disc retaining part 34 is a portion for retaining the disc 12 well at an occasion of conveying the disc 12 and the chucking described below. Here, forming the disc retaining part 34 into a pulley-like shape is one example of specific configurations in order to retain the disc 12 well. In the case of forming the disc retaining part 34 in such a pulley shape, it can be realized that the disc retaining part 34 retains only the outer circumferential edge of the disc 12 and the disc retaining part 34 comes into little contact with the upper surface and the lower surface of the disc 12.

Here, in order to retain the disc 12 well and avoid interference between the disc 12 and the arm part 33, the disc retaining part 34 having a pulley shape is provided to protrude upward from the arm part 33.

In addition, a link lever 40 is connected to the internally protruding part 35 protruding from the axis supporting part 32. The link lever 40 is rotatably connected to the loading arm 30 with the connecting axis 36. Two units of the link lever 40 in total are provided since they are respectively connected to a pair of the loading arms 30 and 30. The tips (the end portion apart from the connecting axis 36) of the pair of the link levers 40 and 40 (hereinafter the link levers 40 and 40 will be collectively referred to as a link lever 40) are provided to be stacked each other in the center portion in the width direction and in the portion on the front side of the disc player 10. In order to fix that stacked state, the tips of the link levers 40 and 40 are linked each other with a link connection axis 41.

Here, a link mechanism is comprised of the link levers 40 and 40 and the link connection axis 41.

As to the link connection axis 41, a portion on the downward side thereof is inserted into the link guide groove 22 provided in the main chassis 20. The link guide groove 22 is designed to have a length dimension corresponding with the movement of the tip portion of the link lever 40 in the backward direction at an occasion of conveying the disc 12 described below. In addition, the link guide groove 22 is designed to have a width dimension corresponding with the diameter of the link connection axis 41 and is provided so as not for the link connection axis 41 to jounce so much inside the link guide groove 22. Here, the link connection axis 41 is also inserted into the disc guide groove 62 of the drive cam 60 described below.

In addition, one end side of the spring member 50 is connected to the link connection axis 41. The other end side of the spring member 50 is connected to a fixed portion such as the main chassis 20. That spring member 50 provides the link connection axis 41 with bias force directed toward the back side of the disc player 10. Thereby, in the case where the link connection axis 41 is positioned in the connection guide groove 65 (link guide groove 22), the link connection axis 41 is provided with bias force in the direction of pulling in the link connection axis 41 toward the back side. With that force, the loading arms 30 and 30 are rotated in the closing direction.

In addition, the drive cam 60 is provided to slide relative to the main chassis 20 in an arc shape. The drive cam 60 is provided to slide in an arc shape along a circularly designed guide groove, which resides in the main chassis 20, not illustrated in the drawing. Here, the drive cam 60 is provided to slide circularly around the position that is located on the fore and right side from the center position of the disc 12 as described in FIG. 4 and the others. In addition, a cam configuration is comprised of the drive cam 60 and the link connection axis 41.

In the drive cam 60, the outer circumferential edge on the front side is provided with an external peripheral gear 61. The external peripheral gear 61 and a last stage gear 70*a* of a loading gear train 70 are meshed together. Here, the main chassis 20 is provided with a loading motor 71 and the loading gear train 70. A worm gear 72 is attached to the rotary axis 71*a* of the loading motor 71. Electric power is applied from outside to the loading motor 71. Thereby the loading motor 71 provides the loading gear train 70 with driving force through the worm gear 72.

The driving force applied to the loading gear train 70 is transmitted from the last stage gear 70*a* to the external peripheral gear 61. Thereby, the drive cam 60 is provided to slide via the external peripheral gear 61.

The drive cam 60 is provided with a disc guide groove 62. The disc guide groove 62 is provided with a large diameter disc cam groove 63 as a cam groove for guiding a large diameter disc 12*a*, a small diameter disc cam groove 64 as a cam groove for guiding a small diameter disc 12*b* and a connection guide groove 65 linking the large diameter disc cam groove 63 to the small diameter disc cam groove 64 and allowing a slide of the link connection axis 41. Here, the large diameter disc cam groove 63 is positioned closer to the front side in comparison with the small diameter disc cam groove 64. In addition, the connection guide groove 65 and the link guide groove 22 are arranged in an aligned manner in the vertical direction in the state where the disc 12 is not inserted into the disc player 10.

The large diameter disc cam groove 63 and the small diameter disc cam groove 64 are designed for the link connection axis 41 to slide inside the link guide groove 22. With such slide, the tip portion of the link lever 40 is caused to slide compulsorily along the link guide groove 22 as well. Due to the slide, the position of the connecting axis 36 on the back side of the link lever 40 changes as well. Thereby, the loading arm 30 is rotated. That is, the large diameter disc cam groove 63 and the small diameter disc cam groove 64 are designed for rotating the loading arm 30.

In order to realize such rotation of the loading arm 30, the large diameter disc cam groove 63 has a sending-in cam part 63*a*, a retaining cam part 63*b*, a releasing cam part 63*c* and a release maintaining cam part 63*d*. Among them, the sending-in cam part 63*a* is a portion connected to the connection guide groove 65 and is a portion located on the left side in the large diameter disc cam groove 63 in FIG. 1 and the others. That sending-in cam part 63*a* is formed toward the back side of the disc player 10 as it extends away further from the connection guide groove 65.

Thereby, when the drive cam 60 slides toward the left side in FIG. 1 and the others, the link connection axis 41 moves toward the back side by the function of the spring member 50 or push-in of inner walls of the large diameter disc cam groove 63. Thereby, the position of the connecting axis 36 of the link lever 40 changes to the back side as well and the rotation of the loading arm 30 in the direction of pulling in the disc 12 is realized.

In addition, the retaining cam part 63*b* is a portion connected to the sending-in cam part 63*a* and is a portion occupying substantially the center portion in the large diameter disc cam groove 63 in FIG. 1 and the others. The retaining cam part 63*b* is provided so as not to change the position of the link connection axis 41 inserted into the retaining cam part 63*b* in the link guide groove 22 even when the drive cam 60 slides circularly. Here, the length dimension of the retaining cam part 63*b* is sufficient for the disc 12 to be chucked well onto the turntable 101 while the drive cam 60 is sliding.

In addition, the releasing cam part 63*c* is a portion connected to the retaining cam part 63*b*. The releasing cam part 63*c* is formed to extend toward the front side of the disc player 10 as the releasing cam part 63*c* extends away further from the connection guide groove 65. Thereby, when the drive cam 60 slides toward the left side in FIG. 1 and the others, the link connection axis 41 is pushed toward the front side by the inner walls on the back side of the large diameter disc cam groove 63. Thereby the connecting axis 36 of the link lever 40 also changes its position to move toward the front side and thus the rotation for releasing the disc retaining part 34 from retaining the disc 12. Thereby, the state where the disc retaining part 34 is retaining the disc 12 is released.

Here, in order to make the disc 12 rotatable with the turntable 101, the releasing cam part 63*c* is provided to have the length dimension sufficient for the disc retaining part 34 to move to the position where the disc retaining part 34 and the disc 12 do not contact each other. However, the releasing cam part 63*c* has a length dimension necessary for a withdrawal of the disc retaining part 34 and therefore is shorter than the length dimension of the sending-in cam part 63*a* for sending in the disc 12.

In addition, the release maintaining cam part 63*d* is a portion connected to the releasing cam part 63*c*. Similar to the retaining cam part 63*b*, that release maintaining cam part 63*d* is provided not to change the position of the link connection axis 41 inserted into the release maintaining cam part 63*d* in the link guide groove 22 even when the drive cam 60 slides circularly. Here, the release maintaining cam part 63*d* is provided to be not so long and its length dimension is very shorter than the retaining cam part 63*b*.

In addition, the small diameter disc cam groove 64 is configured similar to the large diameter disc cam groove 63 and has a sending-in cam part 64*a*, a retaining cam part 64*b*, a releasing cam part 64*c* and a release maintaining cam part 64*d*. Here, respective portions of the small diameter disc cam groove 64 are functionally similar to corresponding portions of the large diameter disc cam groove 63 and only the disc 12 to be adopted as an object is changed from the large diameter disc 12*a* to the small diameter disc 12*b*. Therefore, descriptions on details thereof will be omitted.

In addition, in the drive cam 60, the left side edge thereof is provided with a first holding part 66*a* and a second holding part 66*b* as a holding part. The first holding part 66*a* and the second holding part 66*b* are portions for pushing in the release lever part 85 of an eject arm 80 described below. In order to realize such push-in, the first holding part 66*a* and the second holding part 66*b* protrude closer to the left side than the other portions of the drive cam 60 do in FIG. 1 and the others.

Here, the first holding part 66*a* is positioned on the back side of the left side end of the drive cam 60. And the second holding part 66*b* is positioned on the front side of the left side end of the drive cam 60. Each of the first holding part 66*a* and second holding part 66*b* is needed depending on the difference in the rotation distance of the eject arm 80 in the case of bringing in the large diameter disc 12*a* and the small diameter disc 12*b* respectively.

In addition, in order to push in the release lever part 85 well, inclination angles of the edges of the first holding part 66*a* and the second holding part 66*b* are directed from the bottom left to the top right in FIG. 1. In addition, the first holding part 66*a* and the second holding part 66*b* contact with the side edges on the front side of the release lever part 85 (see FIG. 5 and FIG. 9). By sliding the drive cam 60 to the left side in FIG. 1 and the others in such a contact state, the first holding part 66a and the second holding part 66b push in the tip portion of the release lever part 85 to the back side. Thereby a counterclockwise rotation of the eject arm 80 as illustrated in FIG. 1 and the others is realized.

In addition, the main chassis 20 is provided with a rotatable eject arm 80 corresponding with the third arm member. An eject spring 86 as biasing means is provided between the eject arm 80 and the main chassis 20. One end of the eject spring 86 is attached to the main chassis 20 and the other end is attached to the eject arm 80. The eject spring 86 applies, to the eject arm 80, bias force in the direction of pushing the disc 12 toward the ejecting side.

Similar to the loading arm 30, the eject arm 80 has an axis supporting part 82, an arm part 83 and a disc retaining part 84. In addition thereto, the eject arm 80 is provided with a release lever part 85 as well. Among them, a rotary axis 81 is arranged in the center of the axis supporting part 82. The axis supporting part 82 is arranged around that rotary axis 81 to establish a free rotation. Thereby, the eject arm 80 is provided rotatably relative to the main chassis 20.

Here, in the present embodiment, the axis supporting part 82 of the eject arm 80 is provided in the vicinity of the loading motor 71. In addition, in the present embodiment, similar to the arm part 33 of the load arm 30, the arm part 83 of the eject arm 80 is also formed to be bent in a step-like shape. That portion of the step-like shape (step portion 83a) is arranged in a guiding hole 23 formed in the main chassis 20 and the portion of the arm part 83 close to the rotary axis 81 is configured to be arranged on the reverse side of the main chassis 20.

Figure 4:
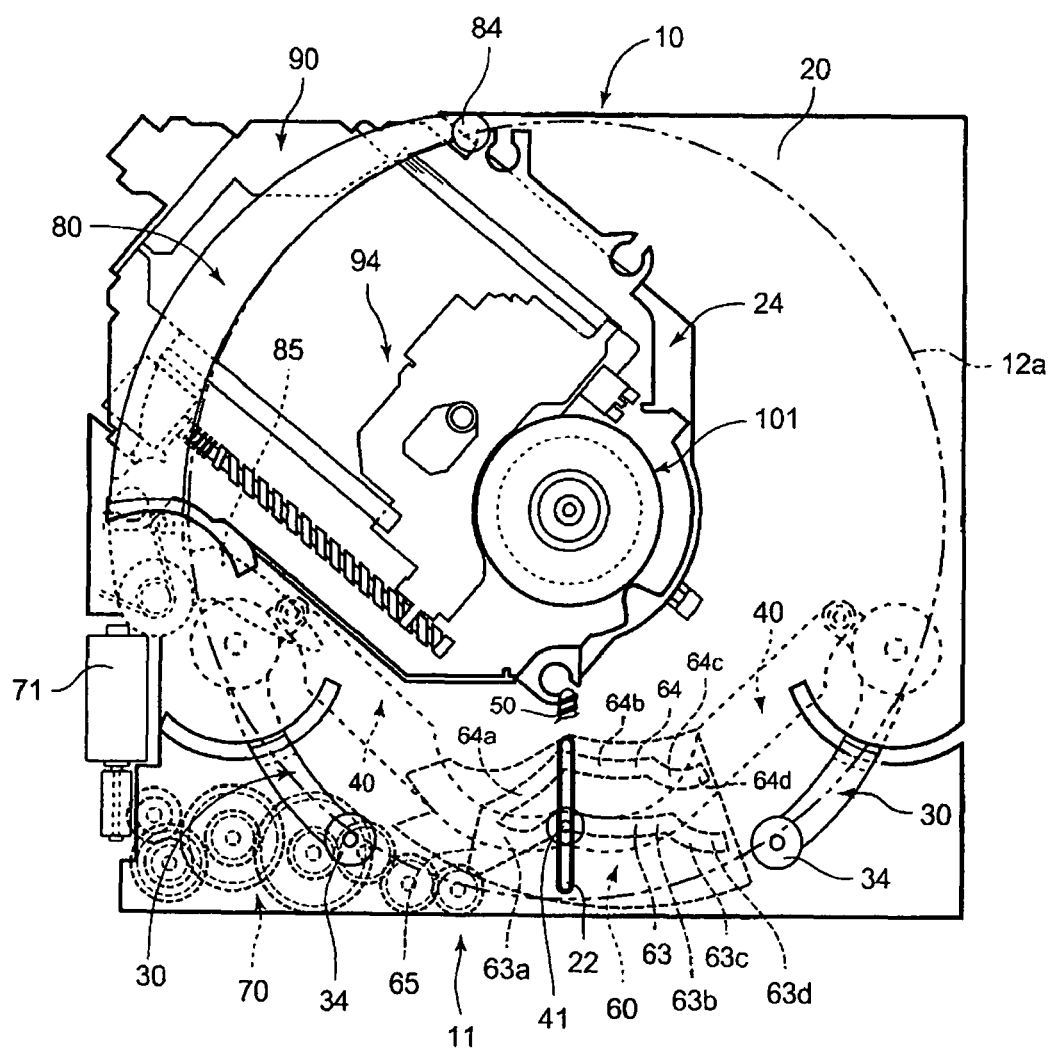
FIG. 4 is a plan view illustrating the state where centering of the large diameter disc is carried out in the disc player of FIG. 1.

In addition, as illustrated in FIG. 1 and the others, on the upper side of the main chassis 20, the arm part 83 has a curvature part forming a convex shape toward the back side. Thereby, the interference between the arm part 83 and the disc 12 is avoided. The arm part 83 is provided to be longer than the arm part 33 of the loading arm 30. A length dimension of that arm part 83 is set such that the disc retaining part 84 can contact with the outer circumferential edge of the disc 12 upon centering the disc 12 as illustrated in FIG. 4 and the like and that the disc retaining part 84 can be set apart from the outer circumferential edge of the disc 12.

In addition, the disc retaining part 84 is similar to the disc retaining part 34 of the above described loading arm 30. The disc 12 is retained at three points by the disc retaining part 84 and the two disc retaining parts 34 and 34 of the loading arm 30. Here, in the state where disc 12 is not inserted, the step portion 83a contacts with the end of the guiding hole 23. Thereby, the disc retaining part 84 is located on the forefront side and nevertheless being positioned at a stop position inside the disc player 10.

Figure 2:
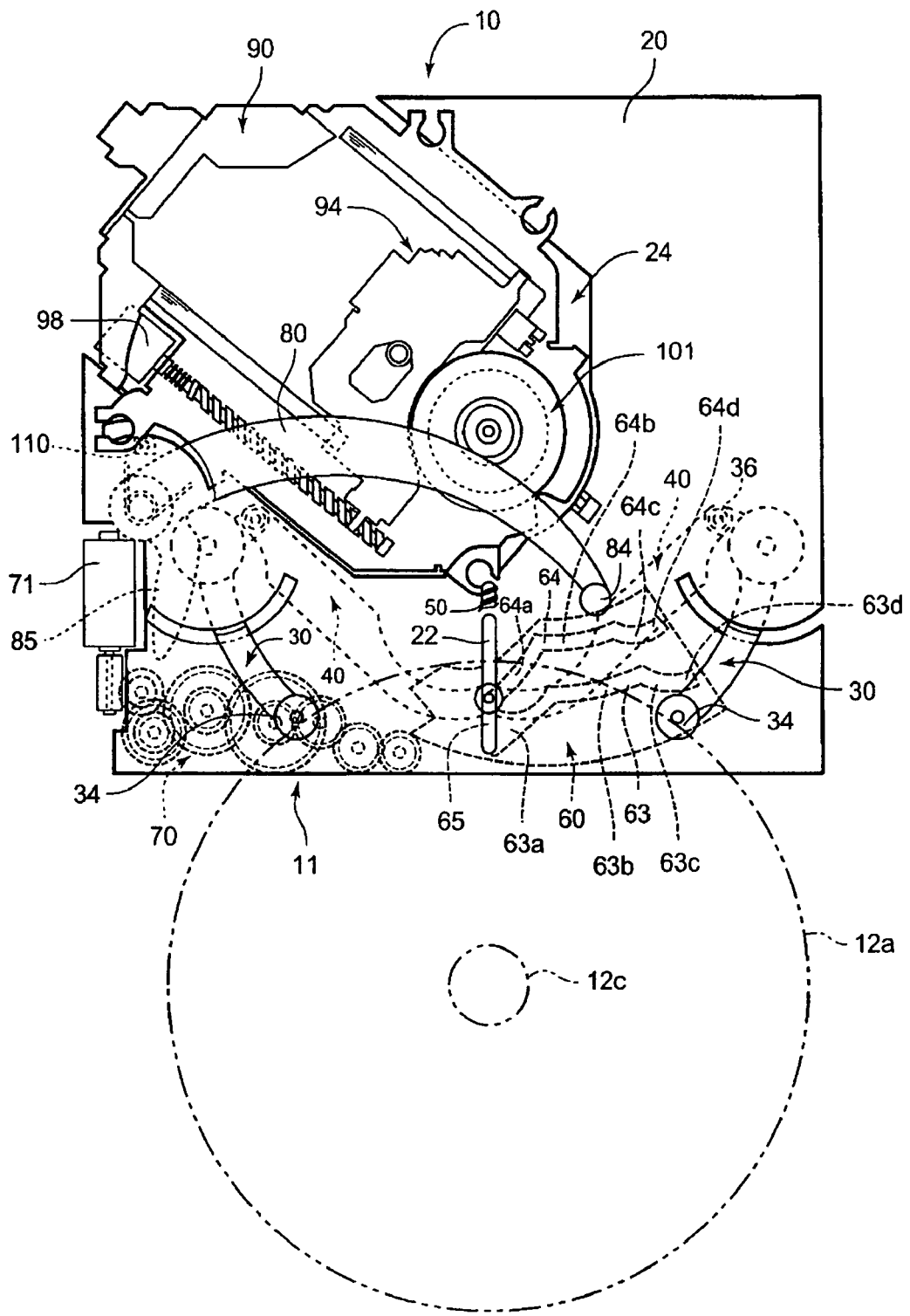
FIG. 2 is a plan view illustrating the state where a large diameter disc comes in contact with a disc retaining part of a loading arm in the disc player of FIG. 1.
Figure 6:
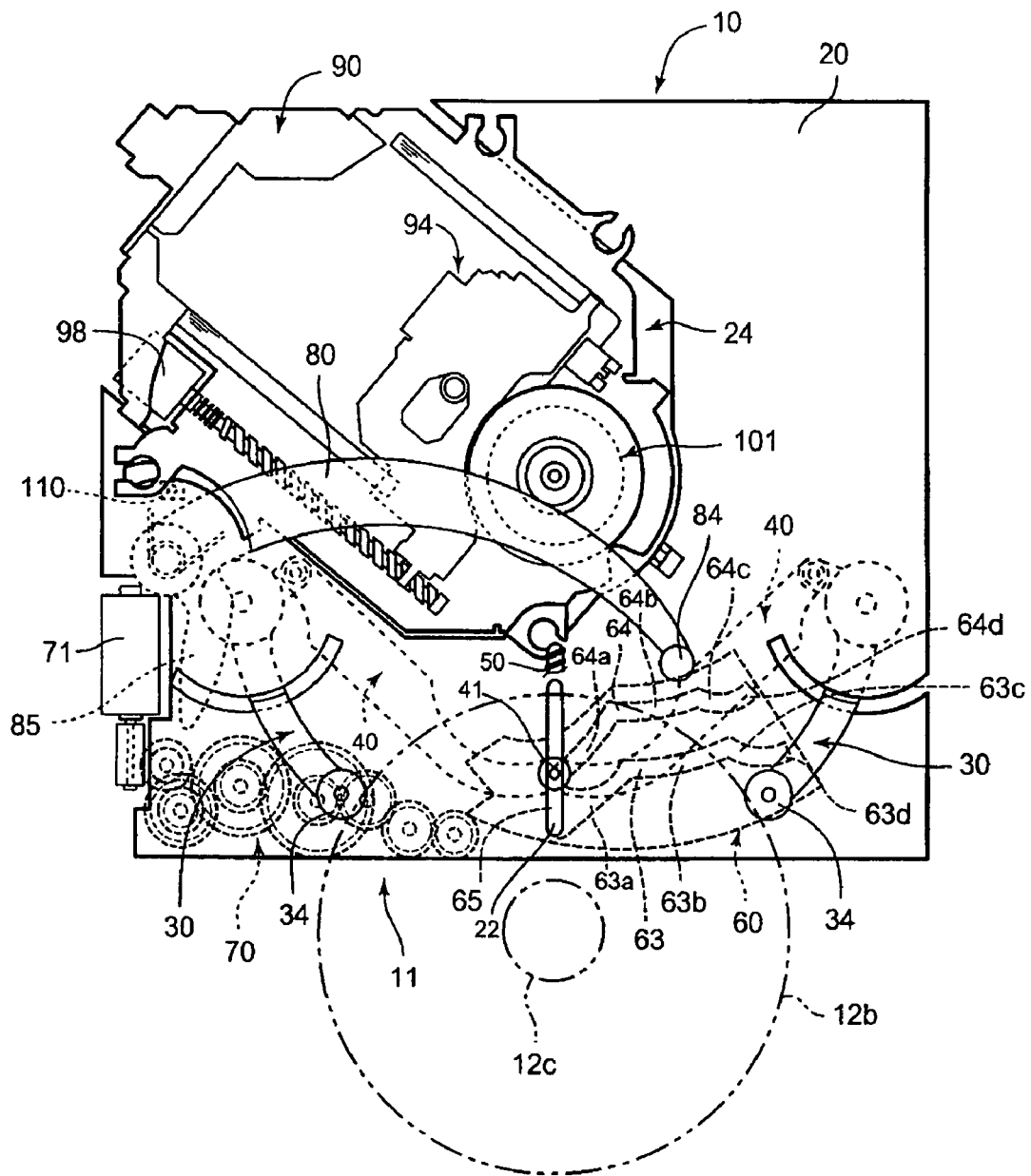
FIG. 6 is a plan view illustrating the state where a small diameter disc comes in contact with a disc retaining part of a loading arm in the disc player of FIG. 1.

Moreover, the release lever part 85 stretches from the axis supporting part 82. The release lever part 85 stretches toward the front side when the disc 12 is not inserted as illustrated in FIG. 1, FIG. 2 and FIG. 6. Here, the arm part 83 stretches toward the width direction. The disc 12 is inserted in this state and the disc retaining part 84 contacts to the outer circumferential edge of the disc 12 and the arm part 83 rotates gradually. Thereby, the release lever part 85 gradually protrudes toward the internal side in the width direction of the disc player 10 until it reaches a position to contact with the first holding part 66a.

Here, in the present embodiment, the release lever part 85 has a curvature part so as not to interfere with the loading motor 71. That curvature shape is provided so as to form a convex shape toward the center in the width direction of the disc player 10 from the outward side of the disc player 10.

The tip portion of the release lever part 85 comes into contact with the above described first holding part 66a. In order to enable such contact, the release lever part 85 is provided in the position approximately as high as the drive cam 60 on the reverse side of the main chassis 20.

In addition, the main chassis 20 is provided with a cutout part 24 formed obliquely from the top left to the bottom right in FIG. 1 and the others. A traverse unit 90 is arranged in that cutout part 24. The traverse unit 90 has a traverse chassis 91. A principal axis 92 and a second axis 93 are attached to that traverse chassis 91, with which an optical pickup unit 94 comprising an optical pickup 95 are slidably provided along the principal axis 92 and second axis 93. Here, in the optical pickup 95, a protruding portion 96 is provided to protrude toward the front side further than the principal axis 92. From that protruding portion 96, an opposite nail (not illustrated in the drawing) protrudes downward and the nail meshes with a lead screw 97. The lead screw 97 is driven to rotate by a thread motor 98. That rotation makes the optical pickup unit 94 contact with and break contact with the turntable 101.

In addition, a spindle motor 100 is mounted on the traverse chassis 91 and the turntable 101, on which the disc 12 is chucked, is attached to the rotary axis of that spindle motor 100. Here, the turntable 101 is provided with a convex portion 102. That convex portion 102 is a portion to be inserted into the center hole 12c of the disc 12 and is configured to be able to retain the disc 12 after the insertion. In addition, the traverse unit 90 is mounted onto an elevator mechanism not illustrated in the drawing, by which the traverse unit 90 can be moved up and down along the vertical direction. When the traverse unit 90 is elevated by the operation of the elevator mechanism, the disc 12 is chucked on the turntable 101.

In addition, as illustrated in FIG. 1 and the others, the main chassis 20 is provided with an arm detection switch 110. The arm detection switch 110 detects the rotation of the eject arm 80. That is, the eject arm 80 resides on the front side when the disc 12 is not inserted, the eject arm 80 is arranged to push in the arm detection switch 110 when the disc 12 is pushed to rotate the eject arm 80 counterclockwise to a predetermined extent in FIG. 1, FIG. 2 and the others. In addition, the eject arm 80 is arranged to push in the arm detection switch 110 at the time of ejecting the disc 12 as well.

That arm detection switch 110 is connected to the loading motor 71 through a control circuit not illustrated in the drawing. It is configured that the arm detection switch 110 is turned on to drive the loading motor 71 and the arm detection switch 110 is turned off to stop driving the loading motor 71.

The loading mechanism 11 configured as described above and operations of the disc player 10 with that loading mechanism 11 will be described below.

At first, operations to bring in the large diameter disc 12a will be described. The large diameter disc 12a is inserted into the disc player 10. Then the outer circumferential edge of the large diameter disc 12a comes in contact with the disc retaining parts 34 and 34 as illustrated in FIG. 2. At this time, the disc retaining parts 34 and 34 retain the outer circumferential edge of the large diameter disc 12a. This contact state is maintained and the large diameter disc 12a is pushed in further as it opposes to bias force of the spring member 50. At this time, accompanied with the insertion of the large diameter disc 12a, a pair of the loading arms 30 and 30 is rotated with the rotary axis 31 being as a fulcrum, increasing the mutual distance of each arm.

In addition, when the push-in progresses to a predetermined extent, the outer circumferential edge on the back side of the large diameter disc 12a comes in contact with the disc retaining part 84 of the eject arm 80. At this time, the large diameter disc 12a comes into the state of being retained by three disc retaining parts 34, 34 and 84.

Figure 3:
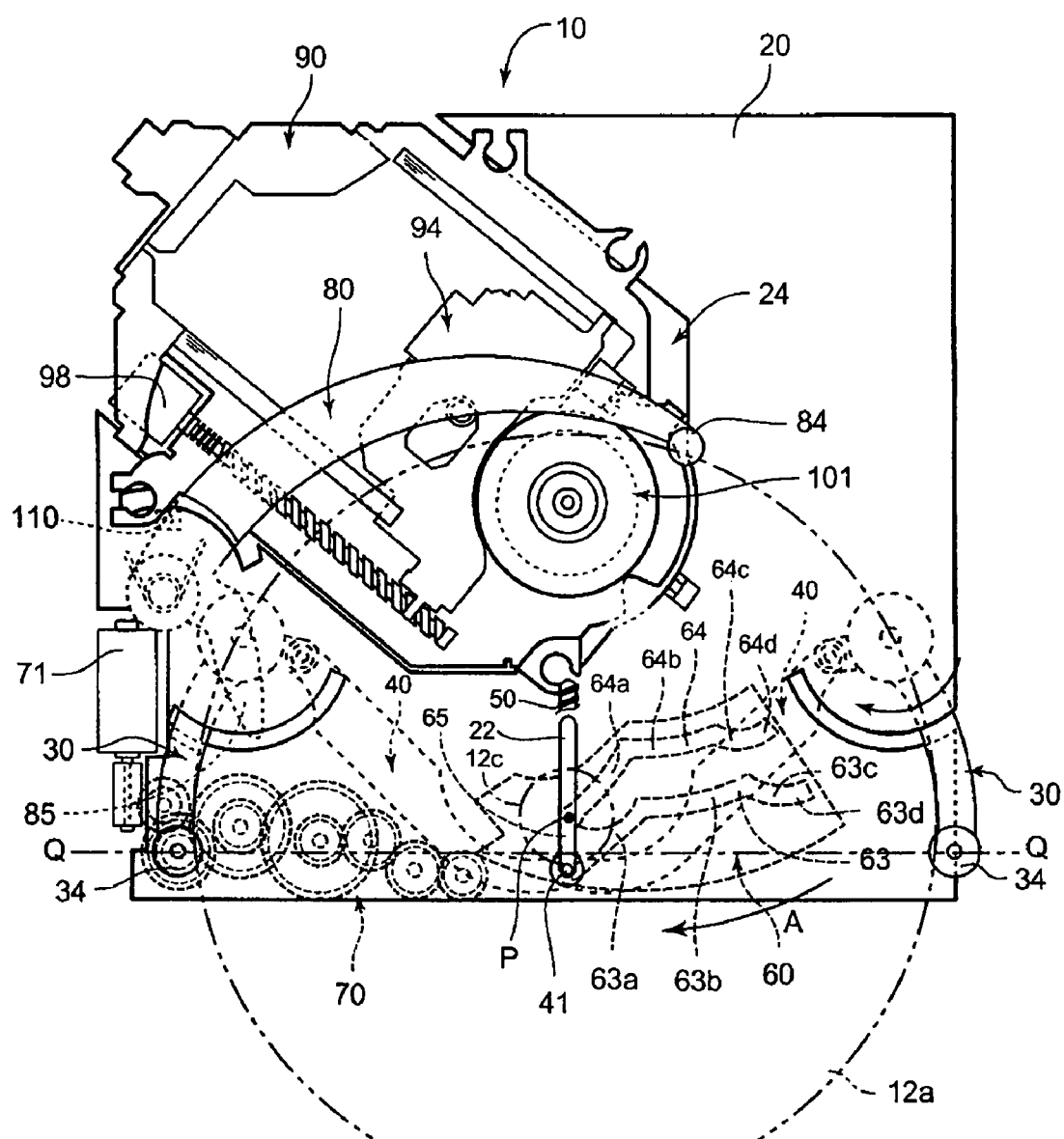
FIG. 3 is a plan view illustrating the state where the large diameter disc is inserted and an eject arm rotates significantly in the disc player of FIG. 1.

When a user further pushes in the large diameter disc 12a toward the back side, the link connection axis 41 is located in the vicinity of the front side edge of the connection guide groove 65 as illustrated in FIG. 3. At this time, the arm detection switch 110 is pushed in by the rotation of the eject arm 80. Then, the loading motor 71 starts to drive so that the loading gear train 70 is also driven. And driving force is transmitted to the external peripheral gear 61 meshed with the last stage gear 70a of the loading gear train 70.

Here, a push-in timing of the arm detection switch 110 is after the center point P of the large diameter disc 12a has passed a Q-Q line (the Q-Q line is a line obtained by connecting the contact points of the two loading arms 30 and 30 with the large diameter disc 12a) illustrated in FIG. 3. At this time, the center point P is positioned inside a figure (triangle) obtained by connecting the contact points of the large diameter disc 12a and the disc retaining parts 34, 34 and 84. That is, when the center point P of the large diameter disc 12a overpasses the Q-Q line toward the sending-in side, the large diameter disc 12a is sent in by the bias force of the eject spring 86. Here, the small diameter disc 12b described below is inserted in a similar manner. In addition to sending in the disc 12, the ejection of the disc 12 and the retainment of the disc 12 are performed in the state that the center point P is beyond the Q-Q line.

Then the drive cam 60 starts to slide toward the left side (in the arrowed direction A) in FIG. 3. By this slide, the link connection axis 41 goes on progressing inside the sending-in cam part 63a in the large diameter disc cam groove 63. Then, the link connection axis 41 is pushed in by the bias force of the spring member 50 or the inner wall of the sending-in cam part 63a and moves toward the back side of the disc player 10 as the drive cam 60 moves toward the left side. By this movement, the tip end of the link lever 40 is moved toward the back side as well. Here, as the length dimension from the tip end of the link lever 40 to the connecting axis 36 is fixed and the length dimension from the rotary axis 31 of the loading arm 30 to the connecting axis 36 is also fixed, the position of the connecting axis 36 is uniquely determined in the case where the link connection axis 41 moves. If the link connection axis 41 moves toward the back side, the position of the connecting axis 36 is moved so that the disc retaining parts 34 and 34 rotates in the direction of coming closer to each other.

Thus, as the drive cam 60 slides toward the left side, the loading arm 30 rotates in the direction that the disc retaining parts 34 and 34 come closer to each other. And the large diameter disc 12a is sent inside the disc player 10. At this time, the large diameter disc 12a opposes bias force applied by the eject spring 86 via the eject arm 80 and progresses toward the back side of the disc player 10.

When the drive cam 60 slides leftwards to a predetermined extent, the link connection axis 41 exits from the sending-in cam part 63a and enters the retaining cam part 63b. At this time, as illustrated in FIG. 4, the large diameter disc 12a is in the state (centering state) for enabling a disc clamp where its center is positioned above the turntable 101. While the link connection axis 41 is in the retaining cam part 63b, an elevator mechanism not illustrated in the drawing is activated to elevate the traverse unit 90 upwards. Thereby, the convex portion 102 of the turntable 101 is inserted into the center hole 12c of the large diameter disc 12a to complete the chucking of the large diameter disc 12a.

In addition, after the chucking is completed and the drive cam 60 slides further to a predetermined extent, the link connection axis 41 exits from the retaining cam part 63b and enters the releasing cam part 63c. When the link connection axis 41 enters the releasing cam part 63c, the link connection axis 41 is pushed by the inner wall on the back side of the releasing cam part 63c and is slid toward the front side. Then, the loading arm 30 is caused to rotate so that the disc retaining parts 34 and 34 are mutually set apart as the link connection axis 41 moves to the front side. In addition, the first holding part 66a of the drive cam 60 bumps against the release lever part 85 and gradually pushes in this release lever part 85.

Figure 5:
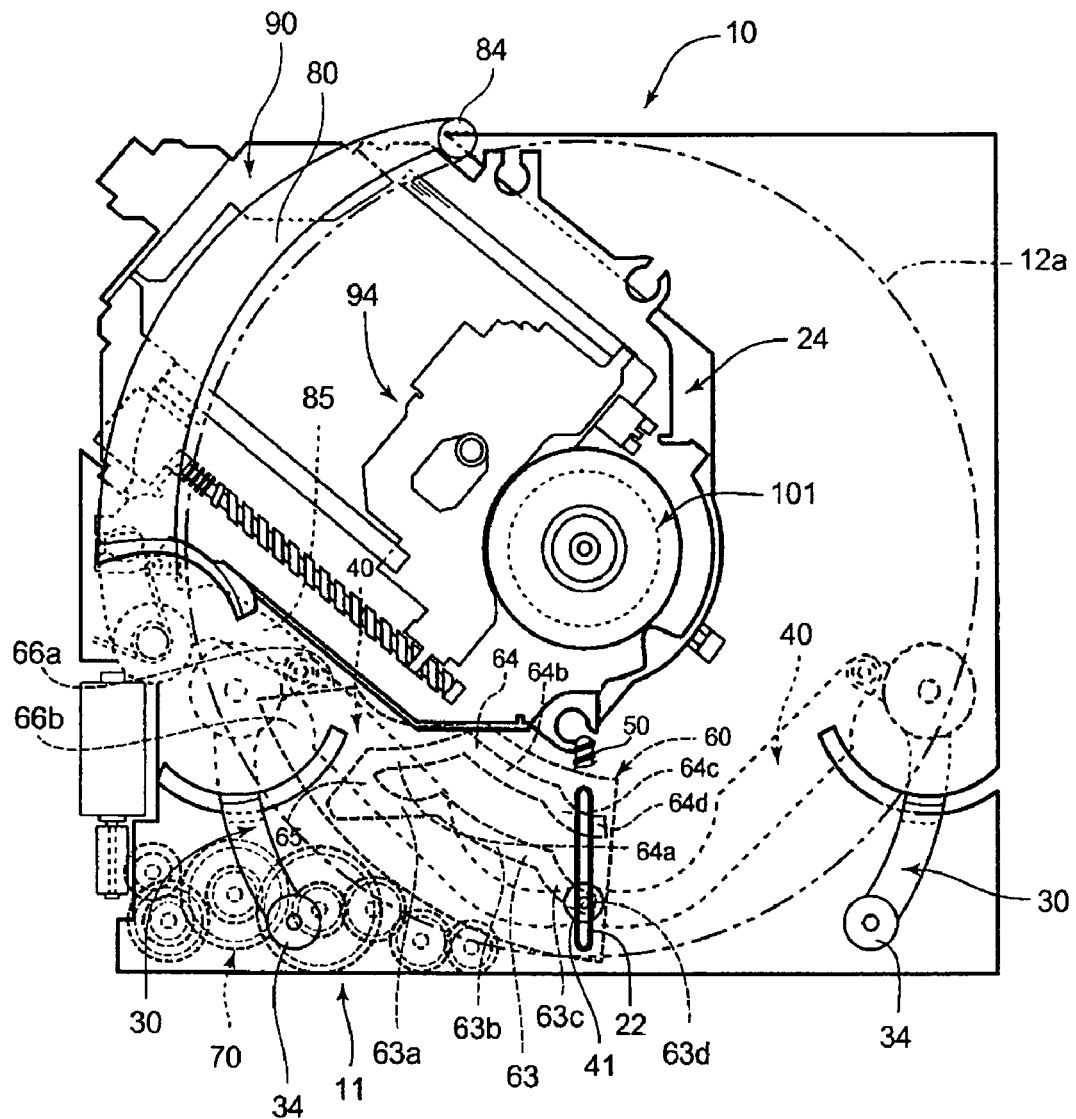
FIG. 5 is a plan view illustrating the state where a disc retaining part is set apart from an outer circumferential edge of the large diameter disc in the disc player of FIG. 1.

When the link connection axis 41 exits from the releasing cam part 63c and enters the release maintaining cam part 63d and reaches its right side end, the first holding part 66a pushes in the release lever part 85. Thereby the eject arm 80 is caused to rotate so that the disc retaining part 84 does not contact with the outer circumferential edge of the large diameter disc 12a. Accompanied with this, the disc retaining parts 34 and 34 are released from retaining the outer circumferential edge of the large diameter disc 12a and the disc retaining parts 34, 34 and 84 do not contact with the large diameter disc 12a as illustrated in FIG. 5.

Here, concurrently with the disc retaining parts 34, 34 and 84 being released, the traverse unit 90 is moved to the position for replaying the large diameter disc 12a by an elevator mechanism (not illustrated) in conjunction with the movement of the drive cam 60. In addition, in the case where the link connection axis 41 enters the release maintaining cam part 63d and the drive cam 60 approaches to the left side end of the slide, the drive cam 60 pushes in a position detection switch not illustrated in the drawing being present on the main chassis 20. Thereby, the drive of the loading motor 71 is stopped and the drive cam 60 stops sliding.

Thereafter, the spindle motor 100 is driven and thereby the turntable 101 is rotated and the optical pickup 95 is activated concurrently. Thereby replaying the disc by reading information stored in the large diameter disc 12a is enabled.

Subsequently, operations of ejecting the large diameter disc 12a will be described. In this case, at first a user, for example, pushes an eject button not illustrated and a control command corresponding with ejection is generated. A current for the rotation corresponding with ejection is applied to the loading motor 71 through a control circuit not illustrated in the drawing. Thereby, the loading gear train 70 is driven to transmit driving force, which is opposite to the above described driving force, to the external peripheral gear 61 meshed with the last stage gear 70a of the loading gear train 70.

Thereby, the drive cam 60 starts to slide toward the right side (direction opposite to the direction of an arrow A in FIG. 3) in FIG. 5. Prior to that slide or concurrently with that slide, the traverse unit 90 is moved to the position for performing a chucking release of the large diameter disc 12a by the elevator mechanism not illustrated in the drawing.

After this state is established, when the drive cam 60 slides toward the right side further, the link connection axis 41 enters from the release maintaining cam part 63d to the releasing cam part 63c. Then the link connection axis 41 is pushed in by the bias force of the spring member 50 or by the inner wall on the front side of the releasing cam part 63c and moves toward the back side. This progress brings the disc retaining part 34 into the state of retaining the outer circumferential edge of the large diameter disc 12a. On the other hand, when the drive cam 60 slides to the right side, the first holding part 66a of the drive cam 60 is gradually set apart from the release lever part 85 of the eject arm 80. Thereby, in receipt of bias force by the eject spring 86, the eject arm 80 will come into the state of applying the bias force to the external peripheral portion of the large diameter disc 12a. In addition, substantially at the same timing as a pair of the disc retaining parts 34 and 34 retain the outer circumferential edge, the disc retaining part 84 of the eject arm 80 will come into the state of retaining the external periphery part of the large diameter disc 12a by the above described bias force of the eject spring 86.

Moreover, when the drive cam 60 further slides, the link connection axis 41 enters inside the retaining cam part 63b. In the slide of the drive cam 60 to the right side, while the link connection axis 41 is in the retaining cam part 63b, an elevator mechanism not illustrated in the drawing is activated to descend the traverse unit 90. At this time, since the outer circumferential edge of the large diameter disc 12a is retained by the disc retaining parts 34, 34 and 84 (see FIG. 4), the descent of the traverse unit 90 disengages the convex portion 102 of the turntable 101 from the center hole 12c of the large diameter disc 12a. Thus, the chucking state of the large diameter disc 12a to the turntable 101 is released.

After the completion of the chucking release of the large diameter disc 12a, the link connection axis 41 exits from the retaining cam part 63b and enters the sending-in cam part 63a. Then, the link connection axis 41 is pushed in by the inner wall on the back side of the sending-in cam part 63a this time. Thereby, the link connection axis 41 moves toward the front side. Accompanied by such movements of the link connection axis 41, the loading arm 30 is caused to rotate through the link lever 40 in the direction of causing the disc retaining parts 34 and 34 to set apart each other. And, as the disc retaining parts 34 and 34 are gradually set apart each other, the large diameter disc 12a is gradually pushed out toward the front side by the bias force of the eject spring 86 via the eject arm 80.

By such push-in, when the center point P of the large diameter disc 12a has passed the Q-Q line (see FIG. 3) connecting contact points between a pair of the disc retaining parts 34 and 34 and the outer circumferential edge of the large diameter disc 12a, afterwards, the large diameter disc 12a is ejected toward the front side by the bias force of the eject spring 86 via the eject arm 80 (see FIG. 2). After the eject arm 80 rotates to a predetermined extent, the rotation of the eject arm 80 toward the front side is stopped with the step portion 83a contacting with the end part of the guiding hole 23 and the ejection of the large diameter disc 12a is stopped as well. At this time, the link connection axis 41 enters the connection guide groove 65. In addition, immediately prior to the rotation stop, the eject arm 80 stops pushing in the arm detection switch 110 and turns it off. Thereby, the driving of the loading motor 71 is stopped as well.

So far, operations in the case of bringing in/taking out the large diameter disc 12a have been described. Subsequently, operations in the case of bringing in/taking out the small diameter disc 12b will be described.

Similar to the case of bringing in the large diameter disc 12a, also in the case of bringing in the small diameter disc 12b, the outer circumferential edge of the small diameter disc 12b comes into contact with the disc retaining part 34 (see FIG. 6) and the contact state is maintained and the small diameter disc 12b is pushed in further. Then, accompanied by the insertion of the small diameter disc 12b, a pair of the loading arms 30 and 30 is rotated with the rotary axis 31 as a fulcrum such that the mutual distance widens. And the outer circumferential edge on the back side of the small diameter disc 12b comes in contact with the disc retaining part 84.

A user pushes in the small diameter disc 12b further and then the eject arm 80 is caused to rotate to reach a predetermined position and the eject arm 80 pushes in the arm detection switch 110. At this moment, as illustrated in FIG. 7, the link connection axis 41 is positioned on the back side end in the connection guide groove 65.

And as described above, when the arm detection switch 110 is pushed in, the loading motor 71 starts to drive. Thereby, the drive cam 60 slides toward the left side (arrow A) in FIG. 7. Here, a timing of pushing in the arm detection switch 110 matches with the timing of pushing in the arm detection switch 110 at the occasion of conveying the large diameter disc 12a. Therefore, when the arm detection switch 110 is pushed in at the time of conveying the small diameter disc 12b, the center point of the small diameter disc 12b will naturally be positioned inside a figure (triangle) obtained by connecting the contact points of the small diameter disc 12b and the disc retaining parts 34, 34 and 84.

In addition, in bringing in the small diameter disc 12b, the link connection axis 41 progresses along the respective portions of the small diameter disc cam groove 64. Such progressive operations are basically similar to the case of the large diameter disc 12a. The link connection axis 41 sequentially progresses along a sending-in cam part 64a, a retaining cam part 64b, a releasing cam part 64c and the release maintaining cam part 64d in the small diameter disc cam groove 64.

Figure 8:
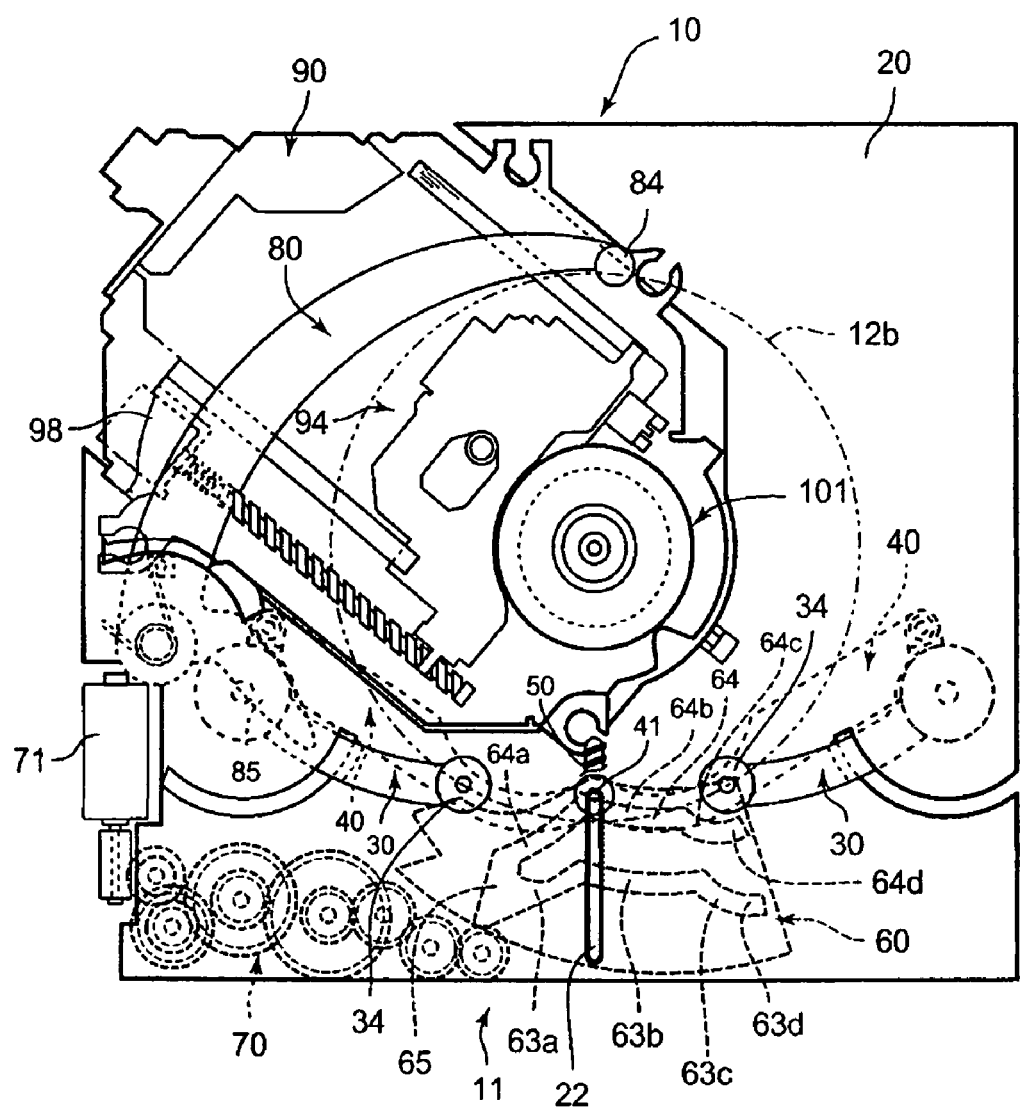
FIG. 8 is a plan view illustrating the state where centering of the small diameter disc is carried out in the disc player of FIG. 1.
Figure 9:
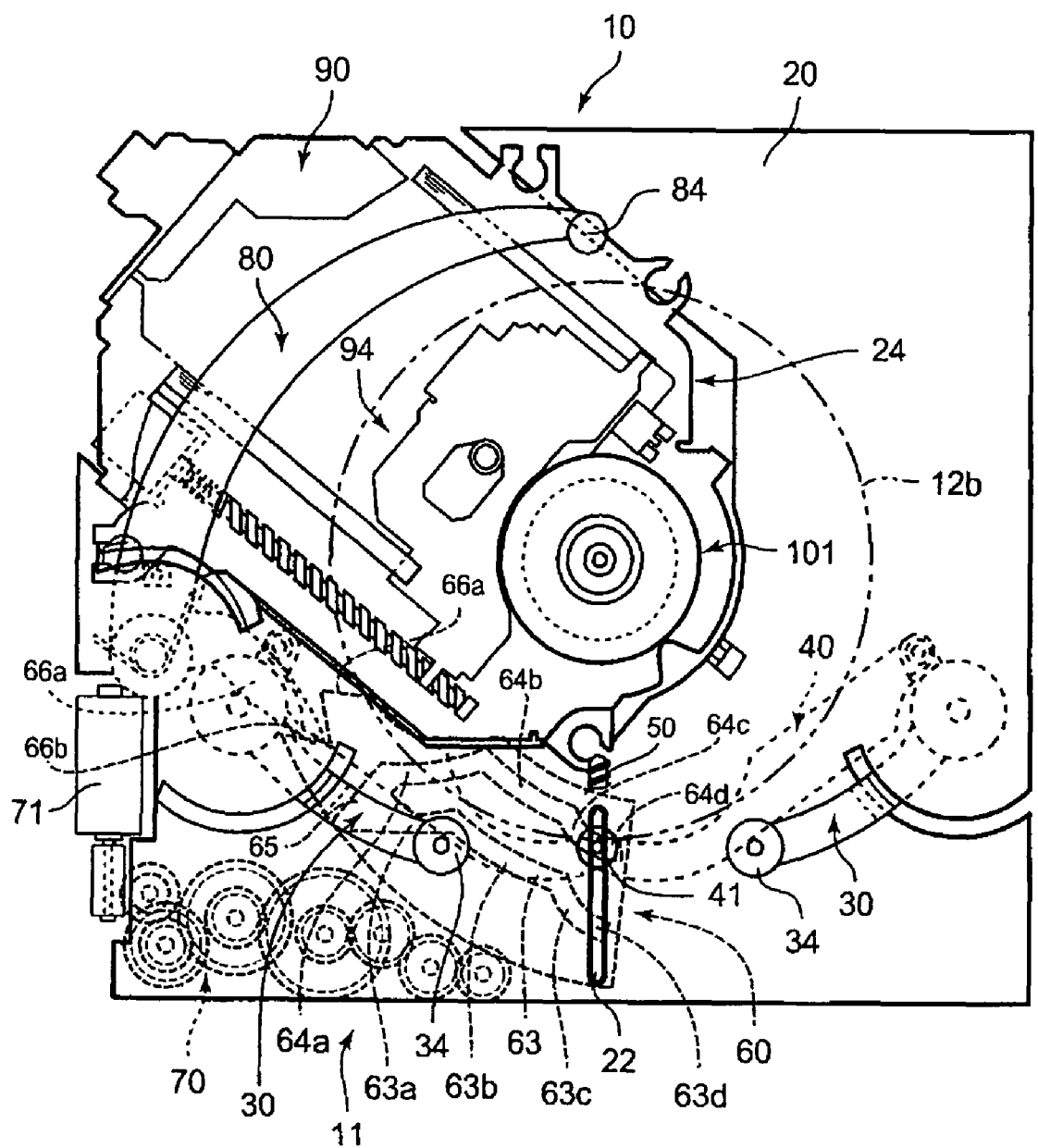
FIG. 9 is a plan view illustrating the state where a disc retaining part is set apart from an outer circumferential edge of the small diameter disc in the disc player of FIG. 1.

And, when the link connection axis 41 is positioned in the retaining cam part 64b, the chucking of the small diameter disc 12b to the turntable 101 is carried out (see FIG. 8). And as the link connection axis 41 progresses along the releasing cam part 64c, the retaining state of the small diameter disc 12b is gradually released (see FIG. 9). In addition, when the small diameter disc 12b is positioned in the release maintaining cam part 64d, the traverse unit 90 is moved to the position for replaying the small diameter disc 12b. After such movements, the small diameter disc 12b can be replayed.

In addition, the operations in the case of ejecting the small diameter disc 12b are similar to the operations in the case of ejecting the above described large diameter disc 12a. A push-in operation and the like on the eject button by a user drives the loading motor 71. With that drive, driving force opposite to the above described driving force is transmitted to the external peripheral gear 61. Thereafter, the link connection axis 41 sequentially progresses along the release maintaining cam part 64d, the releasing cam part 64c, the retaining cam part 64b and the sending-in cam part 64a (sequentially passes the states illustrated in FIG. 9, FIG. 8, FIG. 7 and FIG. 6). Thereby the same ejection operations as in the case of the large diameter disc 12a are carried out.

According to such configured loading mechanism 11 and the disc player 10 with this loading mechanism 11, the disc 12 is retained on its outer circumferential edge by a pair of the loading arms 30 and 30 and the eject arm 80. Therefore, compared with a conventional configuration holding a disc 12 between a roller and a disc guide, damages to the upper surface and lower surface of the disc 12 will not be prevented.

In addition, compared with a system of conveying a disc 12 with a roller, a mechanism for moving the roller up and down for, for example, a withdrawal of the roller will become unnecessary. Therefore, the simplification of the loading mechanism 11 becomes feasible. In addition, for chucking the disc 12 to the turntable 101, it is not necessary to provide a damper moving upward and downward. Therefore, it becomes possible to make a loading mechanism 11 and a disc player 10 thin.

In addition, depending on whether the large diameter disc 12a is present or the small diameter disc 12b is present, the rotary range of the loading arm 30 is determined. Depending on the difference in the rotary range of the loading arm 30, the route that the link connection axis 41 progresses in the disc guide groove 62 can be switched. That is, the link connection axis 41 progresses inside the large diameter disc cam groove 63 in the case of the large diameter disc 12a and the link connection axis 41 progresses inside the small diameter disc cam groove 64 in the case of the small diameter disc 12b.

With such configuration, it can be said that whether the disc 12 is the large diameter disc 12a or the small diameter disc 12b is automatically discriminated only by the difference in the rotary range of the loading arm 30. Thereby, electrical discriminating means for discriminating the diameter of the disc 12 does not have to be used. Since a loose connection and the like do not take place, it will become possible to increase reliability of the operations. In addition, a switch and the like do not have to be used for discriminating the diameter of the disc 12 and cost for that portion is reduced. Moreover, since a switch and the like do not have to be used for discriminating the diameter of the disc 12, the control program can be simplified and reliability of the operations at the time of loading the disc 12 can be increased.

In addition, the eject arm 80 is included and the bias force in the direction of ejecting the disc 12 is applied to the eject arm 80 by the eject spring 86. Since such bias force of the eject spring 86 is utilized and the link connection axis 41 is pushed by the inner walls of the disc guide groove 62, the rotation of the loading arm 30 is controlled, which makes sure the retainment of the disc 12 with the disc retaining parts 34, 34 and 84.

Moreover, as described above, at an occasion of retaining the disc 12 by the disc retaining parts 34, 34 and 84, the center of the disc 12 is positioned inside a figure (triangle) obtained by connecting the contact points of the disc 12 and the disc retaining parts 34, 34 and 84. In this way, bias force and the like of the eject spring 86 and the like transmitted via the disc retaining part 84 can be received by the disc retaining parts 34, 34 and the like and a secured retainment of the disc 12 is achieved.

In addition, in the present embodiment, a pair of the loading arms 30 and 30 is connected so as to move in conjunction with each other through the link levers 40 and 40 and the link connection axis 41. Therefore, at the occasion of conveying the disc 12, a pair of the loading arms 30 and 30 is capable of carrying out opening-closing operations in conjunction with each other and thus can carry out contact/opening-closing operations to the disc 12 from the both sides in the width direction. Thereby, it will become possible to prevent the disc 12 from being biased to one side due to a one-side contact and the like to the disc 12. Thereby it will become possible to convey the disc 12 well.

Moreover, a link mechanism is comprised of a pair of the link levers 40 and 40 and the link connection axis 41 linking a pair of the link levers 40 and 40. Therefore, a slide of the link connection axis 41 in the link guide groove 22 and movements of the link levers 40 and 40 in conjunction with each other accompanied by that slide can uniquely determine the rotation position of the loading arm 30 and enables a secured retainment and sending-in of the disc 12.

In addition, the drive cam 60 is provided with a disc guide groove 62. The disc guide groove 62 is provided with a large diameter disc cam groove 63, a small diameter disc cam groove 64 and a connection guide groove 65. Thereby, in accordance with the disc diameter, i.e., the large diameter disc 12a or the small diameter disc 12e, the link connection axis 41 can be positioned in either the large diameter disc cam groove 63 or the small diameter disc cam groove 64 through the connection guide groove 65 and the like. Therefore, it will become possible to carry out switching well between the large diameter disc cam groove 63 and the small diameter disc cam groove 64, each corresponding to the diameter of the disc 12.

In addition, the link connection axis 41 is inserted in the disc guide groove 62 and also in the link guide groove 22 of the main chassis 20. Here, in the present embodiment, the longitudinal side of the link guide groove 22 is along the backward direction of the disc player 10. Therefore, the position of the link connection axis 41 in the width direction of the disc player 10 is fixed so that the loading arms 30 can concurrently and equally rotate.

Moreover, the large diameter disc cam groove 63 and the small diameter disc cam groove 64 are respectively provided with the sending-in cam parts 63a and 64a, the retaining cam parts 63b and 64b, the releasing cam parts 63c and 64c and the release maintaining cam parts 63d and 64d. Therefore, in the case where the link connection axis 41 is positioned in the sending-in cam parts 63a and 64a and progresses toward the retaining cam parts 63b and 64b, the disc player 12 can send the disc 12 in well. In addition, while the link connection axis 41 is positioned in the retaining cam parts 63b and 64b and progresses toward the releasing cam parts 63c and 64c, the traverse unit 90 is caused to ascend by an elevator mechanism not illustrated in the drawing. Moreover, by a clamp mechanism not illustrated in the drawing, it will become possible to carry out a chucking of disc 12 to the turntable 101.

In addition, while the link connection axis 41 is positioned in the releasing cam parts 63c and 64c and progresses toward the release maintaining cam parts 63d and 64d, it will become possible to carry out release of the retained state of disc 12 by the disc retaining parts 34, 34 and 84. Moreover, in the case where the link connection axis 41 is positioned in the release maintaining cam parts 63d and 64d, the state where the disc retaining parts 34, 34 and 84 do not contact with the disc 12 can be maintained so that the disc 12 can be replayed well.

Moreover, the eject arm 80 is provided with the release lever part 85 that may bump against the first holding part 66a and the second holding part 66b. Therefore, by the rotation of the drive cam 60, the release lever part 85 bumps against the first holding part 66a or the second holding part 66b. Thereby, the eject arm 80 can be rotated in the direction of releasing the disc retaining part 84 from retaining the disc 12. In particular, in the present embodiment, the drive cam 60 is provided with the first holding part 66a and the second holding part 66b respectively corresponding with the large diameter disc 12a and the small diameter disc 12b. Therefore, even in the case where either the large diameter disc 12a or the small diameter disc 12b is inserted, the disc retaining part 84 can be set apart from the outer circumferential edge of the disc 12 so that the disc 12 can be replayed well.

In addition, the drive cam 60 is provided with the external peripheral gear 61. That external peripheral gear is meshed with the last stage gear 70a of the loading gear train 70. Therefore, driving force generated by the loading motor 71 is transmitted to the drive cam 60 well so as to enable the drive cam 60 to rotate well.

In addition, a part of the loading arm 30 close to the disc retaining part 34 appears on the upper side of the main chassis 20 through the guiding hole 21. In addition, respective parts of the drive cam 60, the link lever 40 and the like, which are irrelevant to the retainment of the disc 12, are arranged on the lower side of the main chassis 20. Thereby, at the occasion of conveying the disc 12, the drive cam 60, the link lever 40 and the like can be prevented from interfering with the disc 12. In addition, the disc 12 can be retained close to the upper surface of the main chassis 20. By effectively using the space on the lower surface of the main chassis 20, a thin disc player 10 can be realized.

So far, an embodiment of the present invention has been described. However, the present invention can be modified variously besides the former embodiment. That will be described below.

Figure 10:
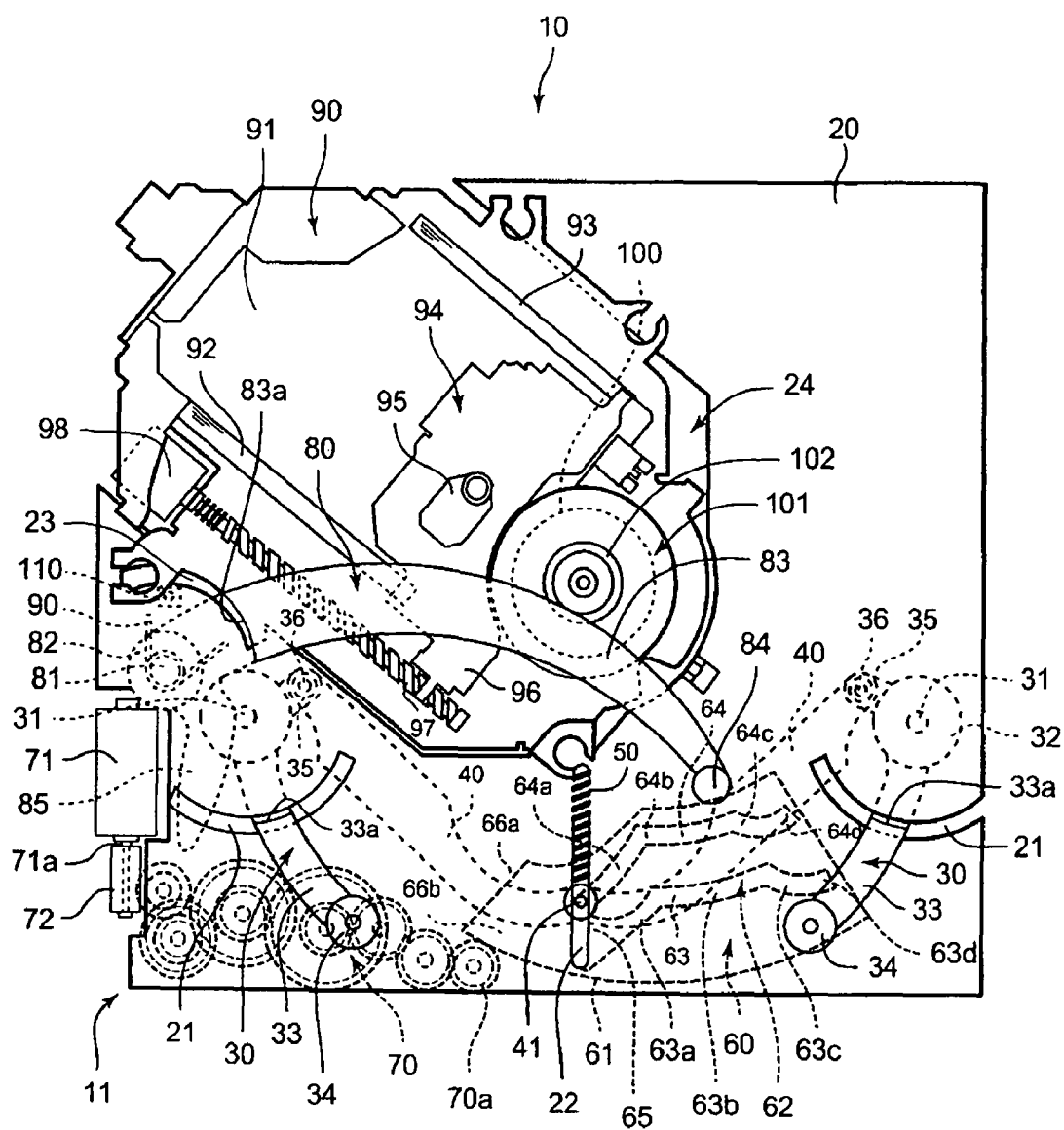
FIG. 10 relates to a variation of the disc player of FIG. 1 and is a plan view illustrating the state where a first holding part and a second holding part in a drive cam are formed from the same side.
Figure 11:
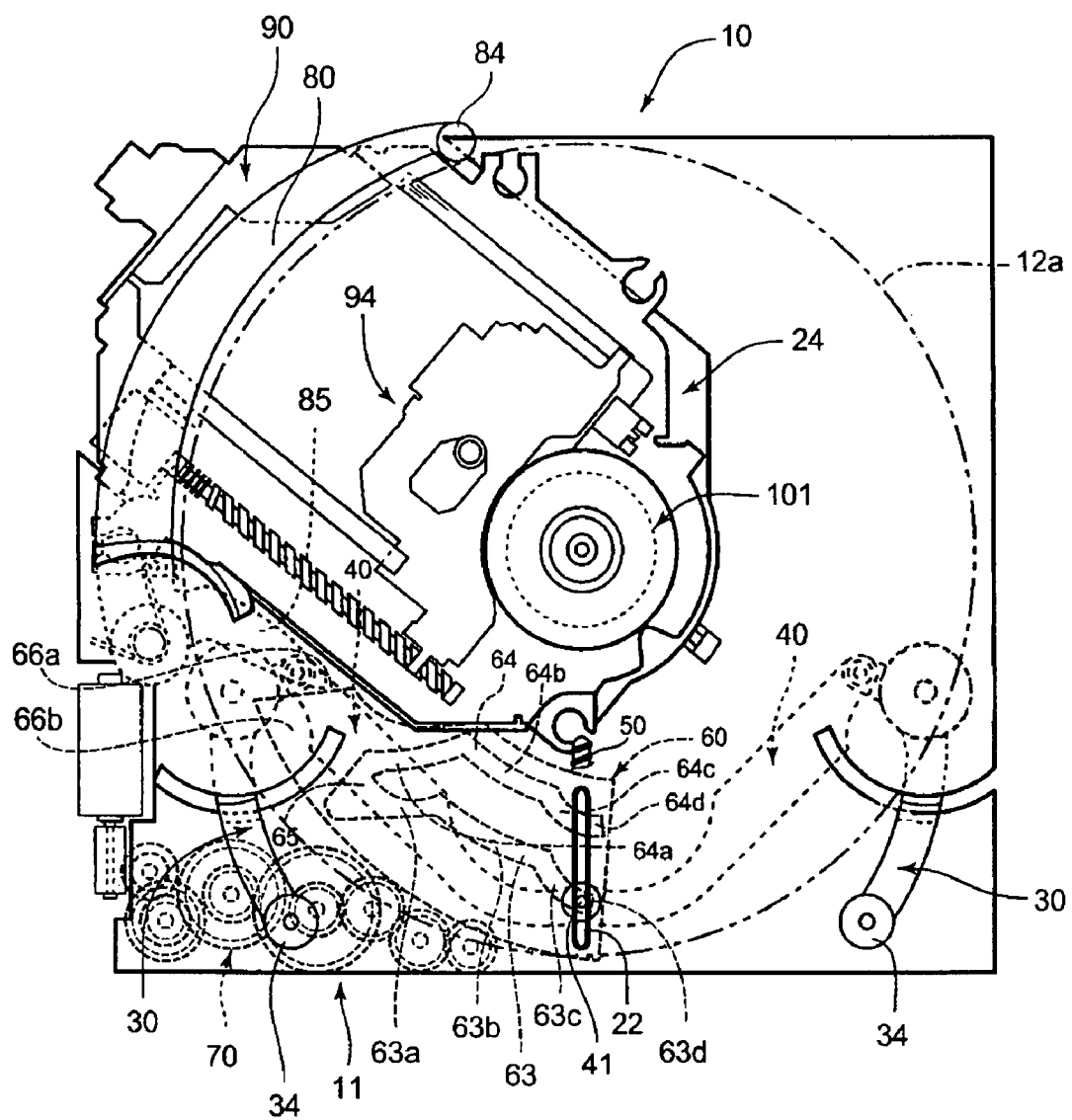
Figure 12:
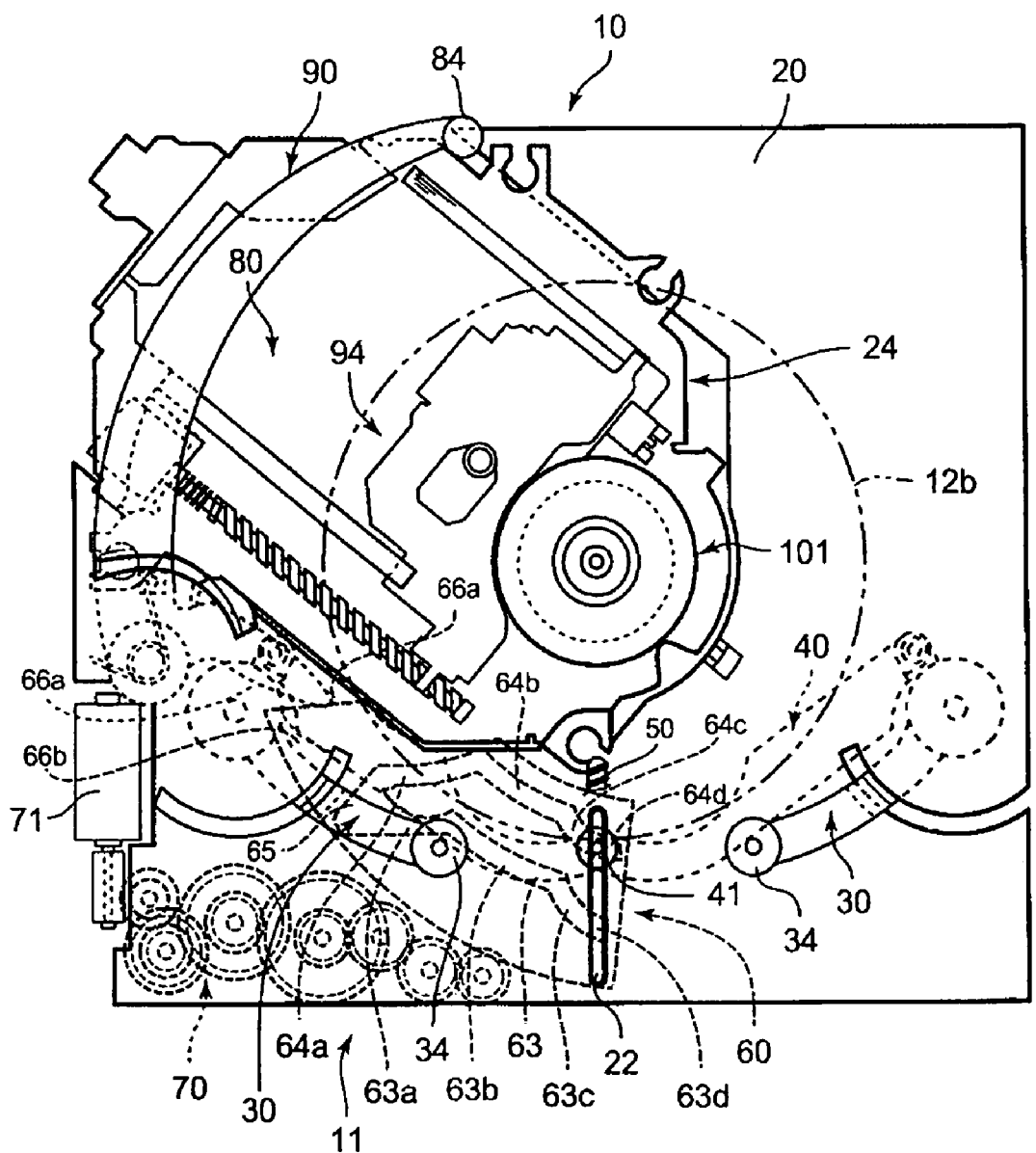

In the above described embodiment, the first holding part 66a and the second holding part 66b are formed from the respective separate sides in the drive cam 60. However, as illustrated in FIG. 10 to FIG. 12, the first holding part 66a and the second holding part 66b can be formed from the same side. Here, FIG. 10 illustrates the state before the disc 12 is sent in. FIG. 11 illustrates the state where the large diameter disc 12a has been sent in; and FIG. 12 illustrates the state where the small diameter disc 12 has been sent in.

As illustrated in FIG. 12, in the case where the first holding part 66a and the second holding part 66b are formed from the same side, the eject arm 80 is rotated to the same position for the large diameter disc 12a and the small diameter disc 12b. Therefore, even in the case of sending-in the small diameter disc 12b, a sufficient rotation of the eject arm 80 becomes possible and an ensured withdrawal of the eject arm 80 becomes possible.

In addition, in the above described embodiment, three arm members (the first arm member to the third arm member) including a pair of the loading arms 30, 30 and the eject arm 80 retain the outer circumferential edge. However, the number of the arm member will not be limited to three but can be four and more. In that case, more than two of any arm member from the first arm member, the second arm member and the third arm member or more than two of any two or more arm members from the first arm member, the second arm member and the third arm member may be provided. Here, also in the case of retaining the disc 12 with four or more arm members, the disc 12 is retained well in the state where the center portion of the disc 12 is positioned inside the figure obtained by connecting adjacent contact portions of the arm members with the disc 12.

In addition, in the above described embodiment, a pair of the link levers 40 and 40 is provided so that a pair of the loading arms 30 and 30 is configured to be rotated by a pair of those link levers 40 and 40. However, the above described embodiment can be configured so that, with a ball screw, for example, the screwed position in the loading arms 30 and 30 is adjusted so that the rotation of the loading arms 30 and 30 can be adjusted. Here, in that case, the link lever 40 will be omitted from the configuration.

In addition, in the above described embodiment, the driving force is transmitted to the drive cam 60 using the loading gear train 70. However, the driving force can be transmitted to the drive cam 60 via alternative means such as a belt, for example.

In addition, the above described embodiment will not limit the shape of the cam groove in the drive cam 60. For example, the retaining cam parts 63b and 64b/the release maintaining cam parts 63d and 64d can be omitted from the configuration. In that case, after the link connection axis 41 reaches to the end of the sending-in cam parts 63a and 64a at the side of the release maintaining cam parts 63d and 64d, the loading motor 71 is stopped driving. Thereby the state of retaining the disc 12 is maintained. Additionally, after the link connection axis 41 reaches to the end of the release maintaining cam parts 63d and 64d apart from the sending-in cam parts 63a and 64a and the loading motor 71 is stopped driving. Thereby the withdrawal state of the disc retaining parts 34, 34 and 84 can be maintained.

Moreover, in the above described embodiment, the eject arm 80 is configured to apply bias force from the eject spring 86 to the disc 12 in the direction of ejecting the disc 12. However, that eject arm 80 can be configured to move in conjunction with the cam mechanism. In that case, after the disc 12 is retained, the above described embodiment can be configured to rotate the eject arm 80 so as to send in the disc 12 inside of the disc player 10.

In addition, in the above described embodiment, the case of using the eject spring 86 as bias means has been described. However, the bias means will not be limited to the eject spring 86 but bias means such as a leaf spring and rubber can be used.

In addition, the above described loading mechanism 11 can be applied to an apparatus other than the disc player 10. The apparatus other than the disc player 10 includes a stocker and the like for retaining/storing the disc 12.

The loading mechanism 11 related to another embodiment of the present invention and the disc player 10 with that loading mechanism 11 will be described below based on FIG. 13 to FIG. 27. FIG. 13 and FIG. 18 to FIG. 27 are plan views respectively illustrating internal configuration of the disc player 10 of the present invention. The disc player 10 replays the disc 12 (see FIG. 18 and the others) such as a CD (Compact Disc) and a DVD (Digital Versatile Disc). However, the disc 12 will not be limited to a CD nor a DVD but can be a storage medium having a discoid shape such as a CD-R, a DVD-R, a DVD-RW and the like.

Figure 13:
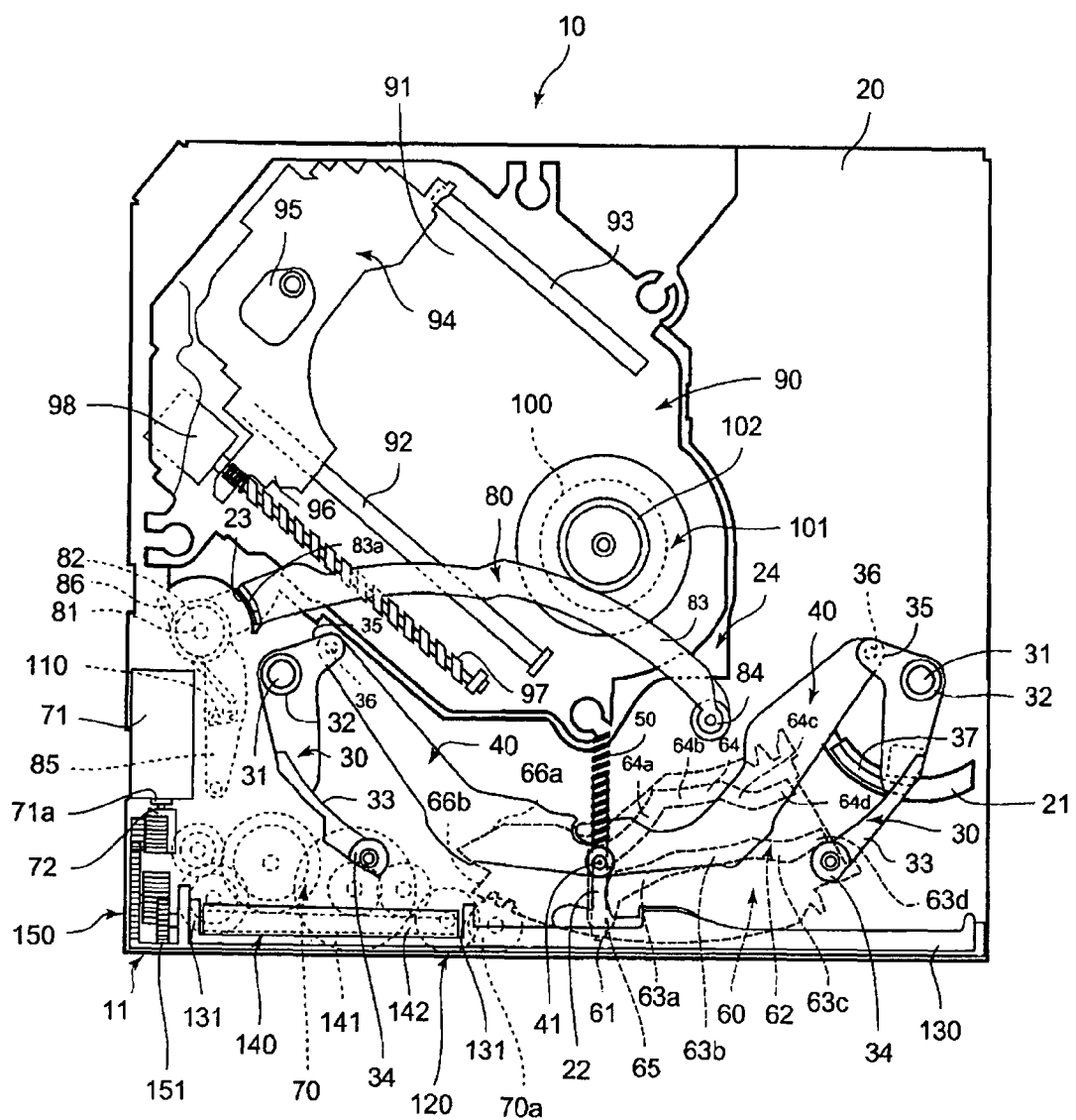
FIG. 13 is a plan view illustrating an internal configuration of a disc player related to an embodiment of the present invention.
Figure 14:
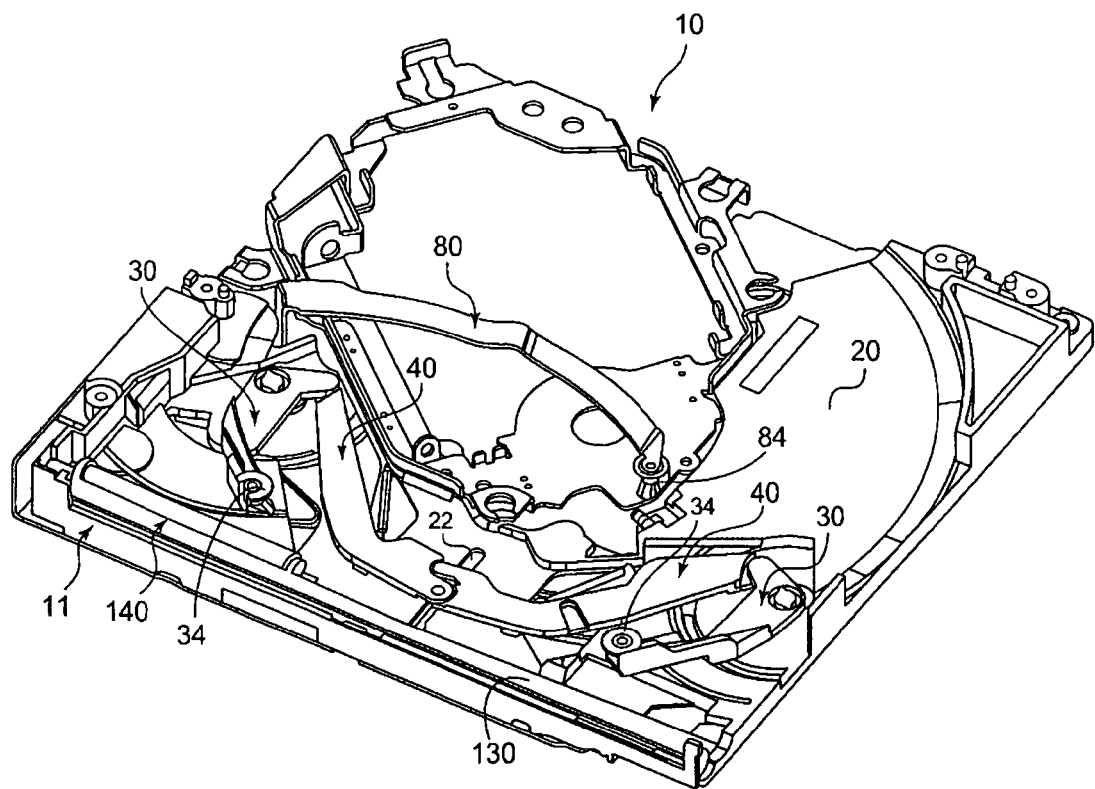
FIG. 14 is a perspective view illustrating essential parts of the present invention mounted onto a main chassis in the disc player of FIG. 13.
Figure 15:
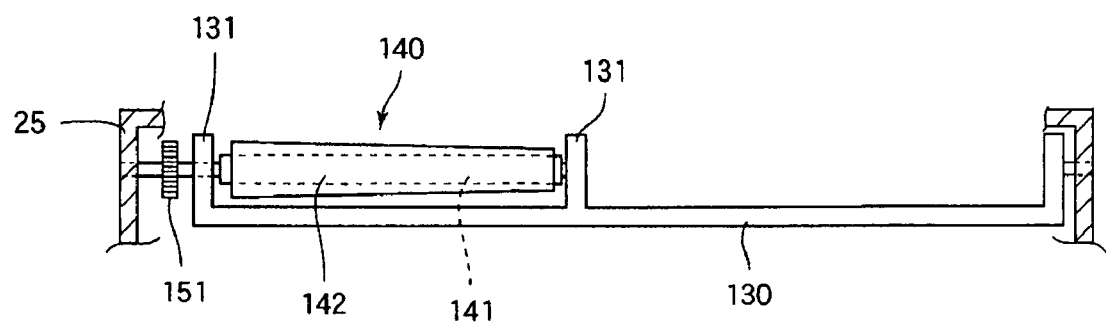
FIG. 15 is a partially sectional front view schematically illustrating configurations of a roller arm and a conveyance roller in the disc player of FIG. 13.

The disc player 10 comprises a main chassis 20 corresponding to a base as illustrated in FIG. 13 and the others. The main chassis 20 is mounted and fixed with a screw and the like on an outer case 25 illustrated in FIG. 15 and FIG. 16 and the others. In addition, in the main chassis 20, a traverse unit 90 described below is supported with a damper/spring and the like so that the traverse unit 90 is switchable between a floating state and a fixed state relative to the main chassis 20 with a mechanism, not illustrated in the drawing, for switching the floating state.

Here, such configuration can be adopted for the outer case 25 that the main chassis 20 is supported with the damper/spring and the like. In this case, the floating state/the fixed state relative to the outer case 25 of the main chassis 20 becomes switchable.

Onto that main chassis 20, loading arms 30 and 30 as a first arm member and a second arm member (hereinafter, if necessary, the loading arms 30 and 30 will be collectively referred to as loading arm 30.) are mounted rotatably. The loading arms 30 correspond with the first arm member and the second arm member. Two loading arms in total are provided on both sides in the width direction in FIG. 13 and FIG. 18 to FIG. 27. Those loading arms 30 are provided rotatably around the rotary axes 31 as the center resided on the back side and the outer side in FIG. 13 and FIG. 18 to FIG. 27. Here, the rotary axes 31 correspond to a first fulcrum and a second fulcrum.

In addition, the loading arm 30 has an axis supporting part 32, an arm part 33 and a disc retaining part 34.

The above described rotary axis 31 is arranged in the center of the axis supporting part 32. And the axis supporting part 32 is arranged around the rotary axis 31 so as to rotate around the rotary axis 31. Thereby the loading arm 30, which can rotate relative to the main chassis 20, is provided. In addition, the axis supporting part 32 is provided so that its planar shape forms a substantially discoid shape and has also an internally protruding part 35 protruding toward the inward side. A connecting axis 36 described below is attached to that internally protruding part 35.

In addition, the arm part 33 stretches from the rotary axis 31 toward the internal and front side. Here, in the present embodiment, the strength of the arm part 33 is secured by providing a rib and the like.

Here, in the loading arm 30, a rib 37 protrudes from the right side loading arm 30 in FIG. 13 and the others. The rib 37 protrudes toward the left side in FIG. 13. Moreover, that rib 37 has a curvature so as to depict an arc about the rotary axis 31 as a center. That rib 37 protrudes downward in comparison with the lower surface of the arm part 33. And the rib 37 protruding downward is fit into to a guide groove 21 resided on the main chassis 20. The rib 37 is designed for pushing a detection switch 161 (see FIG. 17).

In addition, the disc retaining part 34 is a portion for retaining the outer circumferential edge of the disc 12 at an occasion of conveying the disc 12. That disc retaining part 34 is a portion for retaining the disc 12 well at an occasion of conveying the disc 12 and the chucking described below. Here, forming the disc retaining part 34 into a pulley-like shape is one example of specific configurations in order to retain the disc 12 well. In the case of forming the disc retaining part 34 in such a pulley shape, it can be realized that the disc retaining part 34 retains only the outer circumferential edge of the disc 12 and the disc retaining part 34 comes into little contact with the upper surface and the lower surface of the disc 12.

Here, in order to carry out the retainment of the disc 12 well and avoid interference between the disc 12 and the arm part 33, the disc retaining part 34 having a pulley shape is provided to protrude on the side upper than the axis supporting part 32 and the like.

In addition, a link lever 40 is connected to the internally protruding part 35 protruding from the axis supporting part 32. The link lever 40 is rotatably connected to the loading arm 30 with the connecting axis 36. Two units of the link lever 40 in total are provided since they are respectively connected to a pair of the loading arms 30 and 30. The tips (the end portion apart from the connecting axis 36) of the pair of the link levers 40 and 40 (hereinafter the link levers 40 and 40 will be collectively referred to as a link lever 40) are provided to be stacked each other in the center portion in the width direction and in the portion on the front side of the disc player 10. In order to fix that stacked state, the tips of the link levers 40 and 40 are linked each other with a link connection axis 41.

Here, a link mechanism is comprised of the link levers 40 and 40 and the link connection axis 41.

As to the link connection axis 41, a portion on the downward side thereof is inserted into the link guide groove 22 provided in the main chassis 20. The link guide groove 22 is set to a length dimension corresponding with the movement in the backward direction of the tip portion of the link lever 40 at an occasion of conveying the disc 12 described below. In addition, the link guide groove 22 is set to a width dimension corresponding to the diameter of the link connection axis 41 and is provided so as not for the link connection axis 41 to jounce so much inside the link guide groove 22. Here, the link connection axis 41 is also inserted into the disc guide groove 62 of the drive cam 60 described below.

In addition, one end side of the spring member 50 is connected to the link connection axis 41. The other end side of the spring member 50 is connected to a fixed part such as the main chassis 20. That spring member 50 provides the link connection axis 41 with bias force directed toward the back side of the disc player 10. Thereby, in the case where the link connection axis 41 is positioned in the connection guide groove 65 (link guide groove 22), the link connection axis 41 is provided with bias force in the direction of pulling in the link connection axis 41 toward the back side. With that force, the loading arms 30 and 30 are rotated in the closing direction.

Here, such configuration that the spring member 50 pulls in the link connection axis 41 to the back side may not be adopted but such configuration can be adopted that one end side thereof is attached to the center portion of the respective link levers 40 to pull the link lever 40 to the front side.

In addition, the drive cam 60 is provided to slide in an arc shape relative to the main chassis 20. The drive cam 60 is provided to slide in an arc shape along a circularly designed guide groove, which resides in the main chassis 20, not illustrated in the drawing. Here, the drive cam 60 is provided to slide circularly around the position that is located on the fore and right side from the center position of the disc 12 as described in FIG. 4 and the others. In addition, a cam configuration is comprised of the drive cam 60 and the link connection axis 41.

In that drive cam 60, the outer circumferential edge on the front side is provided with an external peripheral gear 61. The external peripheral gear 61 and a last stage gear 70a of a loading gear train 70 are meshed together. Here, the main chassis 20 is provided with a loading motor 71 as a driving source and the loading gear train 70. A worm gear 72 is attached to the rotary axis 71a of the loading motor 71. Electric power is applied from outside to the loading motor 71. Thereby the loading motor 71 provides the loading gear train 70 with driving force through the worm gear 72.

The driving force applied to the loading gear train 70 is transmitted from the last stage gear 70a to the external peripheral gear 61. Thereby, the drive cam 60 is provided to slide via the external peripheral gear 61.

Here, the loading gear train 70 is provided with a trigger mechanism not illustrated in the drawing. The trigger mechanism is used for bringing predetermined gears of the loading gear train 70 into engagement and disengagement states. That is, in the state where the disc 12 is not inserted, one gear in the loading gear train 70 is not meshed with the other gears. However, when the disc 12 is inserted to a predetermined extent in the disc player 10 (for the present embodiment, when the disc 12 is inserted to the position illustrated in FIG. 19 and FIG. 24), the trigger mechanism is activated to mesh one gear and the other gears together. Thereby, driving force is transmitted to the drive cam 60.

The drive cam 60 is provided with a disc guide groove 62. The disc guide groove 62 is provided with a large diameter disc cam groove 63 as a cam groove for guiding a large diameter disc 12a, a small diameter disc cam groove 64 as a cam groove for guiding a small diameter disc 12b and a connection guide groove 65 linking the large diameter disc cam groove 63 to the small diameter disc cam groove 64 and allowing a slide of the link connection axis 41. Here, the large diameter disc cam groove 63 is positioned closer to the front side in comparison with the small diameter disc cam groove 64. In addition, the connection guide groove 65 and the link guide groove 22 are arranged in an aligned manner in the vertical direction in the state where the disc 12 is not inserted into the disc player 10.

The large diameter disc cam groove 63 and the small diameter disc cam groove 64 are designed for the link connection axis 41 to slide inside the link guide groove 22. With such slide, the tip portion of the link lever 40 is caused to slide compulsorily along the link guide groove 22 as well. However, due to the slide, the position of the connecting axis 36 on the back side of the link lever 40 changes as well. Thereby, the loading arm 30 is rotated. That is, the large diameter disc cam groove 63 and the small diameter disc cam groove 64 are designed for rotating the loading arm 30.

In order to realize such rotation of the loading arm 30, the large diameter disc cam groove 63 has a sending-in cam part 63a, a retaining cam part 63b, a releasing cam part 63c and a release maintaining cam part 63d. Among them, the sending-in cam part 63a is a portion connected to the connection guide groove 65 and is a portion located on the left side in the large diameter disc cam groove 63 in FIG. 13 and the others. The sending-in cam part 63a is formed toward the back side of the disc player 10 as it extends away further from the connection guide groove 65.

Thereby, when the drive cam 60 slides toward the left side in FIG. 13 and the others, the link connection axis 41 moves toward the back side by a function of the spring member 50 or push-in of inner walls of the large diameter disc cam groove 63. Thereby, the position of the tip portion of the link lever 40 moves toward the back side. Thereby, the position of the connecting axis 36 of the link lever 40 changes to the back side as well and the rotation of the loading arm 30 in the direction of pulling in the disc 12 is realized.

In addition, the retaining cam part 63b is a portion connected to the sending-in cam part 63a and is a portion occupying substantially the center portion in the large diameter disc cam groove 63 in FIG. 13 and the others. The retaining cam part 63b is provided so as not to change the position of the link connection axis 41 inserted into the retaining cam part 63b in the link guide groove 22 even when the drive cam 60 slides circularly. Here, the length dimension of the retaining cam part 63b is sufficient for the disc 12 to be chucked well onto the turntable 101 while the drive cam 60 is sliding.

In addition, the releasing cam part 63c is a portion connected to the retaining cam part 63b. The releasing cam part 63c is formed to extend toward the front side of the disc player 10 as the releasing cam part 63c extends away further from the connection guide groove 65. Thereby, when the drive cam 60 slides to the left side in FIG. 13 and the others, the link connection axis 41 is pushed toward the front side by the inner walls on the back side of the large diameter disc cam groove 63. Thereby the connecting axis 36 of the link lever 40 also changes its position to move toward the front side and thus the rotation for releasing the disc retaining part 34 from retaining the disc 12. Thereby, the state where the disc retaining part 34 is retaining the disc 12 is released.

Here, in order to make the disc 12 rotatable with the turntable 101, the releasing cam part 63c is provided to have the length dimension sufficient for the disc retaining part 34 to move to the position where the disc retaining part 34 and the disc 12 do not contact with. However, the releasing cam part 63c has a length dimension necessary for a withdrawal of the disc retaining part 34 and therefore is shorter than the length dimension of the sending-in cam part 63a for sending in the disc 12.

In addition, the release maintaining cam part 63d is a portion connected to the releasing cam part 63c. Similar to the retaining cam part 63b, the release maintaining cam part 63d is provided not to change the position of the link connection axis 41 inserted into the release maintaining cam part 63d in the link guide groove 22 even when the drive cam 60 slides circularly. Here, the release maintaining cam part 63d is provided to be not so long and its length dimension is very shorter than that of the retaining cam part 63b.

In addition, the small diameter disc cam groove 64 is configured similar to the large diameter disc cam groove 63 and has a sending-in cam part 64a, a retaining cam part 64b, a releasing cam part 64c and a release maintaining cam part 64d. Here, respective portions of the small diameter disc cam groove 64 are functionally similar to corresponding portions of the large diameter disc cam groove 63 and only the disc 12 to be adopted as an object is changed from the large diameter disc 12a to the small diameter disc 12b. Therefore, description on details thereof will be omitted.

In addition, in the drive cam 60, the left side edge is provided with a first holding part 66a and a second holding part 66b as a holding part. The first holding part 66a and the second holding part 66b are portions for pushing in the release lever part 85 of an eject arm 80 described below. In order to realize such push-in, the first holding part 66a and the second holding part 66b protrude nearer to the left side than the other portions of the drive cam 60 do in FIG. 1 and the others.

Here, the first holding part 66a is positioned on the back side of the left side end of the drive cam 60. And the second holding part 66b is positioned on the front side of the left side end of the drive cam 60. Each of first holding part 66a and second holding part 66b is needed depending on the difference in the rotation distance of the eject arm 80 in the case of bringing in the large diameter disc 12a and the small diameter disc 12b respectively.

In addition, in order to push in the release lever part 85 well, inclination angles of the edges of the first holding part 66a and the second holding part 66b are directed from the bottom left to the top right in FIG. 13. In addition, the first holding part 66a and the second holding part 66b contact with the side edges on the front side of the release lever part 85 (see FIG. 21 and FIG. 26). By sliding the drive cam 60 to the left side in FIG. 13 and the others in such a contact state, the first holding part 66a and the second holding part 66b push in the tip portion of the release lever part 85 to the back side. Thereby a counterclockwise rotation of the eject arm 80 as illustrated in FIG. 13 and the others is realized.

In addition, the main chassis 20 is provided with a rotatable eject arm 80 corresponding with the third arm member. An eject spring 86 as biasing means is provided between the eject arm 80 and the main chassis 20. One end of the eject spring 86 is attached to the main chassis 20 and the other end is attached to the eject arm 80. That eject spring 86 applies, to the eject arm 80, bias force in the direction of pushing the disc 12 toward the ejection side.

Similar to the loading arm 30, the eject arm 80 has an axis supporting part 82, an arm part 83 and a disc retaining part 84. In addition thereto, the eject arm 80 is provided with a release lever part 85 as well. Among them, a rotary axis 81 is arranged in the center of the axis supporting part 82. The axis supporting part 82 is arranged around that rotary axis 81 to establish a free rotation. Thereby, the eject arm 80 is provided rotatably relative to the main chassis 20.

Here, in the present embodiment, the axis supporting part 82 of the eject arm 80 is provided in the vicinity of the loading motor 71. In addition, in the present embodiment, the arm part 83 of the eject arm 80 is formed to be bent in a step-like shape. That portion of the step-like shape (step portion 83a) is arranged in a guiding hole 23 formed in the main chassis 20 and the portion of the arm part 83 close to the rotary axis 81 is configured to be arranged on the reverse side of the main chassis 20.

Figure 20:
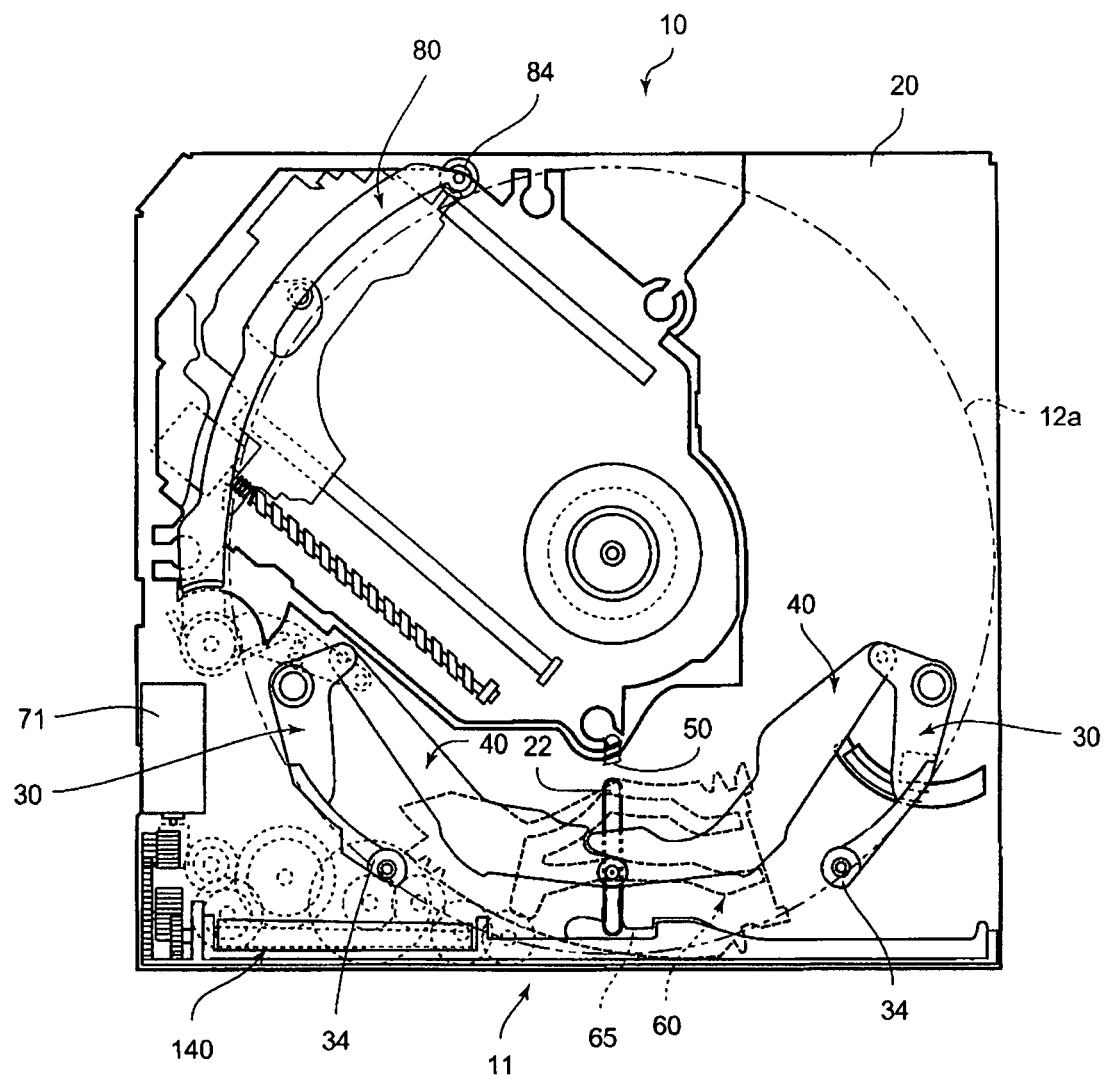
FIG. 20 is a plan view illustrating the state where centering of the large diameter disc is carried out in the disc player of FIG. 13.

In addition, as illustrated in FIG. 13 and the others, on the upper side of the main chassis 20, the arm part 83 has a curvature part forming a convex shape toward the back side. Thereby, an interference of the arm part 83 with the disc 12 is avoided. The arm part 83 is provided to be longer than the arm part 33 of the loading arm 30. A length dimension of that arm part 83 is set such that the disc retaining part 84 can contact with the outer circumferential edge of the disc 12 upon centering the disc 12 as illustrated in FIG. 20 and the others and that the disc retaining part 84 can be set apart from the outer circumferential edge of the disc 12.

In addition, the disc retaining part 84 is similar to the disc retaining part 34 of the above described loading arm 30. The disc 12 is retained at three points by the disc retaining part 84 and the two disc retaining parts 34 and 34 of the loading arm 30. Here, in the state where disc 12 is not inserted, the release lever part 85 pushes an arm detection switch 110 described below. Thereby, the disc retaining part 84 is located on the forefront side and nevertheless being positioned at a stop position inside the disc player 10.

Figure 18:
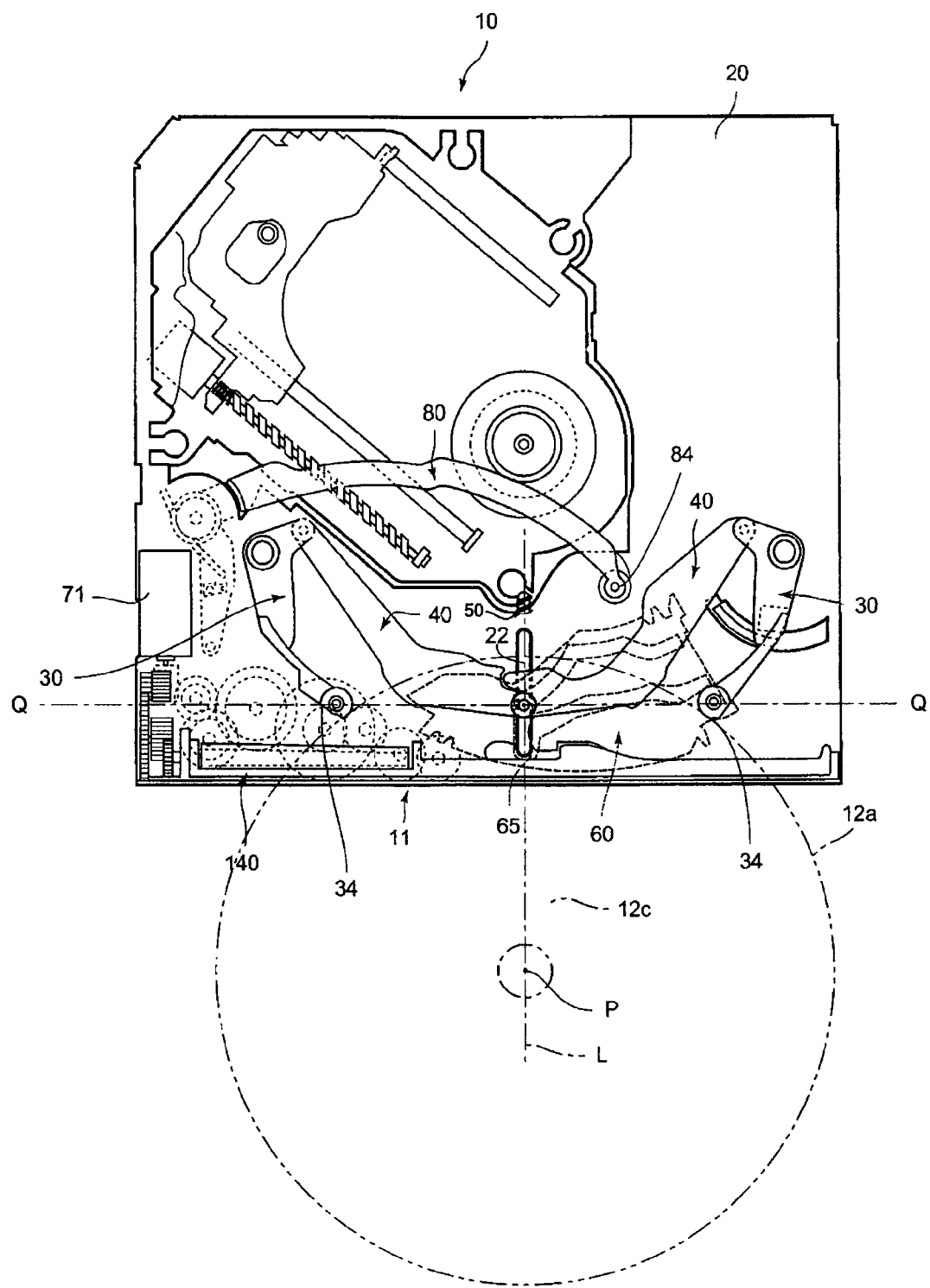
FIG. 18 is a plan view illustrating the state where the large diameter disc comes into contact with the disc retaining part of the loading arm in the disc player of FIG. 13.

Moreover, the release lever part 85 stretches from the axis supporting part 82. The release lever part 85 stretches toward the front side when the disc 12 is not inserted as illustrated in FIG. 13, FIG. 18, etc. Here, the arm part 83 stretches toward the width direction. The disc 12 is inserted in this state and the disc retaining part 84 contacts to the outer circumferential edge of the disc 12 and the arm part 83 rotates gradually. Thereby, the release lever part 85 gradually protrudes toward the internal side in the width direction of the disc player 10 until it reaches a position to contact with the first holding part 66*a*.

Here, in the present embodiment, the release lever part 85 has a curvature part so as not to interfere with the loading motor 71. That curvature shape is provided so as to form a convex shape toward the center in the width direction of the disc player 10 from the outward side of the disc player 10.

The tip portion of the release lever part 85 comes into contact with the above described first holding part 66*a*. In order to enable such contact, the release lever part 85 is provided in the position approximately as high as the drive cam 60 on the reverse side of the main chassis 20.

In addition, the main chassis 20 is provided with a cutout part 24 formed obliquely from the top left to the lower right in FIG. 13 and the others. A traverse unit 90 is arranged in the cutout part 24. The traverse unit 90 has a traverse chassis 91. A principal axis 92 and a second axis 93 are attached to that traverse chassis 91, with which an optical pickup unit 94 comprising an optical pickup 95 are slidably provided along the principal axis 92 and second axis 93. Here, in the optical pickup 95, a protruding portion 96 is provided so as to protrude toward the front side further than the principal axis 92. From that protruding portion 96, an opposite nail (not illustrated in the drawing) protrudes downward and the nail meshes with a lead screw 97. The lead screw 97 is driven to rotate by a thread motor 98. That rotation makes the optical pickup unit 94 contact with and break contact with the turntable 101.

In addition, a spindle motor 100 is mounted on the traverse chassis 91 and the turntable 101, on which the disc 12 is chucked, is attached to the rotary axis of the spindle motor 100. Here, the turntable 101 is provided with a convex portion 102. The convex portion 102 is a portion to be inserted into the center hole 12*c* of the disc 12 and is configured to be able to retain the disc 12 after the insertion. In addition, the traverse unit 90 is mounted onto an elevator mechanism not illustrated in the drawing, by which the traverse unit 90 can be moved up and down along the vertical direction. When the traverse unit 90 is elevated by the operation of the elevator mechanism, the disc 12 is chucked on the turntable 101.

In addition, as illustrated in FIG. 13 and the others, an arm detection switch 110 is provided in a predetermined position in the rotary range of the release lever part 85 on the main chassis 20. The arm detection switch 110 detects a rotation of the eject arm 80. That is, the eject arm 80 is arranged so as to push in the arm detection switch 110 when the eject arm 80 rotates clockwise to a predetermined extent to eject the disc 12 as described in FIG. 13, FIG. 18, FIG. 23 and the others.

The arm detection switch 110 is connected to the loading motor 71 through a control circuit not illustrated in the drawing. It is configured that, when the arm detection switch is pushed in, the loading motor is stopped driving.

Moreover, as illustrated in FIG. 13 and the others, a roller unit 120 is provided in the position on the front side of the disc player 10. The roller unit 120 comprises a roller arm 130 and a conveyance roller 140. Among them, the conveyance roller 140 comprises a roller shaft 141 and a roller cover 142 (see FIG. 15). The roller shaft 141 is supported rotatably onto the roller arm 130. In addition, the roller cover 142 covers the external periphery of the roller shaft 141. The roller cover 142 is fabricated from materials such as rubber and resin that are soft enough not to damage the disc 12 by contact and materials that give sufficient frictional force when contacting with the lower surface of the disc 12.

In addition, the roller arm 130 is provided across approximately the entire portion in the width direction of the front side of the disc player 10. Here, the roller arm 130 can be formed from a long and thin plate-like member. Otherwise, various shapes bent in an L-shape toward the back direction, for example, can be adopted. In addition, in the present embodiment, the roller arm 130 is mounted onto the outer case 25 so as to establish a rotatable state.

In the roller arm 130, a pair of bearing parts 131 is provided in the left side end in FIG. 13 and in a leftward position from the center in the width direction. The above described roller shaft 141 is supported rotatably onto the bearing parts 131. Here, when the roller shaft 141 is driven to rotate, the disc 12, on its left side, will come into the state of being sent inside the disc player 10.

Here, with the arrangement of such bearing parts 131, the conveyance roller 140 is arranged on the left side (one side in the width direction) in FIG. 13 and the others from line L (the line passing through the center portion of the centering position of the disc 12 along the direction of conveying the disc 12) passing through the center hole 12*c* of the disc 12 in the backward direction. Thereby, in the state where the centering of the disc 12 is carried out, the rear edge of the front side of the disc 12 does not overlap with the conveyance roller 140.

In addition, the roller gear 151 is attached to the left end of the above described roller shaft 141. The roller gear 151 is a portion constituting a part of a roller gear train 150. Here, the main chassis 20 is provided with the roller gear train 150. When electrical power is applied to the loading motor 71 from outside, the loading motor 71 applies driving force to the roller gear train 150 through the worm gear 72. Thereby, the conveyance roller 140 can take out the disc 12.

Figure 16:
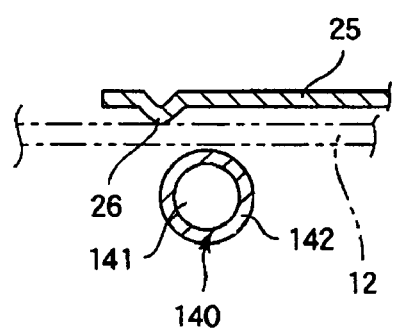
FIG. 16 is a sectional side view schematically illustrating configurations of a disc guide and a conveyance roller in the disc player of FIG. 1.

In addition, as illustrated in FIG. 16 and the others, a disc guide 26 is attached to the outer case 25. The disc guide 26 is formed by protruding a portion of the outer case 25 downward on the front side in comparison with the conveyance roller 140 using press work and the like. In addition, the disc guide 26 is designed to increase the amount of the downward protrusion as the disc guide 26 extends in the width direction from the center portion of the disc player 10 to outside. Thereby, the outer circumferential edge of the disc 12 comes into contact with the disc guide 26.

In addition, the disc guide 26 is preferably arranged to stretch to the front side as the disc guide 26 stretches outward from the center portion in the width direction of the disc player 10. In the case of adopting such configuration, when the disc 12 is sent inside the disc player 10, the outer circumferential edge on the front side of the disc 12 is well contactable to the disc guide 26.

Figure 17:
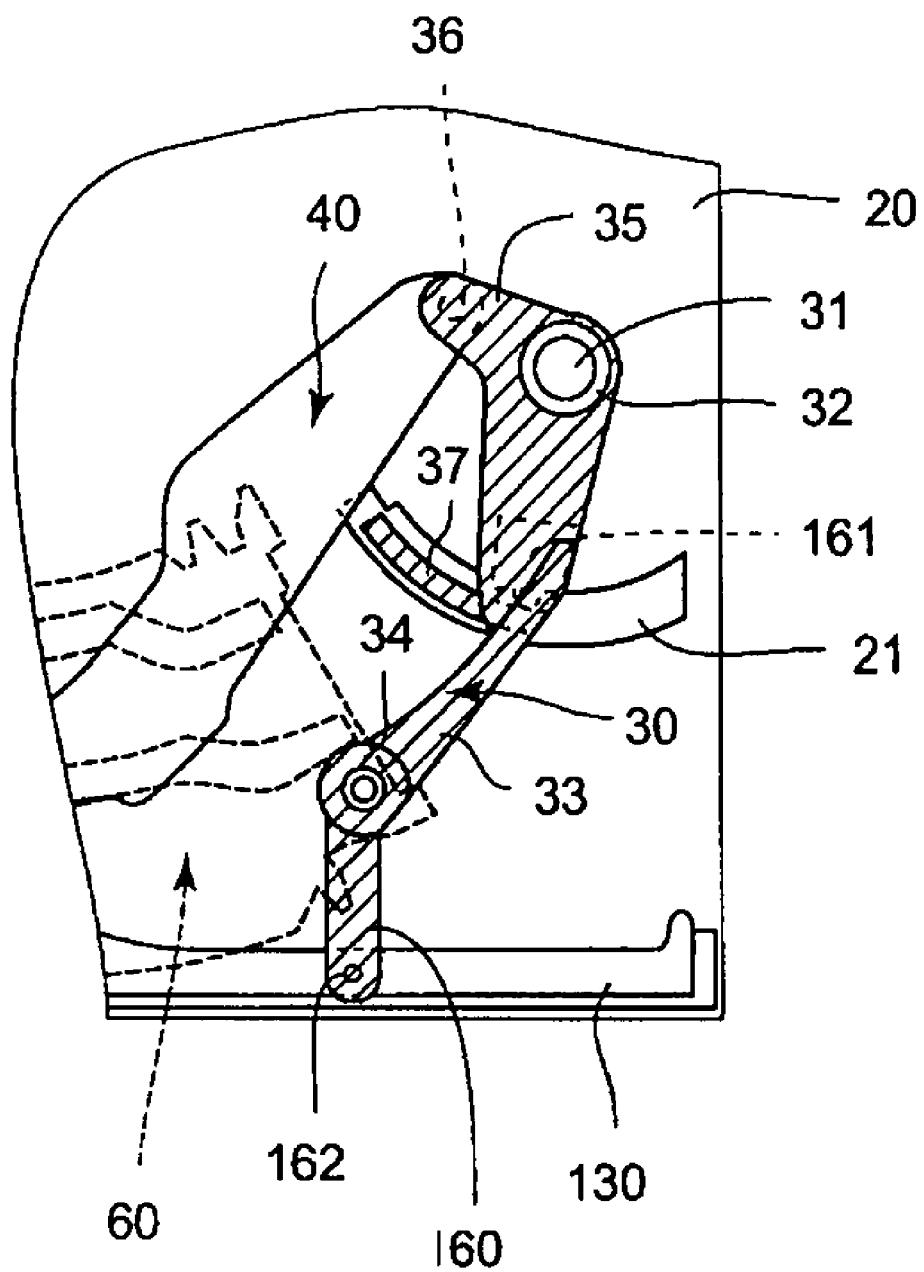
FIG. 17 is a partial plan view illustrating a configuration of an arm member and a loading arm provided with this arm member in the disc player of FIG. 13.

Moreover, the arm member 160 is provided on the upper side on the right side of the roller arm 130 where no conveyance roller 140 is present in FIG. 13 (see FIG. 17). The arm member 160 is a part of the disc detection mechanism and is a member for detecting an insertion of the disc 12. Such detection drives the loading motor 71 to start the conveyance roller 140 to rotate.

Here, the disc detection mechanism is provided with the arm member 160 and the detection switch 161. Among them, in the present embodiment, only the loading arm 30 on the right side as described in FIG. 13 and the others is provided with the arm member 160. In addition, in the arm member 160, a protrusion 162 for bumping against the disc 12 stretches toward the direction of being set apart from the arm member 160. In addition, the detection switch 161 is mounted onto the main chassis 20. Moreover, the detection switch 161 is arranged in the position on the main chassis 20, where the detection switch 161 is pushed in by a rib 37 of the right side loading arm 30.

Here, the disc detection mechanism will not be limited to such configuration but can be modified variously, for example, by arranging a detection sensor for detecting an insertion of the disc 12 on the upper side on the right side where no conveyance roller 140 is present.

The loading mechanism 11 configured as described above and operations of the disc player 10 with that loading mechanism 11 will be described below.

At first, operations of bringing in the large diameter disc 12a will be described. The large diameter disc 12a is inserted to inside the disc player 10. Then the outer circumferential edge of the large diameter disc 12a bumps against the protrusion 162 illustrated in FIG. 17. Further from this state, the large diameter disc 12a moves into the disc player 10. Then as the large diameter disc 12a progresses, the arm member 160 is pushed in and rotated toward the counterclockwise direction in FIG. 13 and the others. Then, in conjunction with that push-in, the loading arm 30 on the right side is also caused to rotate to the counterclockwise direction in FIG. 13 and the others.

Due to that rotation, the rib 37 pushes in the detection switch 161. Then, the loading motor 71 is provided with predetermined electrical power to activate the loading motor 71. Then, driving force generated by the loading motor 71 is transmitted to the conveyance roller 140 through the roller gear train 150. At this time, the conveyance roller 140 rotates in the direction of causing the large diameter disc 12a to progress to the back side of the disc player 10. Thereby, the large diameter disc 12a, on the left side in FIG. 13 and the others, is caused to progress to the backside of the disc player 10.

Here, in the case where the reverse surface (lower surface) of the large diameter disc 12a contacts with the conveyance roller 140, the front surface (upper surface) of the large diameter disc 12a contacts with the disc guide 26. In this case, the disc guide 26 contacts with the outer circumferential edge of the surface of the large diameter disc 12a.

Here, since only the left side of the large diameter disc 12a is being sent in by the conveyance roller 140, the large diameter disc 12a rotates clockwise and progresses inside the disc player 10. When the large diameter disc 12a progresses inside the disc player 10 in such a rotary state, the large diameter disc 12a bumps against the disc retaining part 34 of the loading arm 30 on the left side at first and a part on the left side of the outer edge of the large diameter disc 12a is received by the disc retaining part 34.

In the case where the large diameter disc 12a is sent inside the disc player 10 by the conveyance roller 140 further in this state, a part on the right side of the outer edge of the large diameter disc 12a is also received by the disc retaining part 34 of the right side loading arm 30. At this time, the large diameter disc 12a comes into the state of being retained on the outer edge on the both of its left and right sides. In this state, the conveyance roller 140 is driven to rotate further. Then, the large diameter disc 12a moves toward inside the disc player 10, opposing bias force of the spring member 50. Here, at this time, accompanied by the insertion of the large diameter disc 12am, a pair of the loading arms 30 and 30 is rotated with the rotary axis 31 being as a fulcrum, widening the mutual distance between each arm.

In addition, when the push-in progresses to a predetermined extent, the outer circumferential edge on the back side of the large diameter disc 12a comes into contact with the disc retaining part 84 of the eject arm 80. At this time, the large diameter disc 12a comes into the state of being retained by three disc retaining parts 34, 34 and 84.

Figure 19:
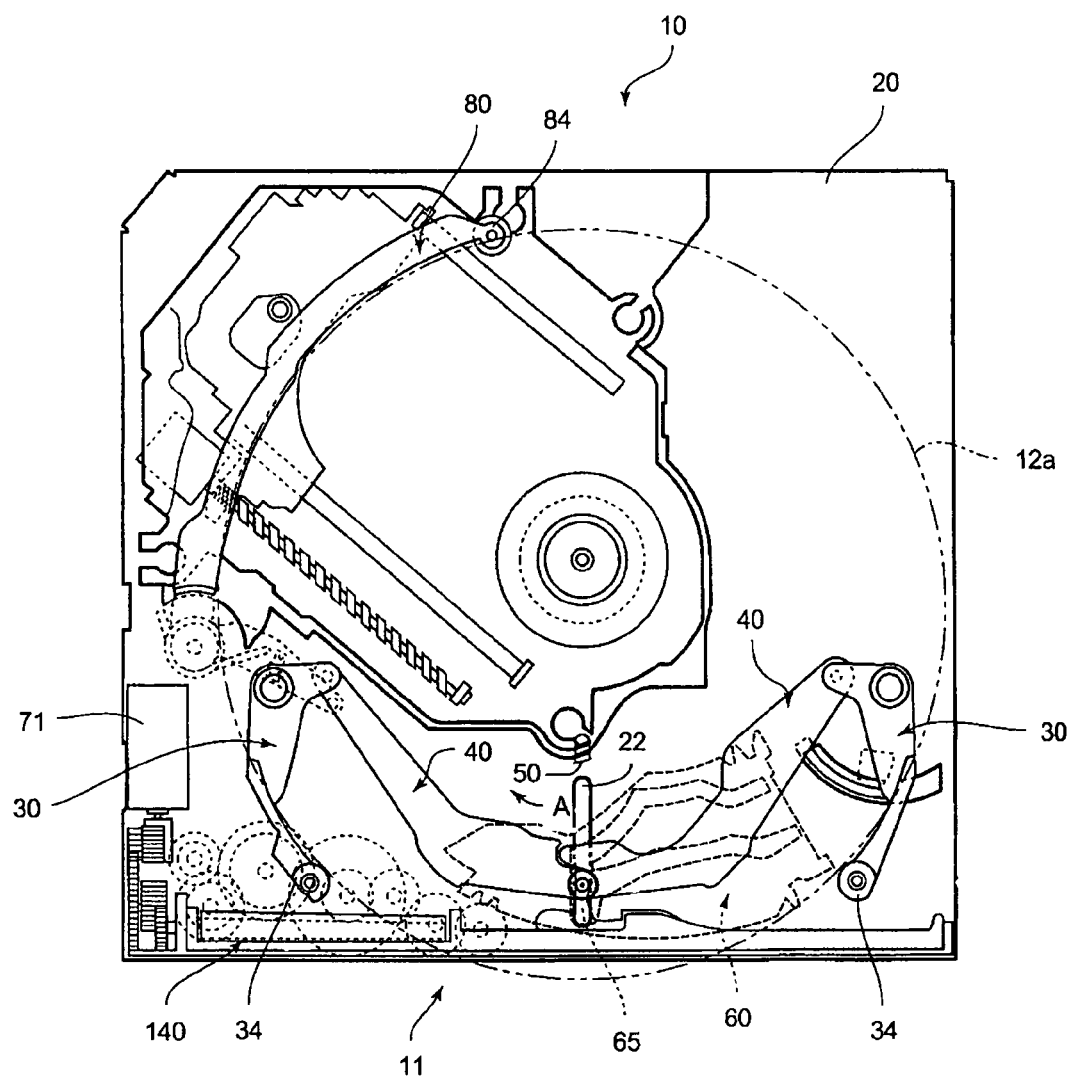
FIG. 19 is a plan view illustrating the state where the large diameter disc is inserted and an eject arm rotates significantly in the disc player of FIG. 13.

The conveyance roller 140 is driven to push in the large diameter disc 12a toward the back side. Then as illustrated in FIG. 19, the link connection axis 41 comes in the vicinity of the end part on the front side of the connection guide groove 65. At this time, a trigger mechanism not illustrated in the drawing is activated so that one gear and the other gears are meshed together. Then the loading gear train 70 comes into the state of enabling the transmission of driving force and the driving force is transmitted to the external peripheral gear 61 meshed with the last stage gear 70a of the loading gear train 70.

Here, in the stage before the trigger mechanism is activated, the center point P of the large diameter disc 12a passes through a Q-Q line (the Q-Q line is a line obtained by connecting the contact portions of the two loading arms 30 and 30 with the large diameter disc 12a) illustrated in FIG. 18. At this time, the center point P is positioned inside a figure (triangle) obtained by connecting the contact points of the large diameter disc 12a and the disc retaining parts 34, 34 and 84. That is, when the center point P of the large diameter disc 12a overpasses the Q-Q line toward the sending-in side, with bias force of the spring member 50, force is given for the loading arms 30 and 30 to contact with the outer circumferential edge of the large diameter disc 12a and the loading arms 30 and 30 are faced inwardly each other. Here, in this regard, the same is true in the case of the small diameter disc 12b as described below. In addition, in the state where the center point P overpasses the Q-Q line and the trigger mechanism not illustrated in the drawing is activated, not only sending in the disc 12, ejecting the disc 12 to a predetermined position without the conveyance roller 140 and retaining the disc 12 are also carried out.

When the trigger mechanism is activated, the drive cam 60 starts to slide toward the left side (in the arrowed direction A) in FIG. 19. By that slide, the link connection axis 41 progresses inside the sending-in cam part 63a in the large diameter disc cam groove 63. Then, the link connection axis 41 is pushed in by bias force of the spring member 50 or the inner wall of the sending-in cam part 63a to move toward the back side of the disc player 10 as the drive cam 60 moves toward the left side. By that movement, the tip side of the link lever 40 is caused to move toward the back side as well. Here, since the length dimension from the tip side of the link lever 40 to the connecting axis 36 is fixed and the length dimension from the rotary axis 31 of the loading arm 30 to the connecting axis 36 is also fixed, the position of the connecting axis 36 is determined uniquely when the link connection axis 41 moves. In the case where the link connection axis 41 moves toward the back side, the position of the connecting axis 36 moves to a position where the disc retaining parts 34 and 34 rotate in the direction of coming closer to each other.

Thus, as the drive cam 60 slides toward the left side, the loading arm 30 is caused to rotate in the direction that the disc retaining parts 34 and 34 come closer to each other. At this time, with the conveyance roller 140 being driven to rotate, the large diameter disc 12a is sent inside the disc player 10 by the rotary drive of the conveyance roller 140 together with the rotation of the disc retaining part 34. At this time, the large diameter disc 12a opposes the bias force applied by the eject spring 86 through the eject arm 80 and progresses toward the back side of the disc player 10.

When the drive cam 60 slides leftwards to a predetermined extent, the link connection axis 41 exits from the sending-in cam part 63a and enters the retaining cam part 63b. At this occasion, as illustrated in FIG. 20, the large diameter disc 12a is in the state (centering state) where its center is positioned in the top part of the turntable 101 for a disc clamp. In the centering state, the conveyance roller 140 does not overlap with a projection plane (in this case, a projection plane in a normal direction of the large diameter disc 12a) of the large diameter disc 12a in FIG. 13 and the others. That is, the large diameter disc 12a does not interfere with the conveyance roller 140.

As described above, while the link connection axis 41 is in the retaining cam part 63b, an elevator mechanism not illustrated in the drawing is activated to elevate the traverse unit 90 upwards. Thereby, the convex portion 102 of the turntable 101 is inserted into the center hole 12c of the large diameter disc 12a to complete the chucking of the large diameter disc 12a.

In addition, after the chucking is completed and the drive cam 60 slides further to a predetermined extent, the link connection axis 41 exits from the retaining cam part 63b and enters the releasing cam part 63c. When the link connection axis 41 enters the releasing cam part 63c, the link connection axis 41 is pushed by the inner wall on the back side of the releasing cam part 63c and is slid toward the front side. Then, the loading arm 30 is caused to rotate so that the disc retaining parts 34 and 34 are mutually set apart as the link connection axis 41 moves to the front side. In addition, the first holding part 66a of the drive cam 60 bumps against the release lever part 85 and gradually pushes in this release lever part 85.

Figure 21:
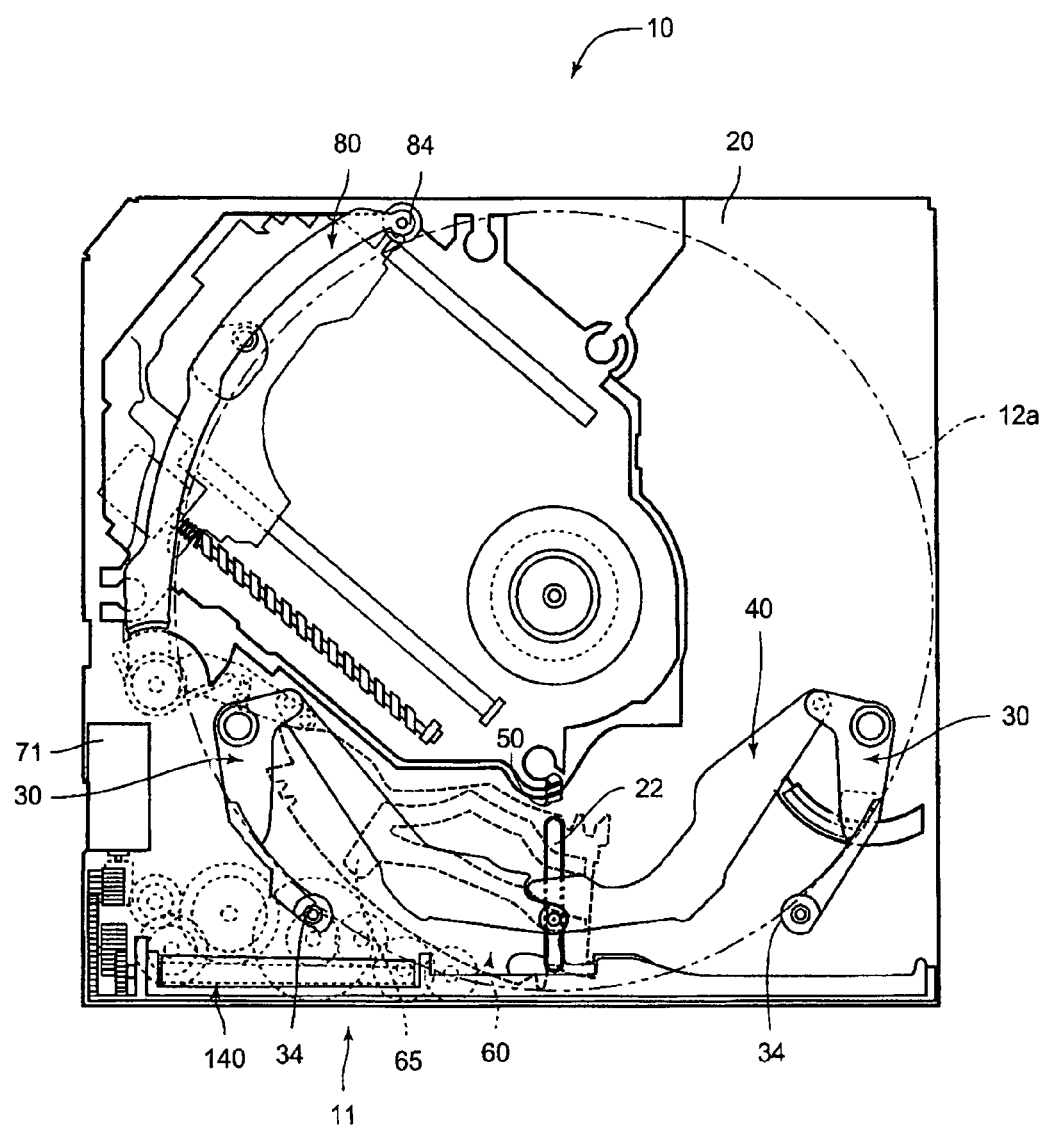
FIG. 21 is a plan view illustrating the state where a disc retaining part is set apart from an outer circumferential edge of the large diameter disc in the disc player of FIG. 13.

When the link connection axis 41 exits from the releasing cam part 63c and enters the release maintaining cam part 63d and reaches its right side end, the first holding part 66a pushes in the release lever part 85. Thereby the eject arm 80 is caused to rotate so that the disc retaining part 84 does not contact with the outer circumferential edge of the large diameter disc 12a. Accompanied with this, the disc retaining parts 34 and 34 are released from retaining the outer circumferential edge of the large diameter disc 12a and the disc retaining parts 34, 34 and 84 do not contact with the large diameter disc 12a as illustrated in FIG. 21.

Here, concurrently with the disc retaining parts 34, 34 and 84 being released, the traverse unit 90 is moved to the position for replaying the large diameter disc 12a by an elevator mechanism (not illustrated) in conjunction with the movement of the drive cam 60. In addition, in the case where the link connection axis 41 enters the release maintaining cam part 63d and the drive cam 60 approaches to the left side end, the drive cam 60 pushes in a position detection switch not illustrated in the drawing but being present on the main chassis 20. Thereby, the drive of the loading motor 71 is stopped and the drive cam 60 stops sliding.

Thereafter, the spindle motor 100 is driven and thereby the turntable 101 is rotated and the optical pickup 95 is activated concurrently. Thereby replaying the disc by reading information stored in the large diameter disc 12a is enabled.

Subsequently, operations of ejecting the large diameter disc 12a will be described. In this case, at first a user, for example, pushes an eject button not illustrated and a control command corresponding with ejection is generated. A current for the rotation corresponding with ejection is applied to the loading motor 71 through a control circuit not illustrated in the drawing. Thereby, the loading gear train 70 is driven to transmit driving force, which is opposite to the above described driving force, to the external peripheral gear 61 meshed with the last stage gear 70a of the loading gear train 70.

Here, the activation of the above described loading motor 71 drives the roller gear train 150 to rotate as well. Here, before the large diameter disc 12a slides toward the front side, the large diameter disc 12a does not overlap with the conveyance roller 140. Therefore, in that state, the conveyance roller 140 is in an idling state in the direction of ejecting the large diameter disc 12a with the aid of the transmitted driving force through the roller gear train 150.

When the driving force is transmitted to the drive cam 60 as described above, the drive cam 60 starts to slide toward the right side (direction opposite to the direction of an arrow A in FIG. 19) in FIG. 21. Prior to that slide or concurrently with that slide, the traverse unit 90 is moved to the position for performing a chucking release of the large diameter disc 12a by the elevator mechanism not illustrated in the drawing.

After this state is established, when the drive cam 60 slides toward the right side further, the link connection axis 41 enters from the release maintaining cam part 63d to the releasing cam part 63c. Then the link connection axis 41 is pushed in by the bias force of the spring member 50 or by the inner wall on the front side of the releasing cam part 63c and moves toward the back side. This progress brings the disc retaining part 34 into the state of retaining the outer circumferential edge of the large diameter disc 12a. On the other hand, when the drive cam 60 slides to the right side, the first holding part 66a of the drive cam 60 is gradually set apart from the release lever part 85 of the eject arm 80. Thereby, in receipt of bias force by the eject spring 86, the eject arm 80 will come into the state of applying the bias force to the external peripheral portion of the large diameter disc 12a. In addition, substantially at the same timing as a pair of the disc retaining parts 34 and 34 retain the outer circumferential edge, the disc retaining part 84 of the eject arm 80 will come into the state of retaining the external periphery part of the large diameter disc 12a by the above described bias force of the eject spring 86.

Moreover, when the drive cam 60 further slides, the link connection axis 41 enters inside the retaining cam part 63b. In the slide of the drive cam 60 to the right side, while the link connection axis 41 is in the retaining cam part 63b, an elevator mechanism not illustrated in the drawing is activated to descend the traverse unit 90. At this time, since the outer circumferential edge of the large diameter disc 12a is retained by the disc retaining parts 34, 34 and 84 (see FIG. 20), as the traverse unit 90 is descended, the a disc chucking mechanism not illustrated resided on the turntable 101 is released. The descent of the traverse unit 90 disengages the convex portion 102 of the turntable 101 from the center hole 12c of the large diameter disc 12a. Thus, the retained state of the large diameter disc 12a is released.

After the completion of the chucking release of the large diameter disc 12a, the link connection axis 41 exits from the retaining cam part 63b and enters the sending-in cam part 63a. Then, the link connection axis 41 is pushed in by the inner wall on the back side of the sending-in cam part 63a this time. Thereby, the link connection axis 41 moves toward the front side. Accompanied by such movements of the link connection axis 41, the loading arm 30 is caused to rotate through the link lever 40 in the direction of causing the disc retaining parts 34 and 34 to set apart each other. And, as the disc retaining parts 34 and 34 are gradually set apart each other, the large diameter disc 12a is gradually pushed out toward the front side by the bias force of the eject spring 86 via the eject arm 80.

Here, as the large diameter disc 12a is pushed out toward the front side, the left front part of the lower surface of the large diameter disc 12a contacts with the conveyance roller 140. Here, the conveyance roller 140 is idling toward the direction of ejecting the large diameter disc 12a as described above. Therefore, when a part of the large diameter disc 12a comes into contact with the conveyance roller 140, the conveyance roller 140 attempts to eject the large diameter disc 12a together with the eject arm 80 toward the front side.

Figure 22:
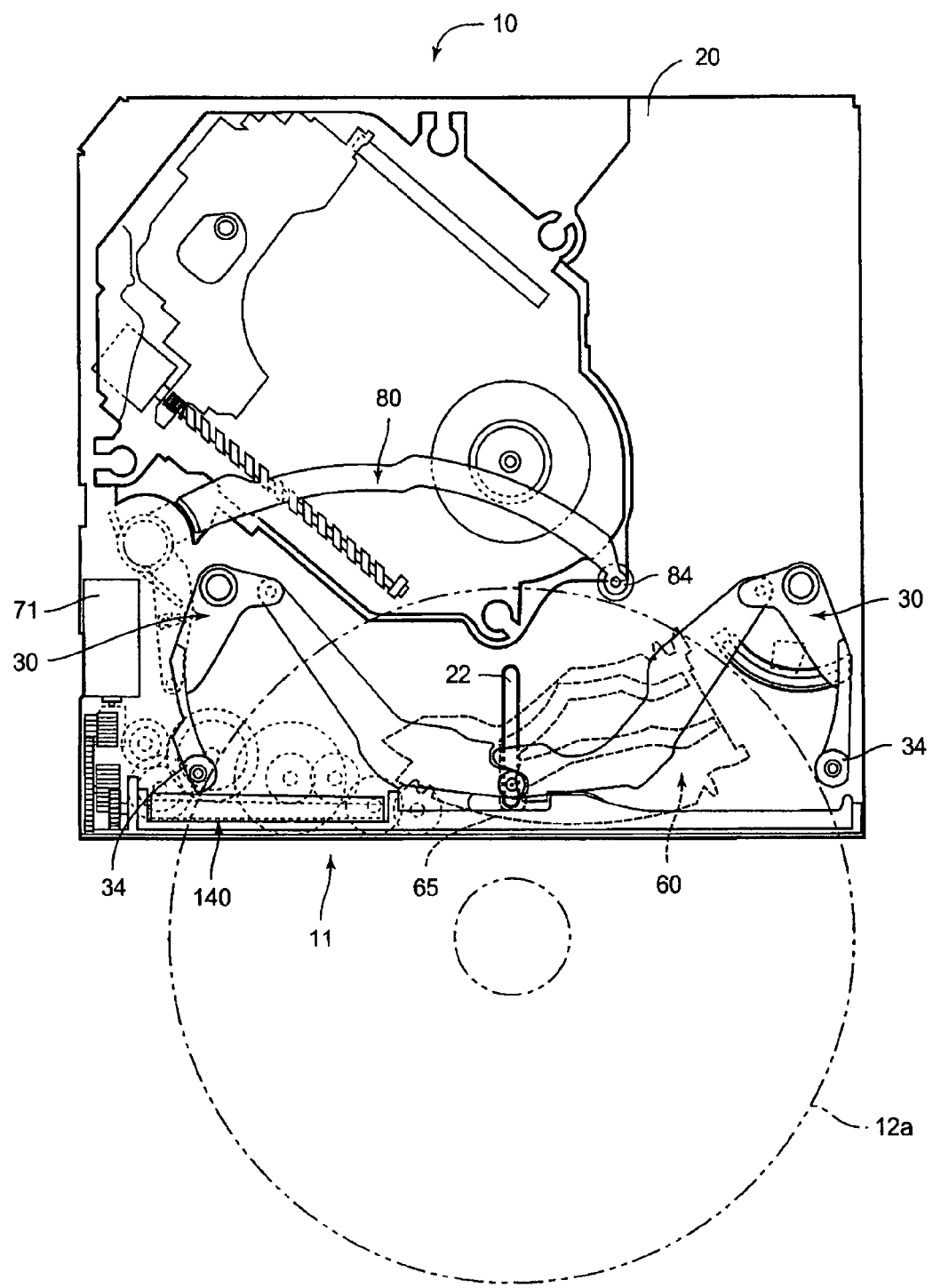
FIG. 22 is a plan view illustrating the state where the large diameter disc is ejected to the position where the loading motor stops in the disc player of FIG. 13.

And after the eject arm 80 rotates to a predetermined extent, the release lever part 85 pushes in the arm detection switch 110. Thereby, the loading motor 71 is stopped driving. Here, in the case where the release lever part 85 pushes in the arm detection switch 110, the large diameter disc 12a is sufficiently ejected to the front side as illustrated in FIG. 22.

So far, operations of bringing in/taking out the large diameter disc 12a have been described. Subsequently, operations of bringing in/taking out the small diameter disc 12b will be described.

Figure 23:
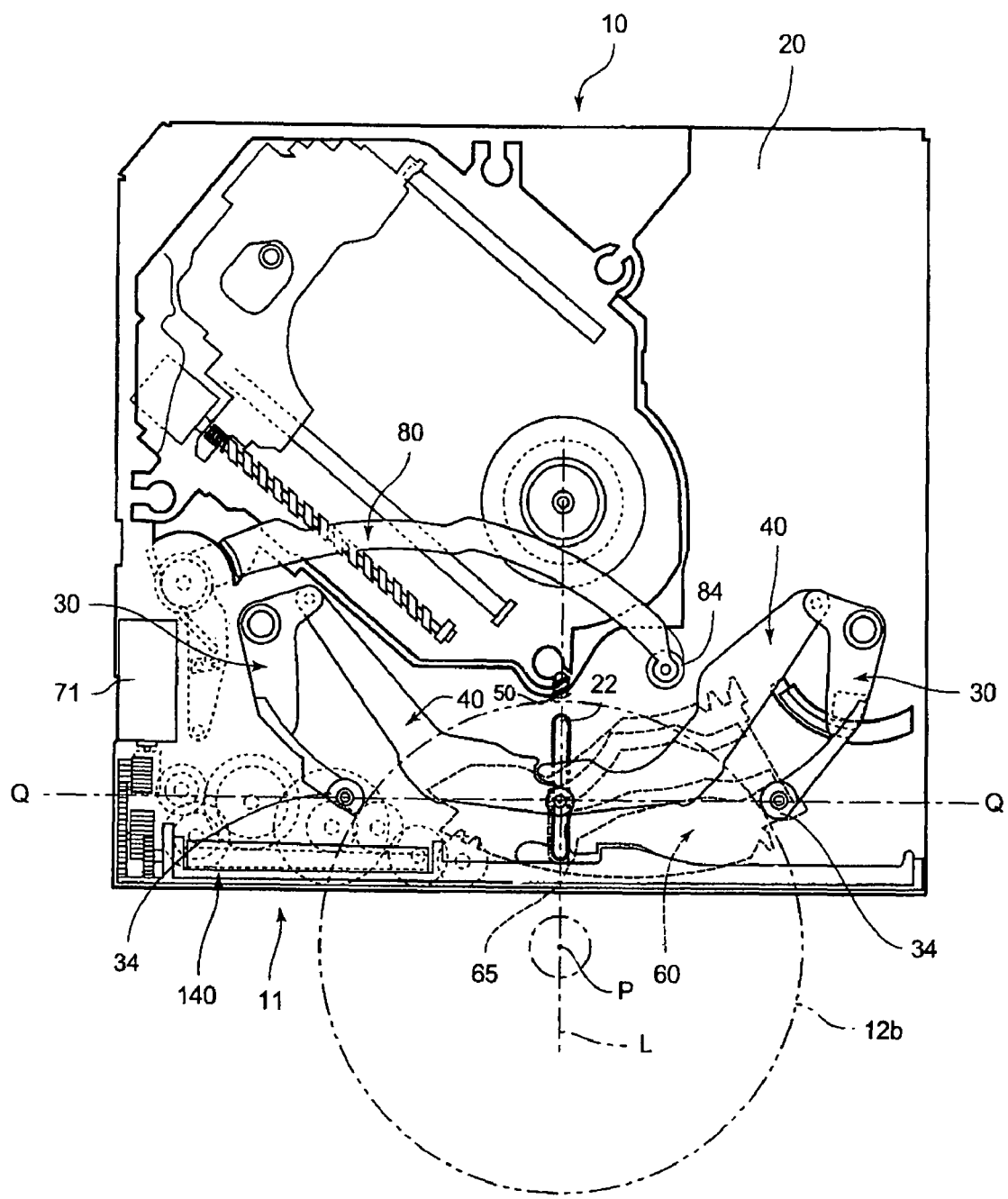
FIG. 23 is a plan view illustrating the state where the small diameter disc comes in contact with the disc retaining part of the loading arm in the disc player of FIG. 13.

Similar to the case of bringing in the large diameter disc 12a, also in the case of bringing in the small diameter disc 12b, as the small diameter disc 12b progresses, the arm member 160 is caused to rotate toward the counterclockwise direction in FIG. 23 and the others. In conjunction with that rotation, the loading arm 30 on the right side is caused to rotate toward the counterclockwise direction in FIG. 23 and the others. The rib 37 pushes in the detection switch 161 and the loading motor 71 is provided with predetermined electrical power to activate the loading motor 71.

Then, due to the driving of the loading motor 71, the conveyance roller 140 causes the small diameter disc 12b to progress toward the back side of the disc player 10. At this time, similar to the large diameter disc 12a, the small diameter disc 12b bumps against the disc retaining part 34 of the loading arm 30 on the left side at first and a part on the left side of an outer edge of the small diameter disc-12a is received by the disc retaining part 34. In this state, when the small diameter disc 12b is further sent inside the disc player 10 by the conveyance roller 140, a part on the right side of the outer edge of the small diameter disc 12b is also received by the disc retaining part 34 of the loading arm 30 on the right side.

In this state, the conveyance roller 140 is driven to rotate further, the small diameter disc 12a moves toward inside the disc player 10, opposing bias force of the spring member 50. And the outer circumferential edge on the back side of the small diameter disc 12b comes into contact with the disc retaining part 84 of the eject arm 80. Thereby, the small diameter disc 12b is retained by three disc retaining parts 34, 34 and 84.

Figure 24:
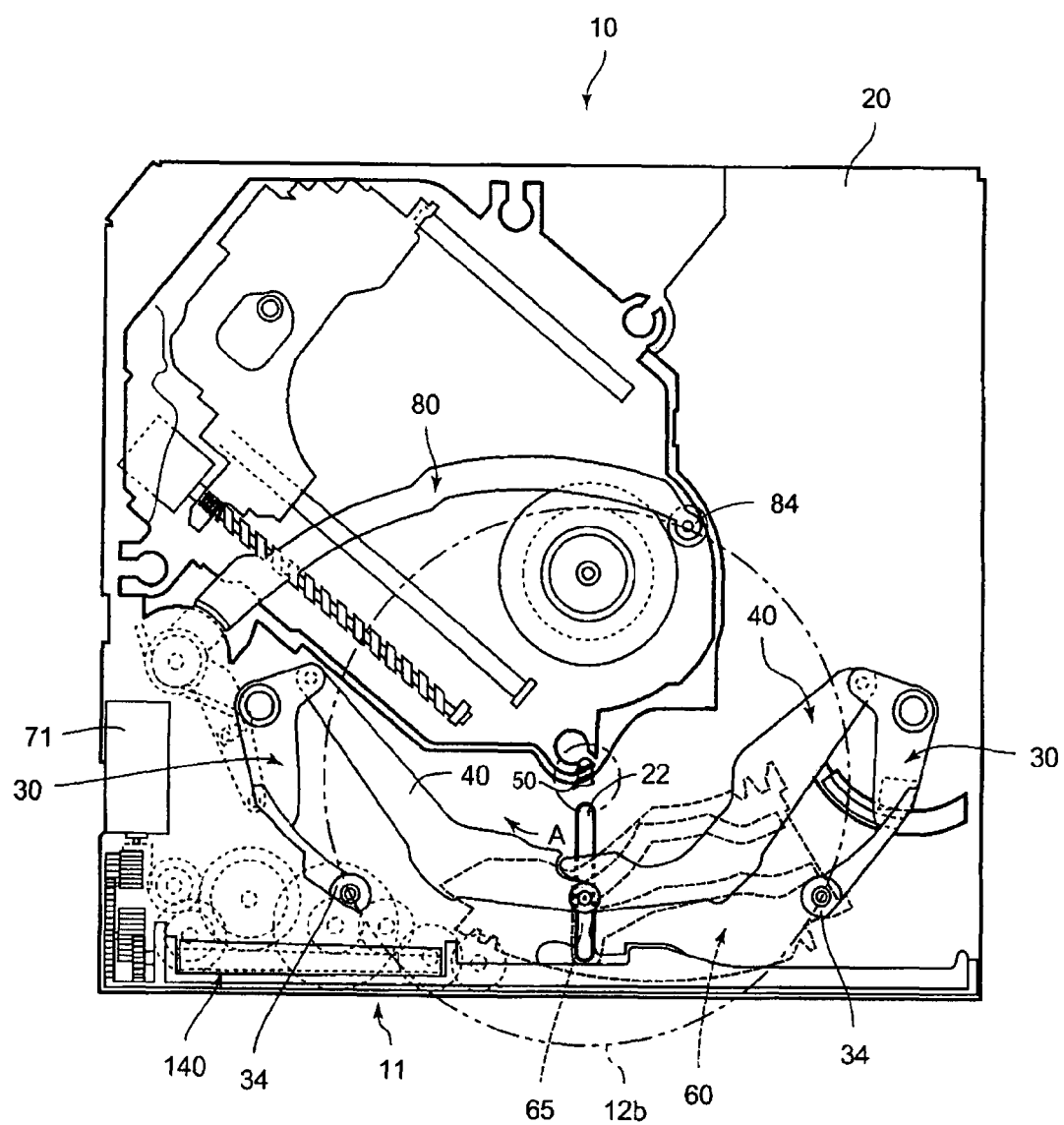
FIG. 24 is a plan view illustrating the state where the small diameter disc is inserted and the eject arm rotates significantly in the disc player of FIG. 13.

Moreover, the conveyance roller 140 is driven to push in the small diameter disc 12b toward the back side. Then as illustrated in FIG. 24, the link connection axis 41 is in the vicinity of the end part on the back side of the connection guide groove 65. At this time, due to the activation of the trigger mechanism not illustrated in the drawing, one gear and the other gears are meshed together so as to establish the state where the driving force is transmitted to the external peripheral gear 61.

Here, before the trigger mechanism is activated, the center point P of the small diameter disc 12b passes through the Q-Q line illustrated in FIG. 23. The center point P is positioned inside a figure (triangle) obtained by connecting the contact points of the small diameter disc 12b and the disc retaining parts 34, 34 and 84.

The trigger mechanism is activated and the drive cam 60 slides toward the left side (in the arrowed direction A) in FIG. 24. Here, in bringing in the small diameter disc 12b, the link connection axis 41 progresses along the respective portions of the small diameter disc cam groove 64. Such progressing movements are basically similar to the case of the large diameter disc 12a. The link connection axis 41 sequentially progresses along the sending-in cam part 64a, the retaining cam part 64b, the releasing cam part 64c and the release maintaining cam part 64d in the small diameter disc cam groove 64.

Figure 25:
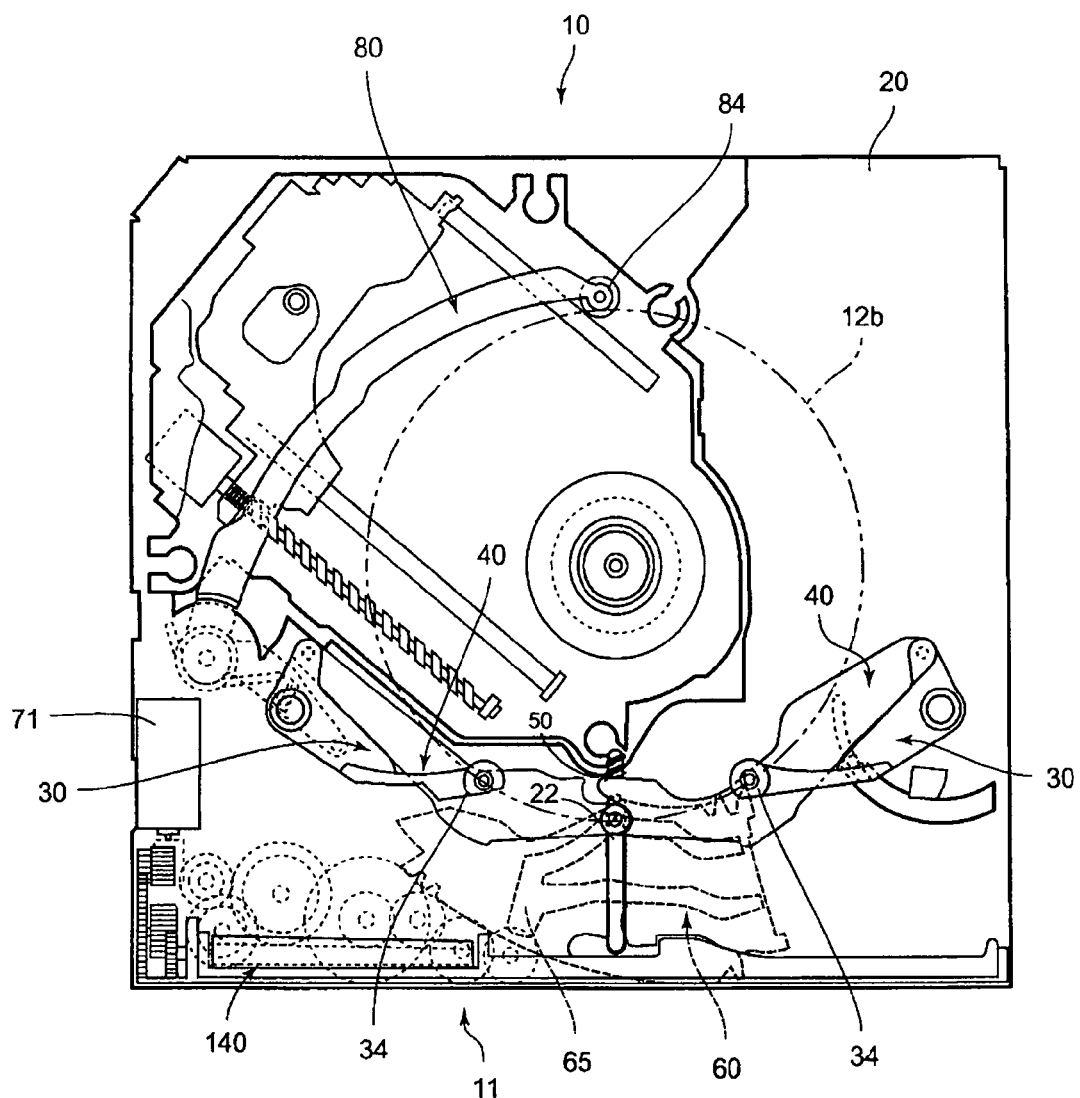
FIG. 25 is a plan view illustrating the state where centering of the small diameter disc is carried out in the disc player of FIG. 13.
Figure 26:
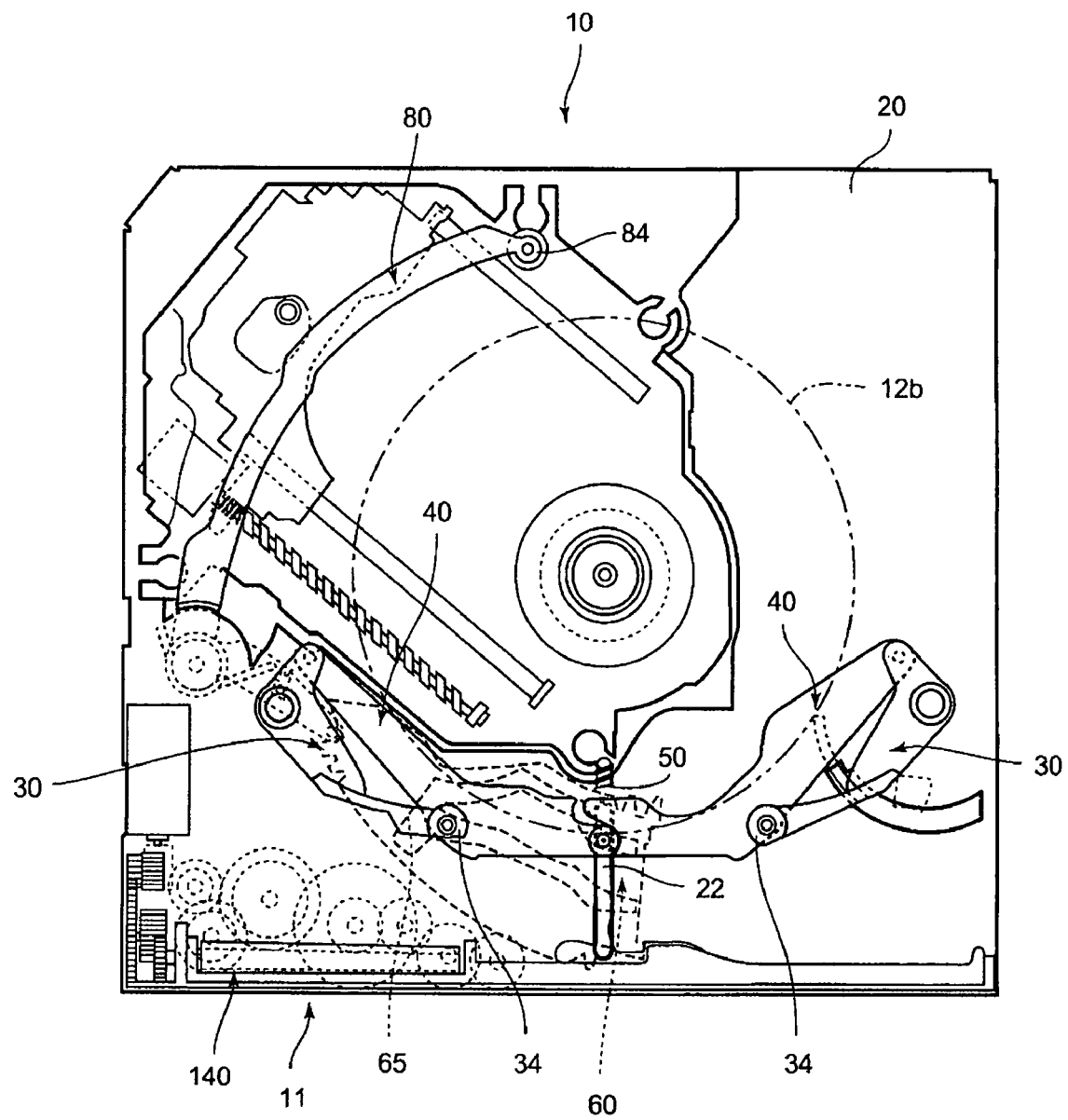
FIG. 26 is a plan view illustrating the state where a disc retaining part is set apart from an outer circumferential edge of the small diameter disc in the disc player of FIG. 13.
Figure 27:
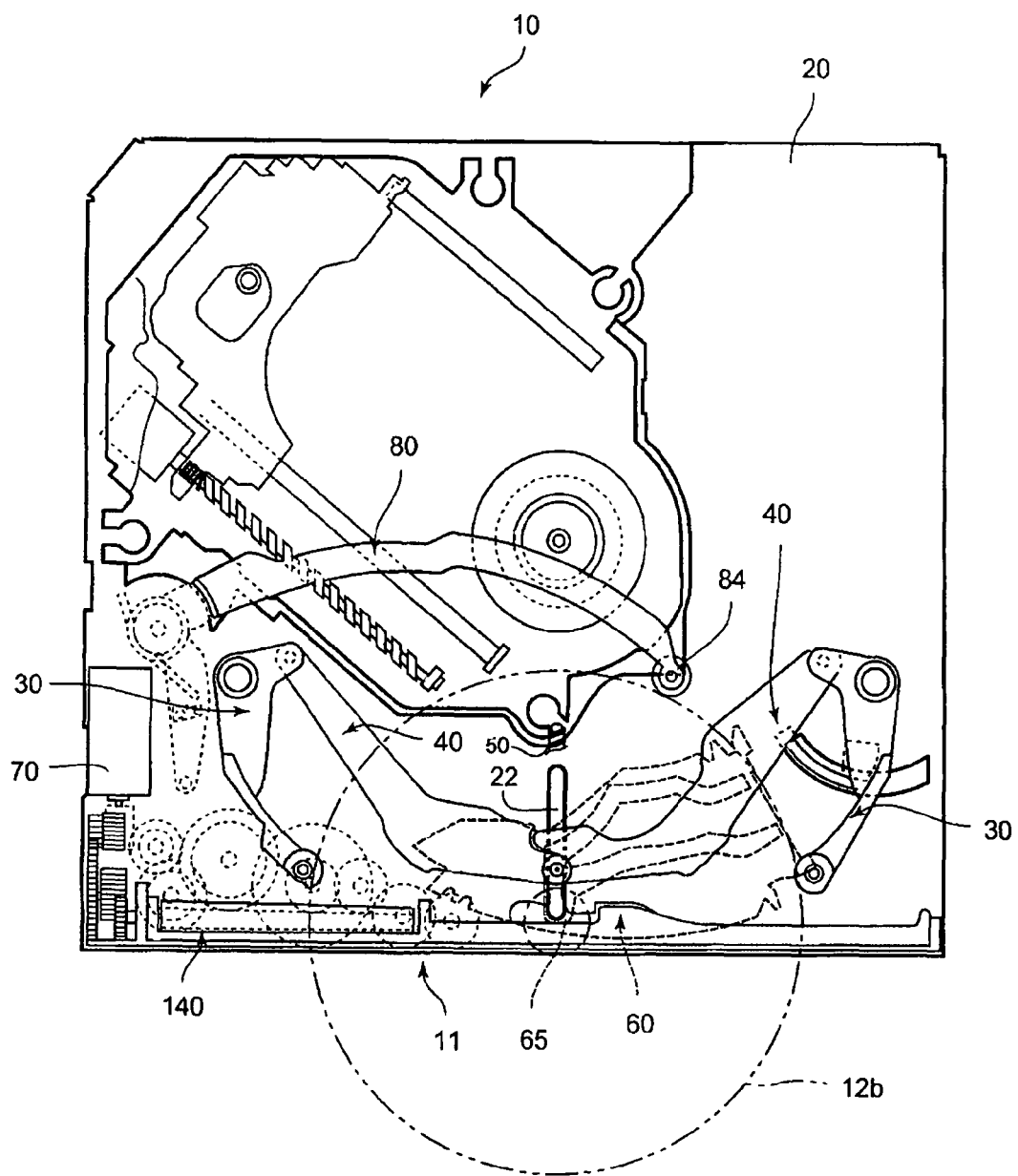
FIG. 27 is a plan view illustrating the state where the small diameter disc is ejected to the position where the loading motor stops in the disc player of FIG. 13.

And, when the link connection axis 41 is positioned in the retaining cam part 64b, a chucking of the small diameter disc 12b to the turntable 101 is carried out (see FIG. 25). And as the link connection axis 41 progresses along the releasing cam part 64c, the retained state of the small diameter disc 12b is gradually released (see FIG. 26). In addition, when the small diameter disc 12b is positioned in the release maintaining cam part 64d, the traverse unit 90 is moved to the position where the small diameter disc 12b can be replayed. After such movements, the state where the small diameter disc 12b can be replayed is established.

In addition, the operations in the case of ejecting the small diameter disc 12b are similar to the operations in the case of ejecting the above described large diameter disc 12a. A push-in operation and the like on the eject button by a user drives the loading motor 71. With that drive, driving force opposite to the above described driving force is transmitted to the external peripheral gear 61. Thereafter, the link connection axis 41 sequentially progresses along the release maintaining cam part 64d, the releasing cam part 64c, the retaining cam part 64b and the sending-in cam part 64a (sequentially undergoes the states illustrated in FIG. 26, FIG. 25, and FIG. 24). Thereby the ejection operations similar to the case of the large diameter disc 12a are carried out and finally the small diameter disc 12b is ejected to the position illustrated in FIG. 27. At this time, the release lever part 85 pushes in the arm detection switch 110 and the loading motor 71 is stopped driving.

According to the loading mechanism 11 as described above and the disc player 10 with this loading mechanism 11, the disc 12 is retained on its outer circumferential edge by a pair of the loading arms 30 and 30 and the eject arm 80. Therefore, on the back side of the disc player 10, the disc 12 is retained by the loading arms 30 and 30 and the eject arm 80 to enable a stable conveyance/retainment.

In addition, in the present invention, the conveyance roller 140 is arranged outside the projection plane of the disc 12. Therefore, the disc 12 and the conveyance roller 140 do not interfere with each other at the occasion of chucking and the like of the disc 12. Thereby, compared with a system of conveying the disc 12 with a conveyance roller, the mechanism for moving the roller up and down for, for example, a withdrawal of the roller will become unnecessary. Therefore, the simplification of the loading mechanism 11 becomes feasible.

In addition, the portion on the front side of the disc player 10 is provided with the conveyance roller 140 and the disc guide 26. Therefore, even if the disc 12 is not sufficiently inserted into the disc player 10, it is possible to bring in the disc 12 to the back side of the disc player 10 with the aid of the driving of the conveyance roller 140. In addition, when ejecting the disc 12 from inside of the disc player 10, the disc 12 can be sufficiently ejected. Therefore, the insertion operations and takeout operations of the disc 12 become easier and the usability of the disc player 10 is improved.

In addition, after the disc 12 is ejected once, the disc player 10 of the present embodiment can bring the disc 12 in again.

That is, so-called reloading without hands of a user can be achieved. Therefore, usability of the disc player 10 is further improved.

Moreover, the disc player 10 of the present embodiment ejects the disc 12 by the driving of the conveyance roller 140. Here, it is configured that the release lever part 85, by the rotation of the eject arm 80, pushes in the arm detection switch 110 to stop the driving of the loading motor 71. Therefore, the ejection amount of the disc 12 becomes stable and the dispersion on the ejection position of the disc 12 is restrained.

In addition, the conveyance roller 140 is positioned in the state of being biased to one side in the width direction on the front side of the disc player 10. Therefore, it becomes possible to arrange a disc detection mechanism (the arm member 160 in the present embodiment) for detecting the insertion of the disc 12, the disc detection mechanism arranged in the position on the front side of the disc player 10 where the conveyance roller 140 does not reside. In addition, by providing such a disc detection mechanism, immediately after the tip of the disc 12 is inserted into the disc player 10, the loading motor 71 can be activated and a user does not have to push the disc 12 into the disc player 10 more than needed.

Moreover, the right side end of the conveyance roller 140 (the other side) in FIG. 13 and the others is positioned on the left side (one side) from line L. Therefore, the position on the forefront side of the large diameter disc 12a may occasionally overlap with the center axis line of the roller shaft 141. However, the large diameter disc 12a depicts an arc so as to prevent the interference with the conveyance roller 140. Therefore, even if such configuration of arranging the conveyance roller 140 on the front side is adopted, it is possible that the expansion of the disc player 10 in the backward direction is restrained.

In addition, the disc guide 26 is provided on the front side of the disc player 10. Therefore, when the disc 12 is inserted into the disc player 10, the back side part of the disc 12 can be nipped between the conveyance roller 140 and the disc guide 26. In this state, the conveyance roller 140 is driven to rotate and thereby the disc 12 can be stably sent in the disc player 10. In addition, in the present embodiment, the disc guide 26 is provided outside the projection plane of the disc 12 as well. Therefore, at the occasion of, for example, replaying the disc 12, the disc 12 and the disc guide 26 do not interfere with each other and the disc 12 can be replayed well.

In addition, in the above described disc player 10, depending on whether the large diameter disc 12a is present or the small diameter disc 12b is present, the rotary range of the loading arm 30 is determined. Depending on the difference in the rotary range of the loading arm 30, it is configured that the route where the link connection axis 41 progresses in the disc guide groove 62 can be changed. That is, the link connection axis 41 progresses inside the large diameter disc cam groove 63 in the case of the large diameter disc 12a and the link connection axis 41 progresses inside the large diameter disc cam groove 64 in the case of the small diameter disc 12b.

With such configuration, it can be said that whether the disc 12 is the large diameter disc 12a or the small diameter disc 12b is automatically discriminated only by the difference in the rotary range of the loading arm 30. Thereby, electrical discriminating means for discriminating the diameter of the disc 12 does not have to be used, therefore a loose connection and the like do not take place and reliability of the operations can be improved. In addition, a switch and the like do not have to be used for discriminating the diameter of the disc 12 and cost for that portion is reduced. Moreover, since a switch and the like do not have to be used for discriminating the diameter of the disc 12, the control program can be simplified and reliability of the operations at the time of loading the disc 12 can be increased.

In addition, the eject arm 80 is included and the bias force in the direction of ejecting the disc 12 is applied to the eject arm 80 by the eject spring 86. Since such bias force of the eject spring 86 is utilized and the link connection axis 41 is pushed to the inner walls of the disc guide groove 62, the rotation of the loading arm 30 is controlled, which makes sure the retainment of the disc 12 with the disc retaining parts 34, 34 and 84.

Moreover, as described above, at an occasion of retaining the disc 12 by the disc retaining parts 34, 34 and 84, the center of the disc 12 is positioned inside a figure (triangle) obtained by connecting the contact points of the disc 12 and the disc retaining parts 34, 34 and 84. In this way, the bias force and the like of the eject spring 86 and the like transmitted via the disc retaining part 84 can be received by the disc retaining parts 34, 34 and the like and a secured retainment of the disc 12 is achieved.

In addition, in the present embodiment, a pair of the loading arms 30 and 30 is connected so as to move in conjunction with each other through the link levers 40 and 40 and the link connection axis 41. Therefore, at the occasion of conveying the disc 12, a pair of the loading arms 30 and 30 is capable of carrying out opening-closing operations in conjunction with each other and thus can carry out contact/opening-closing operations to the disc 12 from the both sides in the width direction. Thereby, it will become possible to prevent the disc 12 from being biased to one side due to a one-side contact and the like to the disc 12. Thereby it will become possible to convey the disc 12 well.

Moreover, a link mechanism is comprised of a pair of the link levers 40 and 40 and the link connection axis 41 linking a pair of the link levers 40 and 40. Therefore, a slide of the link connection axis 41 in the link guide groove 22 and movements of the link levers 40 and 40 in conjunction with each other accompanied by that slide can uniquely determine the rotation position of the loading arm 30 and enables a secured retainment and sending-in of the disc 12.

In addition, the drive cam 60 is provided with a disc guide groove 62. The disc guide groove 62 is provided with a large diameter disc cam groove 63, a small diameter disc cam groove 64 and a connection guide groove 65. Thereby, in accordance with the disc diameter, i.e., the large diameter disc 12a or the small diameter disc 12e, the link connection axis 41 can be positioned in either the large diameter disc cam groove 63 or the small diameter disc cam groove 64 through the connection guide groove 65 and the like. Therefore, it will become possible to carry out switching well between the large diameter disc cam groove 63 and the small diameter disc cam groove 64, each corresponding to the diameter of the disc 12.

In addition, the link connection axis 41 is inserted in the disc guide groove 62 and also in the link guide groove 22 of the main chassis 20. Here, in the present embodiment, the longitudinal side of the link guide groove 22 is along the backward direction of the disc player 10. Therefore, the position of the link connection axis 41 in the width direction of the disc player 10 is fixed so that the loading arms 30 can concurrently and equally rotate.

Moreover, the large diameter disc cam groove 63 and the small diameter disc cam groove 64 are respectively provided with the sending-in cam parts 63a and 64a, the retaining cam parts 63b and 64b, the releasing cam parts 63c and 64c and the release maintaining cam parts 63d and 64d. Therefore, in the case where the link connection axis 41 is positioned in the sending-in cam parts 63a and 64a and progresses toward the retaining cam parts 63b and 64b, the disc player 12 can send the disc 12 in well. In addition, while the link connection axis 41 is positioned in the retaining cam parts 63b and 64b and progresses toward the releasing cam parts 63c and 64c, the traverse unit 90 is caused to ascend by an elevator mechanism not illustrated in the drawing. Moreover, by a clamp mechanism not illustrated in the drawing, it will become possible to carry out a chucking of disc 12 to the turntable 101.

In addition, while the link connection axis 41 is positioned in the releasing cam parts 63c and 64c and progresses toward the release maintaining cam parts 63d and 64d, it will become possible to carry out release of the retained state of disc 12 by the disc retaining parts 34, 34 and 84. Moreover, in the case where the link connection axis 41 is positioned in the release maintaining cam parts 63d and 64d, the state where the disc retaining parts 34, 34 and 84 do not contact with the disc 12 can be maintained so that the disc 12 can be replayed well.

Moreover, the eject arm 80 is provided with the release lever part 85 that may bump against the first holding part 66a and the second holding part 66b. Therefore, by the rotation of the drive cam 60, the release lever part 85 bumps against the first holding part 66a or the second holding part 66b. Thereby, the eject arm 80 can be rotated in the direction of releasing the disc retaining part 84 from retaining the disc 12. In particular, in the present embodiment, the drive cam 60 is provided with the first holding part 66a and the second holding part 66b respectively corresponding with the large diameter disc 12a and the small diameter disc 12b. Therefore, even in the case where either the large diameter disc 12a or the small diameter disc 12b is inserted, the disc retaining part 84 can be set apart from the outer circumferential edge of the disc 12 so as to replay the disc 12 well.

In addition, the drive cam 60 is provided with the external peripheral gear 61. That external peripheral gear is meshed with the last stage gear 70a of the loading gear train 70. Therefore, the driving force generated by the loading motor 71 is transmitted to the drive cam 60 well so as to enable the drive cam 60 to rotate well.

So far, an embodiment of the present invention has been described. However, the present invention can be modified variously in addition to the former embodiment. That will be described below.

Figure 28:
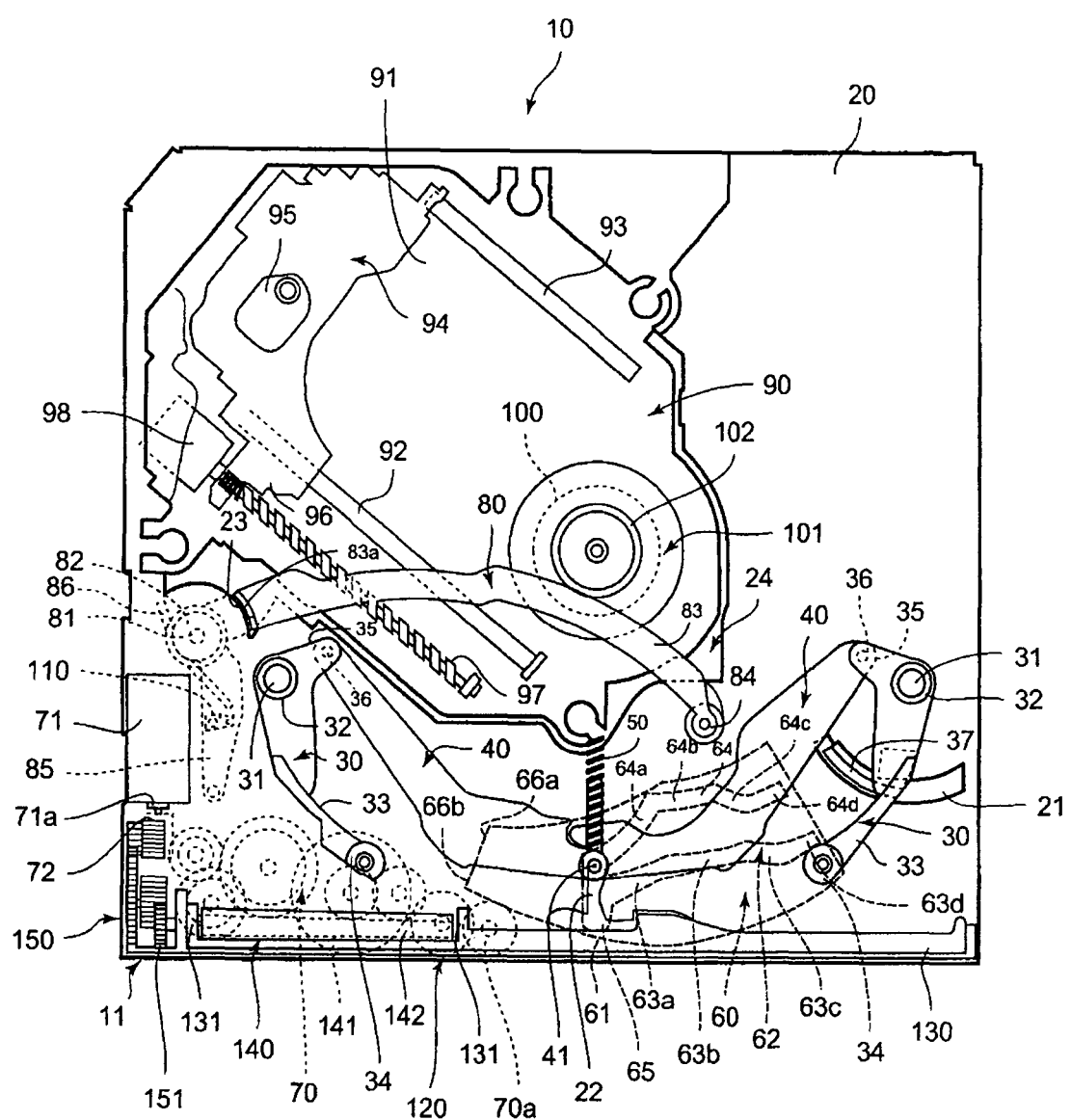
FIG. 28 relates to a variation of the disc player in FIG. 13 and is a plan view illustrating the state where a first holding part and a second holding part in a drive cam are formed from the same side.
Figure 29:
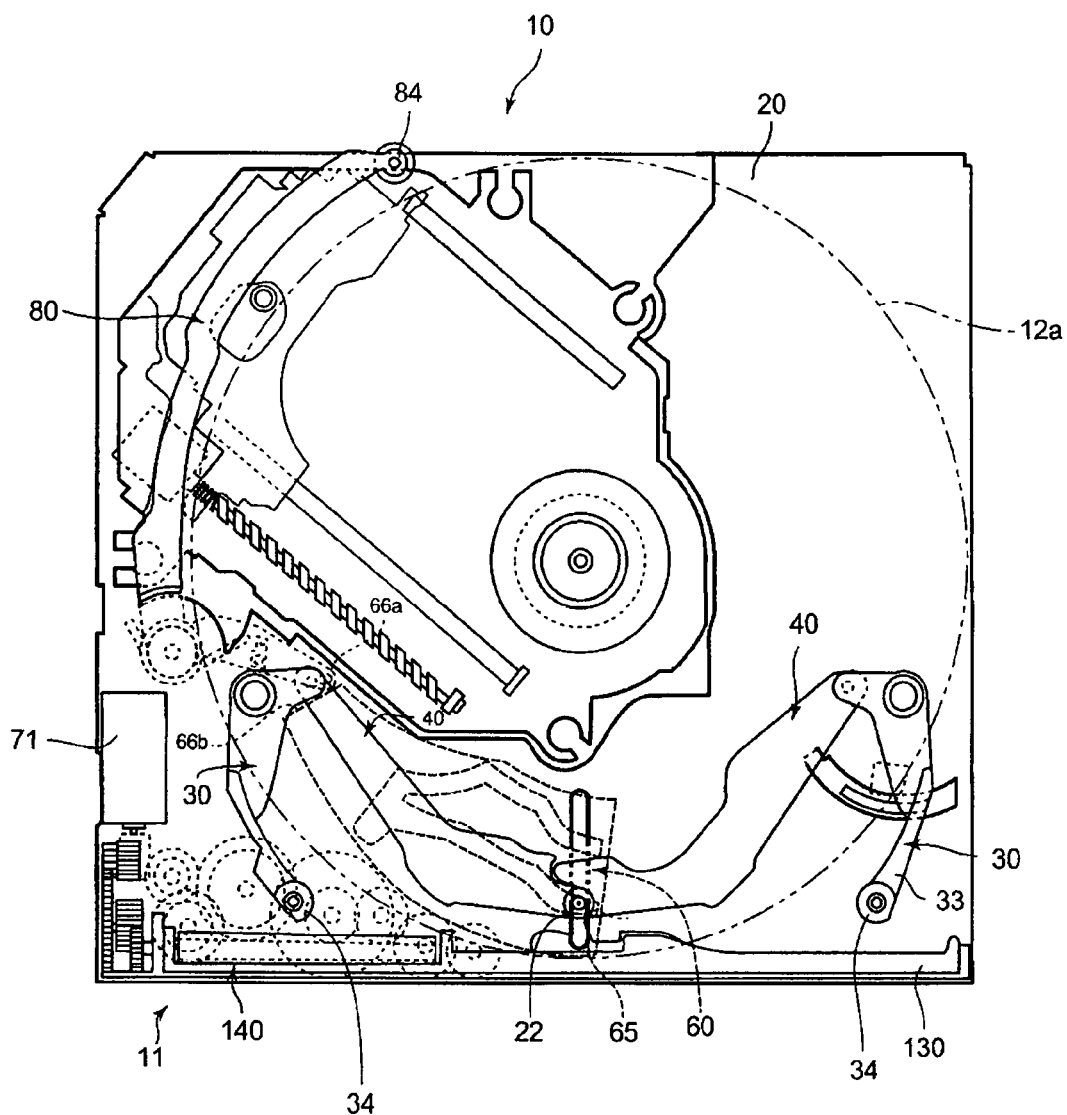
Figure 30:
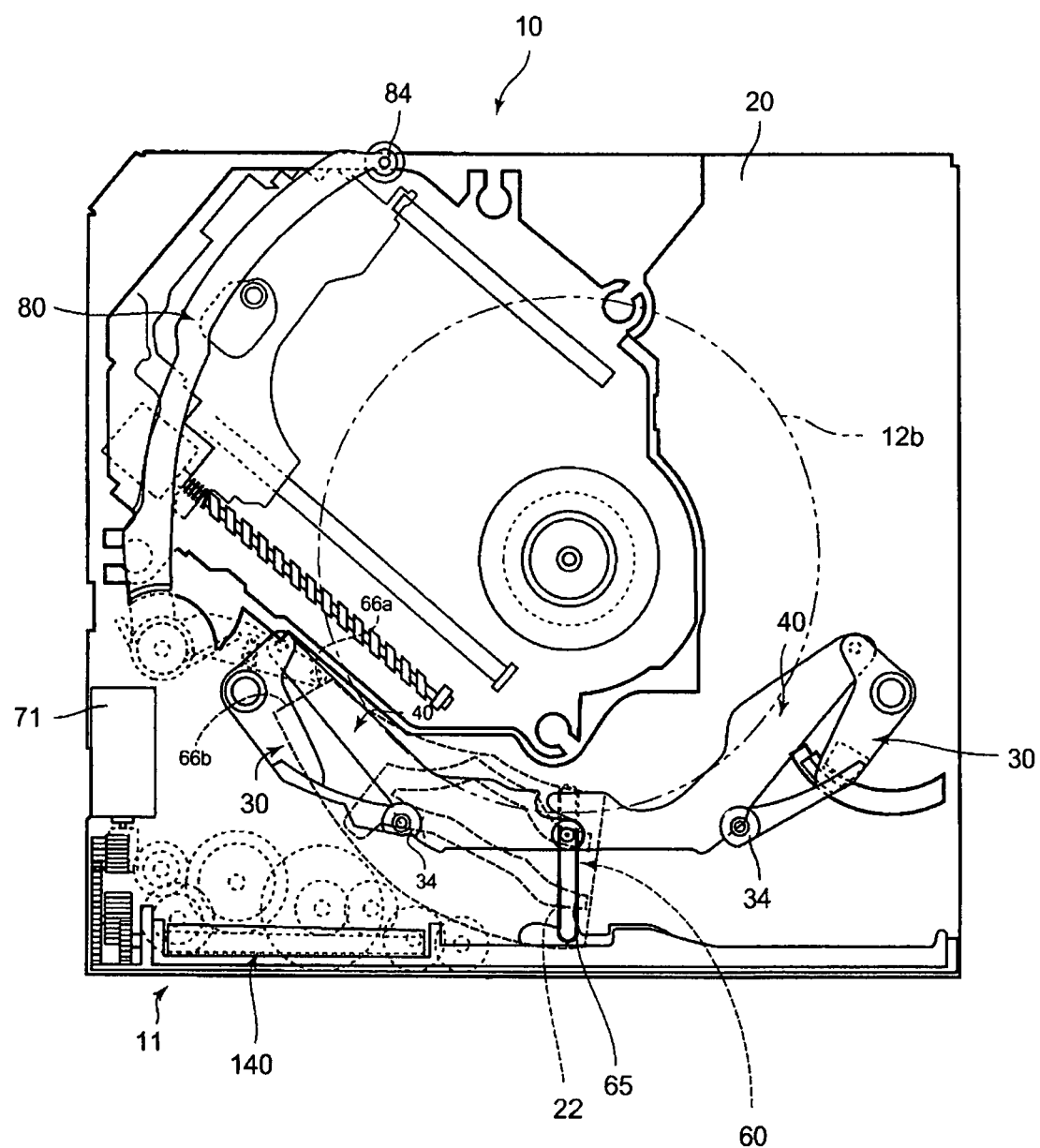

In the above described embodiment, the first holding part 66a and the second holding part 66b are formed from the respective separate sides in the drive cam 60. However, as illustrated in FIG. 28 to FIG. 30, the first holding part 66a and the second holding part 66b can be formed from the same side. Here, FIG. 28 illustrates the state before the disc 12 is sent in. FIG. 23 illustrates the state where the large diameter disc 12a has been sent in; and FIG. 29 illustrates the state where the small diameter disc 12 has been sent in.

As illustrated in FIG. 29, in the case where the first holding part 66a and the second holding part 66b are formed from the same side, the eject arm 80 is rotated to the same position for the large diameter disc 12a and the small diameter disc 12b. Therefore, even in the case of sending-in the small diameter disc 12b, a sufficient rotation of the eject arm 80 becomes possible and an ensured withdrawal of the eject arm 80 becomes possible.

In addition, in the above described embodiment, three arm members (the first arm member to the third arm member) including a pair of the loading arms 30, 30 and the eject arm 80 retain the outer circumferential edge. However, the number of the arm member will not be limited to three but can be four and more. In that case, more than two of any arm member from the first arm member, the second arm member and the third arm member or more than two of any two or more arm members from the first arm member, the second arm member and the third arm member can be provided. Here, also in the case of retaining the disc 12 with four or more arm members, the disc 12 is retained well in the state where the center portion of the disc 12 is positioned inside the figure obtained by connecting adjacent contact portions of the arm members to the disc 12.

In addition, in the above described embodiment, a pair of the link levers 40 and 40 is provided so that a pair of the loading arms 30 and 30 is configured to be rotated by a pair of those link levers 40 and 40. However, the above described embodiment can be configured so that, with a ball screw, for example, the screwed position in the loading arms 30 and 30 is adjusted so that the rotation of the loading arms 30 and 30 can be adjusted. Here, in that case, the link lever 40 will be omitted from the configuration.

In addition, in the above described embodiment, the driving force is transmitted to the drive cam 60 using the loading gear train 70. However, the driving force can be transmitted to the drive cam 60 via alternative means such as a belt, for example.

In addition, the above described embodiment will not limit the shape of the cam groove in the drive cam 60. For example, the retaining cam parts 63b and 64b/the release maintaining cam parts 63d and 64d can be omitted from the configuration. In that case, after the link connection axis 41 reaches to the end of the sending-in cam parts 63a and 64a at the side of the release maintaining cam parts 63d and 64d, the loading motor 71 is stopped driving. Thereby the state of retaining the disc 12 is maintained. Additionally, after the link connection axis 41 reaches to the end of the release maintaining cam parts 63d and 64d apart from the sending-in cam parts 63a and 64a and the loading motor 71 is stopped driving. Thereby the withdrawal state of the disc retaining parts 34, 34 and 84 can be maintained.

Moreover, in the above described embodiment, the eject arm 80 is configured to apply bias force from the eject spring 86 to the disc 12 in the direction of ejecting the disc 12. However, that eject arm 80 can be configured to move in conjunction with the cam mechanism. In that case, after the disc 12 is retained, the above described embodiment may be configured to rotate the eject arm 80 so as to send in the disc 12 inside the disc player 10.

In addition, in the above described embodiment, the case of using the eject spring 86 as bias means has been described. However, the bias means will not be limited to the eject spring 86 but bias means such as a leaf spring and rubber can be used.

In addition, in the above embodiment, such configuration that the conveyance roller 140 is arranged on one side (left side) in FIG. 13 and the others has been described. However, such configuration that the conveyance roller 140 is arranged not only one side in the width direction of the disc player 10 but also on the both sides can be adopted. Here, also in the case of realizing such both-side arrangement of the conveyance roller 140, the conveyance roller 140 does not overlap with the projection plane of the disc 12. In that case, the respective conveyance rollers 140 are preferably driven by an independent roller gear train. In the case of devising that the lower surface of the disc 12 and the roller shaft 141 do not interfere with each other utilizing, for example, a short diameter roller shaft 141 and the like, the two conveyance rollers 140 may be driven by a same roller gear train 150.

In addition, in the case where the conveyance roller does not overlap with the projection plane of the disc 12 and there is sufficient space secured in the backward direction of the disc player 10, the conveyance roller can be arranged across approximately the entire portion in the width direction of the disc player 10.

Moreover, in the above described embodiment, the outer case 25 is protruded downward by press work and the like and, thereby, the disc guide 26 is formed. However, the disc guide 26 can be formed by attaching an alternative member other than the outer case 25 to the inner surface of a top panel of the outer case 25. In addition, it can be configured that a single disc guide 26 may be arranged or a plurality of disc guides 26 may be arranged.

In addition, in the above embodiment, it is described that driving force of one loading motor 71 is distributed among the loading gear train 70 and the roller gear train 150. However, without such distribution, two independent motors can be provided to the loading gear train 70 and the roller gear train 150 respectively. Here, in the case of providing two motors, both of the two motors correspond to driving sources.

In addition, the above described loading mechanism 11 can be applied to an apparatus other than the disc player 10. The apparatus other than the disc player 10 includes a stocker and the like for retaining/storing the disc 12.

INDUSTRIAL APPLICABILITY

The loading mechanism of the present invention and the disc player with that loading mechanism can be utilized in the field of audio equipment and video players.

The invention claimed is:

1. A loading mechanism conveying discs of different diameters, characterized by comprising:
a driving source;
a first arm member rotating about a first fulcrum as a center;
a second arm member rotating about a second fulcrum as a center;
a cam mechanism rotating at least one of the first arm member and the second arm member by driving force generated by the driving source and by that rotation retaining and sending in the outer circumferential edge of the disc of respectively different diameters; and
a third arm member rotating about a third fulcrum as a center; rotating irrespective of the first arm member and the second arm member; applying, to the disc, bias force opposing a sending-in movement of the disc by bias means; and retaining the outer circumferential edge of the disc,
wherein, when the center portion of the disc overpasses a line obtained by connecting a contact portion of the first arm member to the disc and a contact portion of the second arm member to the disc toward the sending-in side of the disc, the retainment and conveyance of the disc by the first arm member, the second arm member and the third arm member are carried out,
the loading mechanism further characterized in that the first arm member and the second arm member are linked by a link mechanism and thereby operate in conjunction with each other and that,
the link mechanism is comprised of two link levers and a link connection axis linking those link levers;
the cam mechanism is provided with a plurality of cam grooves, each of which is linked to each other, corresponding with the retainment and sending-in of the disc of different diameters;
the link connection axis is inserted into the cam groove;
the link connection axis slides inside the cam groove and thereby the link levers rotate and the rotations of the first arm member and the second arm member are caused in conjunction with the rotation of those link levers and thereby the retainment and sending-in of the disc of different diameters are carried out.

2. The loading mechanism according to claim 1, characterized in that the link connection axis is inserted through a link guide groove formed in a main chassis where respective mechanisms are installed.

3. The loading mechanism according to claim 1, characterized in that:
the cam groove comprises a sending-in cam part sending in the disc by rotating the first arm member and the second arm member;
a retaining cam part carrying out positional retainment of the first arm member and the second arm member in a centering position of the disc after the disc is sent in; and
a releasing cam part releasing the first arm member and the second arm member from retaining the disc after the disc is sent in and after a chucking of the disc to a turntable is carried out.

4. The loading mechanism according to claim 1, characterized in that:
a large diameter disc and a small diameter disc are present for a disc; and
the cam mechanism is provided with a large diameter disc cam groove corresponding with the large diameter disc and a small diameter disc cam groove corresponding with the small diameter disc.

5. The loading mechanism according to claim 4, characterized in that:
the third arm member has a disc retaining part retaining the disc and a release lever part stretching toward a different direction from a direction the disc retaining part stretches;
the cam mechanism has a holding part, by bumping against the release lever part, rotating the third arm member and releasing the third arm member from a disc retaining state.

6. The loading mechanism according to claim 5, characterized in that:
the holding part has,
a first holding part for pushing in the release lever part at a rotary position where the third arm member retains the large diameter disc after sending in the large diameter disc; and
a second holding part for pushing in the release lever part at a rotary position where the third arm member retains the small diameter disc after sending in the small diameter disc.

7. The loading mechanism according to claim 6, characterized in that:
the first holding part and the second holding part are formed from a same side in the cam mechanism; and
the third arm member is pushed by the side and thereby caused to rotate to a same position for the large diameter disc and the small diameter disc and comes into a withdrawn state of not contacting either of the large diameter disc and the small diameter disc.

8. The loading mechanism according to claim 1, characterized in that:
driving force generated by the driving source is transmitted to a loading gear train comprised of a plurality of gears; and
the cam mechanism is provided with an external peripheral gear meshed with a last stage gear of the loading gear train.

9. A disc player characterized by comprising the loading mechanism according to claim 1.

10. A loading mechanism conveying discs of different diameters, characterized by comprising:
a driving source;
a first arm member rotating about a first fulcrum as a center;
a second arm member rotating about a second fulcrum as a center;
a cam mechanism rotating at least one of the first arm member and the second arm member by driving force generated by the driving source and by that rotation retaining and sending in the outer circumferential edge of the disc of respectively different diameters; and
a third arm member rotating about a third fulcrum as a center; rotating irrespective of the first arm member and the second arm member; applying, to the disc, bias force opposing a sending-in operation of the disc by bias means; and retaining the outer circumferential edge of the disc; and
a conveyance roller rotated by the driving source and is arranged in a position of not overlapping with a projection plane in a normal direction of the disc at the completion point of bringing in the disc.

11. The loading mechanism according to claim 10, characterized in that the conveyance roller is arranged in a state of being biased to one side in the width direction of a base body in which the conveyance roller is arranged.

12. The loading mechanism according to claim 11, characterized in that an end portion of the other side of the conveyance roller is positioned on one side in the width direction of the base body relative to a line passing through a center portion of a centering position of the disc that has been sent in, the line being along the direction of conveying the disc.

13. The loading mechanism according to claim 11, characterized in that:
the disc slides and is conveyed to a disc guide upon the rotation of the conveyance roller;
that disc guide protrudes toward the conveyance roller side; and
the disc guide is arranged on the opposite side to the conveyance roller to nip the disc in the state of conveying the disc.

14. The loading mechanism according to claim 13, characterized in that the disc guide is arranged in a position of not overlapping with the projection plane in the normal direction of the disc at the completion point of bridging in the disc.

15. The loading mechanism according to claim 10, characterized in that,
when the center portion of the disc overpasses a line obtained by connecting a contact portion of the first arm member to the disc and a contact portion of the second arm member to the disc toward the sending-in side of the disc, the retainment and conveyance of the disc by the first arm member, the second arm member and the third arm member are carried out.

16. The loading mechanism according to claim 15, characterized in that the first arm member and the second arm member are linked by a link mechanism and thereby operate in conjunction with each other.

17. The loading mechanism according to claim 16, characterized in that:
the link mechanism is comprised of two link levers and a link connection axis linking those link levers;
the cam mechanism is provided with a plurality of cam grooves, each of which is linked to each other, corresponding with the retainment and sending-in of the disc of different diameters;
the link connection axis is inserted into the cam groove;
the link connection axis slides inside the cam groove and thereby the link levers rotate and the rotations of the first arm member and the second arm member are caused in conjunction with the rotation of those link levers and thereby the retainment and sending-in of the disc of different diameters are carried out.

18. The loading mechanism according to claim 17, characterized by comprising:
the link connection axis is inserted through a link guide groove formed in a main chassis where respective mechanisms are installed.

19. The loading mechanism according to claim 17, characterized in that:
the cam groove comprises a sending-in cam part sending in the disc by rotating the first arm member and the second arm member;
a retaining cam part carrying out positional retainment of the first arm member and the second arm member in a centering position of the disc after the disc is sent in; and
a releasing cam part releasing the first arm member and the second arm member from retaining the disc after the disc is sent in and after a chucking of the disc to a turntable is carried out.

20. The loading mechanism according to claim 17, characterized in that:
a large diameter disc and a small diameter disc are present for a disc; and
the cam mechanism is provided with a large diameter disc cam groove corresponding with the large diameter disc and a small diameter disc cam groove corresponding with the small diameter disc.

21. The loading mechanism according to claim 20, characterized in that:
the third arm member has a disc retaining part retaining the disc and a release lever part stretching toward a different direction from a direction the disc retaining part stretches;
the cam mechanism has a holding part, by bumping against the release lever part, rotating the third arm member and releasing the third arm member from a disc retaining state.

22. The loading mechanism according to claim 21, characterized in that:
the holding part has
a first holding part for pushing in the release lever part at a rotary position where the third arm member retains the large diameter disc after sending in the large diameter disc; and
a second holding part for pushing in the release lever part at a rotary position where the third arm member retains the small diameter disc after sending in the small diameter disc.

23. The loading mechanism according to claim 22, characterized in that
the first holding part and the second holding part are formed from a same side in the cam mechanism and the third arm member is pushed by the side and thereby caused to rotate to a same position for the large diameter disc and the small diameter disc and comes into a withdrawn state of not contacting either of the large diameter disc and the small diameter disc.

24. The loading mechanism according to claim 10, characterized in that:
driving force generated by the driving source is transmitted respectively to a roller gear train comprised of a plurality of gears and a loading gear train comprised of a plurality of gears;

the cam mechanism is provided with an external peripheral gear and that external peripheral gear is meshed with a last stage gear of the loading gear train; and the conveyance roller is provided with a roller shaft and a last stage gear of the roller gear is mounted on that roller shaft in a fixed manner.

25. A disc player characterized by comprising the loading mechanism according to claim 10.

* * * * *